US007874711B2

(12) United States Patent
Green et al.

(10) Patent No.: US 7,874,711 B2
(45) Date of Patent: Jan. 25, 2011

(54) SURFACE-MOUNTED LIGHTING SYSTEM

(75) Inventors: Russell Green, Douglasville, GA (US); Grzegorz Wronski, Peachtree City, GA (US); Huang Rongxiu, Shanghai (CN)

(73) Assignee: Cooper Technologies Company, Houston, TX (US)

( * ) Notice: Subject to any disclaimer, the term of this patent is extended or adjusted under 35 U.S.C. 154(b) by 391 days.

(21) Appl. No.: 11/970,622

(22) Filed: Jan. 8, 2008

(65) Prior Publication Data

US 2009/0175040 A1 Jul. 9, 2009

(51) Int. Cl.
*B60Q 1/06* (2006.01)

(52) U.S. Cl. ...................... 362/373; 362/294; 362/147; 362/365; 362/364; 362/404

(58) Field of Classification Search ................ 362/294, 362/373, 147, 364, 365, 404
See application file for complete search history.

(56) References Cited

U.S. PATENT DOCUMENTS 1,622,087 A 3/1927 Calderwood
1,756,361 A 4/1930 Johnson
1,791,480 A 2/1931 Smith et al.
2,316,389 A 4/1943 Atkinson
2,713,983 A 7/1955 Kay
2,802,933 A 8/1957 Broadwin
2,887,568 A 5/1959 Franck
2,930,564 A 3/1960 Maier
3,102,306 A 9/1963 Hutchinson
3,104,087 A 9/1963 Budnick et al.
3,162,413 A 12/1964 Hexdall
3,321,615 A * 5/1967 Hilzen .................. 362/217.07
3,597,889 A 8/1971 Nigro
3,609,346 A 9/1971 Lund et al.
3,710,096 A 1/1973 McFarlin
4,041,657 A 8/1977 Schuplin
4,048,491 A 9/1977 Wessman
4,290,098 A 9/1981 Pierson
4,336,575 A 6/1982 Gilman
4,388,677 A 6/1983 Druffel
4,391,428 A 7/1983 Grimes
4,406,216 A 9/1983 Hott et al.
4,511,113 A 4/1985 Druffel et al.
4,566,057 A 1/1986 Druffel
4,569,003 A 2/1986 Elmer et al.
4,577,824 A 3/1986 Druffel et al.
4,646,212 A 2/1987 Florience
4,670,822 A 6/1987 Baker
4,723,747 A 2/1988 Karp et al.
4,754,377 A 6/1988 Wenman
4,796,169 A 1/1989 Shemitz (Continued)

OTHER PUBLICATIONS

U.S. Appl. No. 11/809,785, Wronski et al.

(Continued)

*Primary Examiner*—Sandra L O Shea
*Assistant Examiner*—Danielle Allen
(74) *Attorney, Agent, or Firm*—King & Spalding LLP

(57) ABSTRACT

Lamp capsules and systems thereof having a socket, socket holder, and lens holder are provided. Socket holders include a plurality of fins extending radially and outwardly therefrom, and define a cavity into which a lamp is placed. Systems include a lens positioned in the lens holder, and a snoot is connected to the lens holder.

21 Claims, 41 Drawing Sheets

U.S. PATENT DOCUMENTS

| | | | | |
|---|---|---|---|---|
| 4,803,603 | A | 2/1989 | Carson | |
| 4,829,410 | A | 5/1989 | Patel | |
| 4,967,990 | A | 11/1990 | Rinderer | |
| 4,972,339 | A | 11/1990 | Gabrius | |
| 4,978,092 | A | 12/1990 | Nattel | |
| 5,029,794 | A | 7/1991 | Wolfe | |
| 5,044,582 | A | 9/1991 | Walters | |
| 5,045,985 | A | 9/1991 | Russo et al. | |
| 5,057,979 | A | 10/1991 | Carson et al. | |
| 5,074,515 | A | 12/1991 | Carter, Jr. | |
| 5,075,831 | A | 12/1991 | Stringer et al. | |
| 5,178,503 | A | 1/1993 | Losada | |
| 5,209,444 | A | 5/1993 | Rinderer | |
| 5,222,800 | A | 6/1993 | Chan et al. | |
| 5,316,254 | A | 5/1994 | McCartha | |
| 5,374,812 | A | 12/1994 | Chan et al. | |
| 5,386,959 | A | 2/1995 | Laughlin et al. | |
| 5,452,816 | A | 9/1995 | Chan et al. | |
| 5,505,419 | A | 4/1996 | Gabrius | |
| 5,571,256 | A | 11/1996 | Good et al. | |
| 5,588,737 | A | 12/1996 | Kusmer | |
| 5,591,968 | A | 1/1997 | Tseng | |
| 5,597,234 | A | 1/1997 | Winkelhake | |
| 5,662,413 | A | 9/1997 | Akiyama | |
| 5,662,414 | A | 9/1997 | Jennings et al. | |
| 5,678,799 | A | 10/1997 | Jorgensen et al. | |
| 5,690,423 | A | 11/1997 | Hentz et al. | |
| 5,746,507 | A | 5/1998 | Lee | |
| 5,758,959 | A | 6/1998 | Sieczkowski | |
| 5,803,571 | A * | 9/1998 | McEntyre et al. | 362/18 |
| 5,857,766 | A | 1/1999 | Sieczkowski | |
| 5,873,556 | A | 2/1999 | Reiker | |
| 5,915,828 | A * | 6/1999 | Buckley | 362/293 |
| 5,934,631 | A | 8/1999 | Becker et al. | |
| 5,954,304 | A | 9/1999 | Jorgensen | |
| 5,957,573 | A | 9/1999 | Wedekind et al. | |
| 5,957,574 | A | 9/1999 | Hentz et al. | |
| 6,030,102 | A | 2/2000 | Gromotka | |
| 6,076,788 | A | 6/2000 | Akiyama | |
| 6,082,878 | A | 7/2000 | Doubek et al. | |
| 6,206,544 | B1 * | 3/2001 | Costa | 362/242 |
| 6,286,265 | B1 | 9/2001 | Rinderer | |
| 6,431,723 | B1 | 8/2002 | Schubert et al. | |
| 6,461,016 | B1 | 10/2002 | Jamison et al. | |
| 6,471,374 | B1 | 10/2002 | Thomas et al. | |
| 6,484,980 | B2 | 11/2002 | Medlin, Sr. et al. | |
| 6,505,960 | B2 | 1/2003 | Schubert et al. | |
| 6,652,124 | B2 | 11/2003 | Schubert et al. | |
| 2005/0168986 | A1 * | 8/2005 | Wegner | 362/241 |
| 2005/0183344 | A1 | 8/2005 | Ziobro et al. | |
| 2005/0230589 | A1 | 10/2005 | Wronski | |
| 2005/0247842 | A1 | 11/2005 | Wronski | |
| 2007/0075206 | A1 | 4/2007 | Wright et al. | |
| 2007/0211470 | A1 * | 9/2007 | Huang | 362/294 |
| 2008/0025031 | A1 | 1/2008 | Wronski | |
| 2008/0130298 | A1 * | 6/2008 | Negley et al. | 362/365 |

OTHER PUBLICATIONS

Robert O. Parmley, P.E.; Standard Handbook of Fastening and Joining, Second Edition ; McGraw-Hill Publishing; pp. 8-29 to 8-31, 1989.

* cited by examiner

SURFACE-MOUNTED LIGHTING SYSTEM

CROSS REFERENCE TO RELATED APPLICATIONS

The present application claims priority to U.S. application Ser. No. 11/809,785, entitled "Surface-Mounted Lighting System" and filed on Jun. 1, 2007, which claims priority to U.S. Provisional Patent Application No. 60/803,670, entitled "Iris Square Fixture" and filed on Jun. 1, 2006, the entire contents of which are hereby incorporated herein by reference.

FIELD OF THE INVENTION

The present invention relates to lighting fixtures and more specifically to recessed lighting fixtures that facilitate making adjustments during or following fixture installation, thereby accommodating various ceiling thicknesses, outputting a variety of illumination patterns, or providing multiple orientations with respect to existing fixtures.

BACKGROUND

Lighting systems, such as ceiling-, wall-, or surface-mounted lighting fixtures or luminaries, commonly illuminate spaces in which people live, work, or play. Despite an availability of a wide variety of commercial lighting fixtures, lighting designers often struggle with competing design objectives. A person occupying a work or living space may desire a fixture that is integrated esthetically and functionally with the environment. Meanwhile, an installer may prefer a fixture that offers easy access to light bulbs, wires, and adjustment mechanisms—items that often lack visual appeal. Addressing electrical safety, compliance with government and industry standards, energy efficiency, and heat dissipation adds to the difficulty of balancing design criteria. Moreover, many users prefer specific patterns and angles of illumination and would like a capability to adapt the lighting fixture or the luminaire according to their personal preferences.

The term "luminaire", as used herein, generally refers to a system for producing, controlling, and/or distributing light for illumination. A luminaire can be a system that outputs or distributes light into an environment so that people can observe items in the environment. Such a system could be a complete lighting unit comprising one or more lamps; sockets for positioning and protecting lamps and for connecting lamps to a supply of electric power; optical elements for distributing light; and mechanical components for supporting or attaching the luminaire. Luminaires are also sometimes referred to as "lighting fixtures" or as "light fixtures." A lighting fixture that has a socket for a bulb, but no inserted bulb, can still be considered a luminaire.

Conventional lighting technologies often fail to strike an adequate balance among competing functional, service, installation, aesthetic, safety, and regulatory objectives. For example, conventional ceiling-mounted fixtures often lack a capability to fit a wide range of ceiling types and thicknesses. This lack of flexibility can result in excessive installation costs associated with making shims or with modifying either a ceiling or a lighting fixture to achieve installation compatibility.

Another problem with conventional technology lies in aligning a new lighting fixture to an existing fixture, for example to create an array or a line of lights. Yet another problem concerns making optical adjustments to output a sought-after illumination pattern. One more problem relates to mating a conventional lighting fixture with a ceiling in order to provide, without undue labor expense, a clean and defect-free interface between the ceiling and the lighting fixture.

Additionally, compact light sources produce a tremendous amount of heat and, if not properly managed, may result in short lamp life and premature socket failure. Other concerns include increased temperature within a recessed housing causing reduced life of components such as magnetic or electronic transformers, electrical connections or discolor finished surfaces. Visible light emissions directed rearward may also illuminate the interior of the recessed housing causing an unacceptable aesthetic appearance to the end user.

Accordingly, to address one or more of the aforementioned representative deficiencies in the art, an improved lighting fixture is needed. Moreover, a need exists for a lighting fixture that is readily adapted for mounting on a variety of surfaces, including ceilings that have different thicknesses. A need also exists for a lighting fixture that can be adjusted to provide geometric alignment with another fixture, lighting or otherwise. Yet another need is for a lighting fixture for which a person can readily control the pattern of illumination, including an angle of illumination or an optical axis. One more need is present for a lighting fixture that an installer can mate efficiently and cleanly with a hole in a ceiling or similar surface. Furthermore, there is a need for recessed lighting with increased lamp life and improved socket performance and longevity. A capability addressing one or more of these needs would decrease installation cost, offer better lighting, and/or provide a single fixture design that would serve multiple installation scenarios.

SUMMARY

The present invention provides a lamp capsule having a socket holder, a socket positioned in the socket holder at a first end, and a lens holder connected to the socket holder at a second end. The socket holder defines a cavity and is adapted to receive a lamp therewithin. The socket holder also includes a plurality of fins extending radially and outwardly therefrom. In some embodiments, the socket holder further includes a socket mounting platform in direct contact with the socket. The socket mounting platform may include apertures through which connection pins from a lamp may pass through. The socket mounting platform may also include an aperture to facilitate heat dissipation. In some embodiments, the socket may be in direct contact with the plurality of fins to facilitate conductive heat transfer from the socket to the fins. In some embodiments, the socket holder may include ventilation apertures for convective heat dissipation. The lens holder may also include a mounting groove, ventilation slots, lamp support features, and at least one lens. A snoot may be connected to the lens holder for retaining the lens and to control the light beam from the lamp.

Systems of the present invention include lamp capsules of the present invention having a lamp positioned within the socket holder cavity. In some embodiments, a gap may be included between the lamp and interior of the socket holder to facilitate heat dissipation.

The discussion of lamp capsules presented in this summary is for illustrative purposes only. Various aspects of the present invention may be more clearly understood and appreciated from a review of the following detailed description of the disclosed embodiments and by reference to the drawings and the claims that follow. Moreover, other aspects, systems, features, advantages, and objects of the present invention will become apparent to one with skill in the art upon examination of the following drawings and detailed description. It is intended that all such aspects, systems, features, advantages, and objects are to be included within this description, are to be within the scope of the present invention, and are to be protected by the accompanying claims.

BRIEF DESCRIPTION OF THE DRAWINGS

FIG. 4, are line drawings of a platform of a lighting fixture that comprises a removable square collar with a height adjustment capability in accordance with an exemplary embodiment of the present invention.

FIG. 7, are line drawings of a lighting fixture that comprises an enclosure with a hinged access door, depicted in a closed position, in accordance with an exemplary embodiment of the present invention.

FIG. 8, are line drawings of a lighting fixture that comprises an enclosure with a hinged access door, depicted in an open position, in accordance with an exemplary embodiment of the present invention.

FIG. 9, are line drawings of a lighting fixture that comprises an enclosure with a feature for locking a door of the enclosure in accordance with an exemplary embodiment of the present invention.

FIG. 10, are line drawings of a lighting fixture that comprises an enclosure with a locking feature having capture dimples in accordance with an exemplary embodiment of the present invention.

FIG. 13, are detail line drawings of a mechanism of a hangar bar for mounting a lighting fixture in accordance with an exemplary embodiment of the present invention.

FIG. 16, are line drawings of features for aligning a platform to an enclosure of a lighting fixture in accordance with an exemplary embodiment of the present invention.

FIG. 21, are line drawings of a portion of a lighting fixture, specifically a lamp support mechanism that is removable through the lighting fixture's aperture in accordance with an exemplary embodiment of the present invention.

FIG. 26, are line drawings of a portion of a lighting fixture comprising a lamp support mechanism attached to a square collar in accordance with an exemplary embodiment of the present invention.

FIG. 28, are line drawings of a portion of a lighting fixture comprising an adjustment mechanism for tilting a lamp of the fixture in accordance with an exemplary embodiment of the present invention.

FIG. 29, are line drawings of a portion of a lighting fixture comprising an adjustment mechanism for tilting a lamp of the fixture in accordance with an exemplary embodiment of the present invention.

FIG. 37, are line drawings of a lamp capsule system in accordance with an exemplary embodiment of the present invention. FIG. 37A is an exploded perspective view of the lamp capsule system having two lenses. FIG. 37B is a side view of an assembled lamp capsule system. FIG. 37C is a side cross-sectional view of an assembled lamp capsule system having one lens. FIG. 37D is a top view of the lamp capsule system. FIG. 37E is a bottom view of the lamp capsule system without a lamp inserted.

Figure 1:
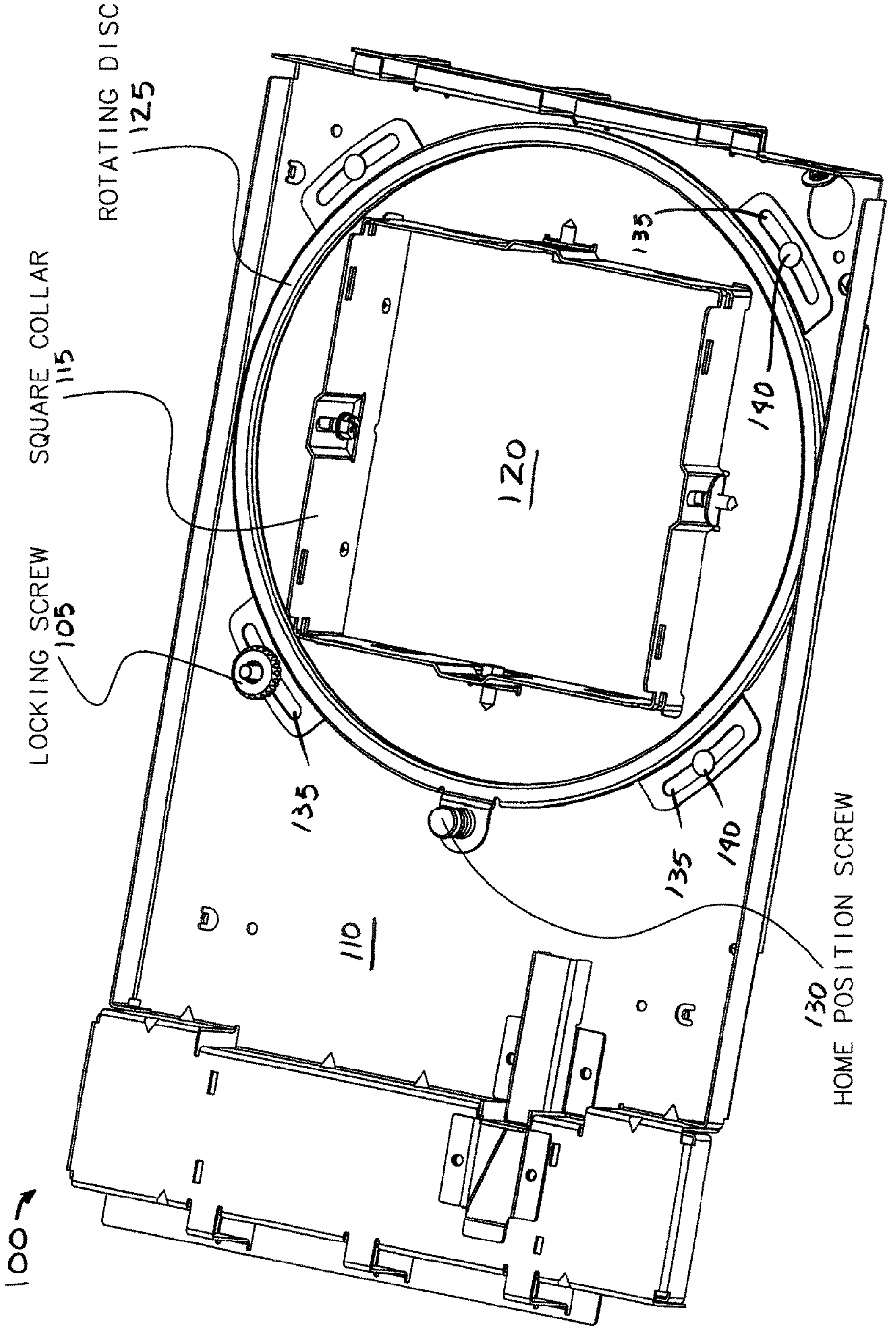
FIG. 1 is a line drawing of a platform of a lighting fixture that comprises a rotatable square aperture in accordance with an exemplary embodiment of the present invention.

Many aspects of the invention can be better understood with reference to the above drawings. The elements and features shown in the drawings are not necessarily to scale, emphasis instead being placed upon clearly illustrating the principles of exemplary embodiments of the present invention. Moreover, certain dimension may be exaggerated to help visually convey such principles. In the drawings, reference numerals designate like or corresponding, but not necessarily identical, elements throughout the several views.

DETAILED DESCRIPTION OF EXEMPLARY EMBODIMENTS

An exemplary embodiment of the present invention supports installing a recessed lighting fixture in various ceiling materials while providing for a significant level of post-installation adjustments. The fixture can comprise an optic, such as a reflector or a lens; a lamp; and an aperture or hole that emits light into a environment, such as a room or a workspace. The lamp and associated optics can provide an axis of illumination that passes through the aperture.

One adjustment changes the angle of illumination, effectively tilting the axis of illumination. A user, be it an installer, a service professional, or a homeowner, can utilize this adjustment to change the angle of light emanating from the aperture according to personal preference or to achieve a desired lighting effect.

Via a second adjustment, the user can reposition the aperture, which can be square in an exemplary embodiment, after the fixture is partially, substantially, or completely installed. The aperture can be rotated following or during installation so that the visible portion of the fixture is aligned to another fixture.

To provide a third adjustment, the lighting fixture can provide a telescoping or translation capability that accommodates mounting the fixture in ceilings of different thicknesses. With this telescoping capability, an installer can recess the lamp a set depth in a ceiling, independent of ceiling thickness. The lighting fixture can achieve a fixed or predetermined relation between an upper reflector and a lower optical element regardless of ceiling thickness. Accordingly, the fixture can provide glare-free (or reduced glare) at a wide range of adjustment angles, for a wide range of ceiling thicknesses, and in a wide range of operating environments.

The term "optical element," as used herein, generally refers to a device or system that manipulates, emits, produces, manages, or controls light, illumination, or photons. Among other things, an optical element could be or could comprise one or more lenses, reflectors, diffusers, panes, prisms, or flat glasses.

A lighting fixture will now be described more fully hereinafter with reference to FIGS. 1-36, which describe representative embodiments of the present invention. FIGS. 1-17 generally describe housing, frame, or enclosure features of exemplary lighting fixtures. FIGS. 17-29 can be loosely characterized as describing exemplary lighting fixture modules. Meanwhile FIGS. 30-35 relate to what might be viewed as lighting fixture accessories. Finally, FIG. 36 is broadly concerns lighting housings or enclosures that are rated for direct contact with insulation materials in attics or similar above-ceiling spaces.

The invention can be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting, and among others supported by representations of the present invention.

Turning now to FIG. 1, this figure illustrates an exemplary platform 110 of a lighting fixture 100 comprising a rotatable square aperture 120 according to certain embodiments of the present invention. FIG. 1 depicts the lighting fixture 100 without showing wiring, a lamp, and certain other housing features that are shown in other figures and that will be discussed in further detail below.

Figure 18:
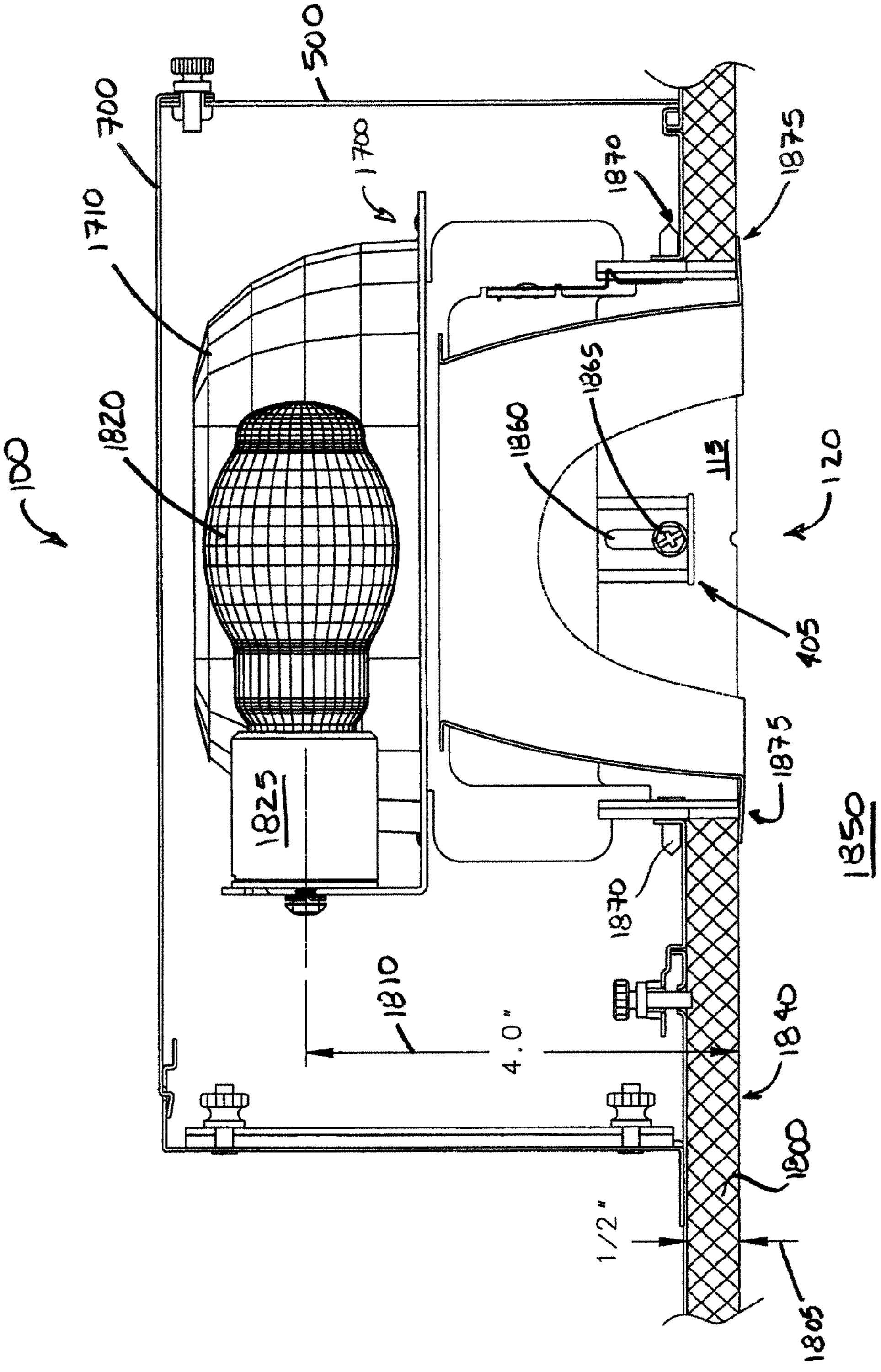
FIG. 18 is a line drawing, in cross sectional view, of a lighting fixture mounted to a ceiling that is ½ inch thick (about 12.7 millimeters) in accordance with an exemplary embodiment of the present invention.
Figure 19:
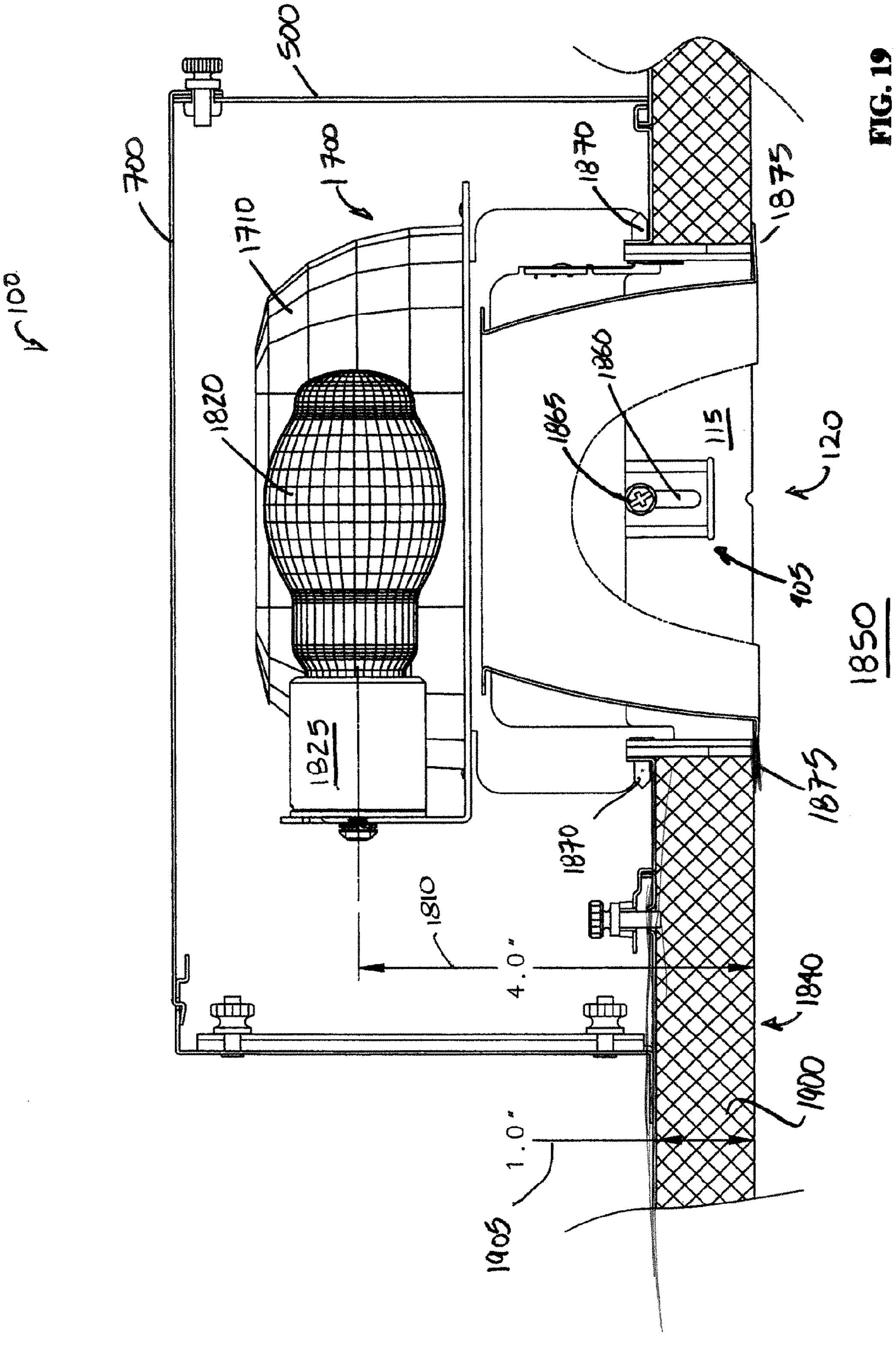
FIG. 19 is a line drawing, in cross sectional view, of a lighting fixture mounted to a ceiling that is 1 inch thick (about 25.4 millimeters) in accordance with an exemplary embodiment of the present invention.

In a typical application, the lighting fixture 100 is installed overhead, for example in a ceiling of a house, an office building, or a like structure, and FIG. 1 depicts the fixture 100 from an overhead view. In other words, the portions of the frame 100 that are visible and facing up in the illustration would be facing up (for example into an attic) when the lighting fixture 100 is installed. FIGS. 18 and 19, discussed below, show additional details about such an installation.

The platform 110, which can be characterized as an exemplary embodiment of a plate, comprises a square aperture 120 through which light from a lamp or other light source (not explicitly illustrated in FIG. 1) passes. The aperture 120 can be an opening or a hole. Although depicted as having a square form, the aperture 120 can be oblong, oval, rectangular, circular, hexagonal, triangular, or some other geometric form.

In an exemplary embodiment, the platform 110 can be a "plaster frame" that provides mechanical support for a lighting fixture housing or enclosure. A plaster frame is generally a metal member mounted on hanger bars between the joists of a building structure that supports a ceiling. A plaster frame can comprise a main body portion including a rectangular planar member 110 defining an aperture 120. A depending flange or rim may surround the frame for mating with a hole in a ceiling.

Referring to the exemplary embodiment of FIG. 1, a square collar 115 frames the aperture 120 and comprises provisions, illustrated at FIG. 26 and discussed below, for attaching a lamp support mechanism thereto. The square collar 115 can be viewed as extending around the perimeter or periphery of the aperture 120 or as circumscribing or encircling the aperture 120.

The square collar 115 is attached to a rotating disc (or disk) 125 that facilitates rotating the aperture 120. In one exemplary embodiment, the rotating disc 125 is round or circular and is made of metal. Alternatively, the disc 125 can be oval, square, crescent, star-shaped, or some other shape.

As illustrated, the rotating disc 125 comprises four slots 135 that are disposed at four locations around the periphery of the disc 125. In an exemplary embodiment, the slots 135 are arcuate or arc-shaped, as illustrated. Pins 140 or similar members are disposed in three of the slots 135. The slots 135 and pins 140 define the rotational freedom of the disc 125 and the associated square collar 115 and aperture 120. More specifically, the arc lengths of the slots 135 define the rotational travel or the amount of available rotational motion, which is plus or minus 7.5 degrees in the illustrated exemplary embodiment. Other embodiments may have shorter or longer slots 135 and may have fewer or more than four slots 135.

The pin 105 of one of the slots 135 is threaded, thus forming a screw 105. Tightening the nut threaded onto that locking screw 105 locks or sets the rotating disc 125 in a specific angular position. A "home position" screw 130 sets the rotating disc 125 to a known or initial rotational position to facilitate initial installation. The home position is approximately in the middle of the range of available rotations of the aperture frame 115.

With the rotating disc 125 set to the home position, an installer typically mounts the lighting fixture 100 at a hole in the ceiling. After the fixture 100 is mounted, the installer can loosen the home position screw 130 and rotate the aperture 120 up to about 7.5 degrees clockwise and up to about 7.5 degrees counterclockwise. The disc 125 rotates essentially about a central axis of the aperture 120, with the disc 125 remaining generally parallel to the platform 110 (or at least to some generally planar surface thereof) during the rotation. Thus, the exemplary aperture 120 is typically disposed more or less in the center of the disc 125.

The installer can adjust the orientation of a linear side or a corner of the aperture 120 and the associated square collar 115. Via this adjustment, the installer can align the visible portions of the lighting fixture 100 with another object in a room, for example to create a row of lighting fixtures 110. After achieving a desired orientation, the installer locks the rotational position via tightening the locking screw 105. The rotational adjustment relaxes initial installation tolerances and facilitates aligning the apertures 120 of adjacent luminaires with respect to one another to correct initial misalignment. The illustrated rotational adjustment capability further facilitates changing the angular orientation of the lighting fixture 100 at future times, even years after the initial installation.

Figure 2:
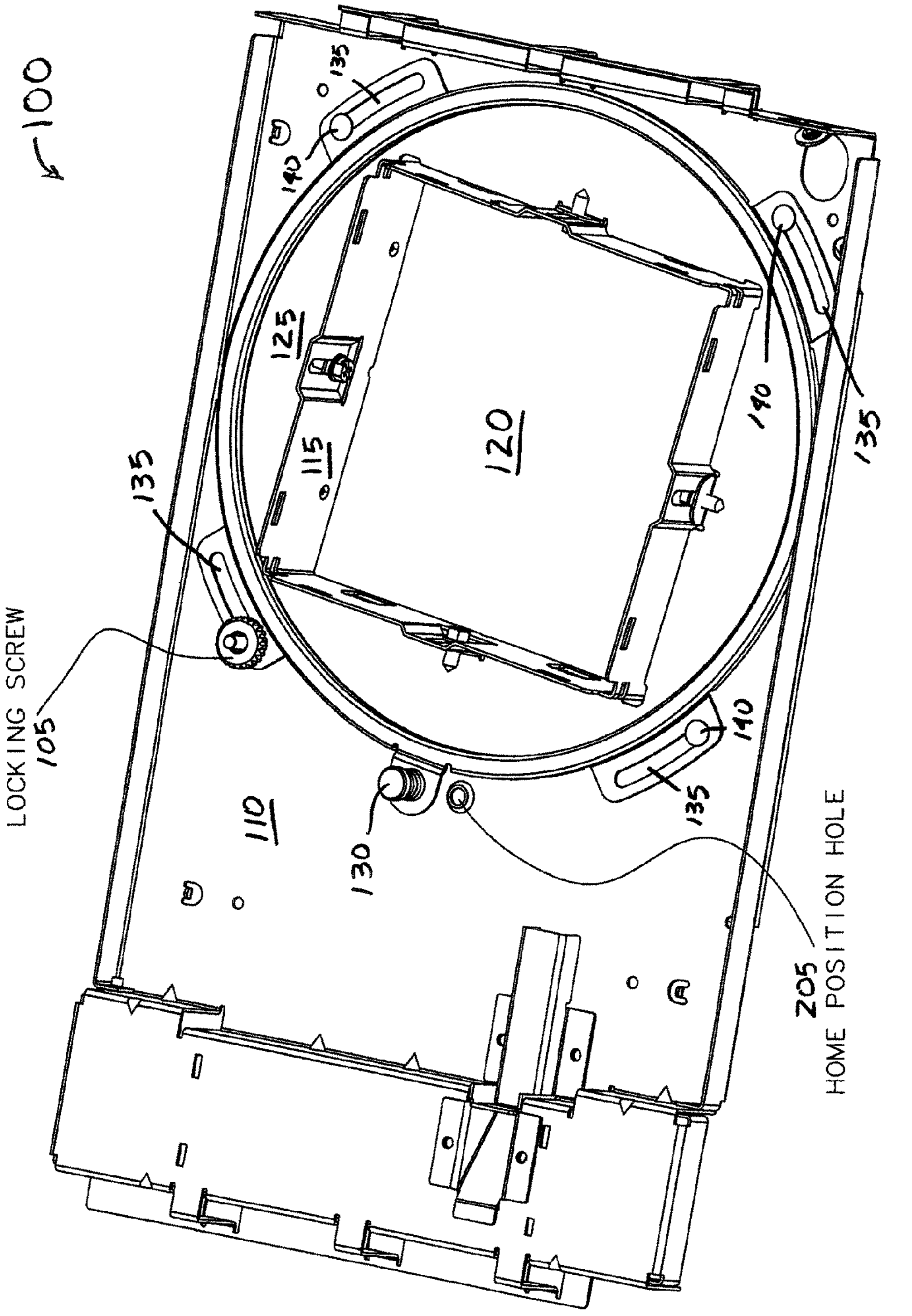
FIG. 2 is a line drawing of a platform of a lighting fixture that comprises a rotatable square aperture, wherein the aperture is rotated relative to the orientation of FIG. 1, in accordance with an exemplary embodiment of the present invention.

Turning now to FIG. 2, this figure illustrates a platform 110 of an exemplary lighting fixture 100 comprising a rotatable square aperture 120, wherein the aperture 120 is rotated relative to the orientation of FIG. 1, according to certain embodiments of the present invention. As illustrated, the home position screw 130 has been loosened and removed from the home position hole 205, which is threaded in an exemplary embodiment, to enable rotational adjustment. The rotating disc 125 is depicted in a rotated state, about 7.5 degrees clockwise from the home position. Accordingly, FIG. 2 further describes the capabilities of the lighting fixture 100 for rotational adjustment of the aperture 120 during or following fixture installation.

Figure 3:
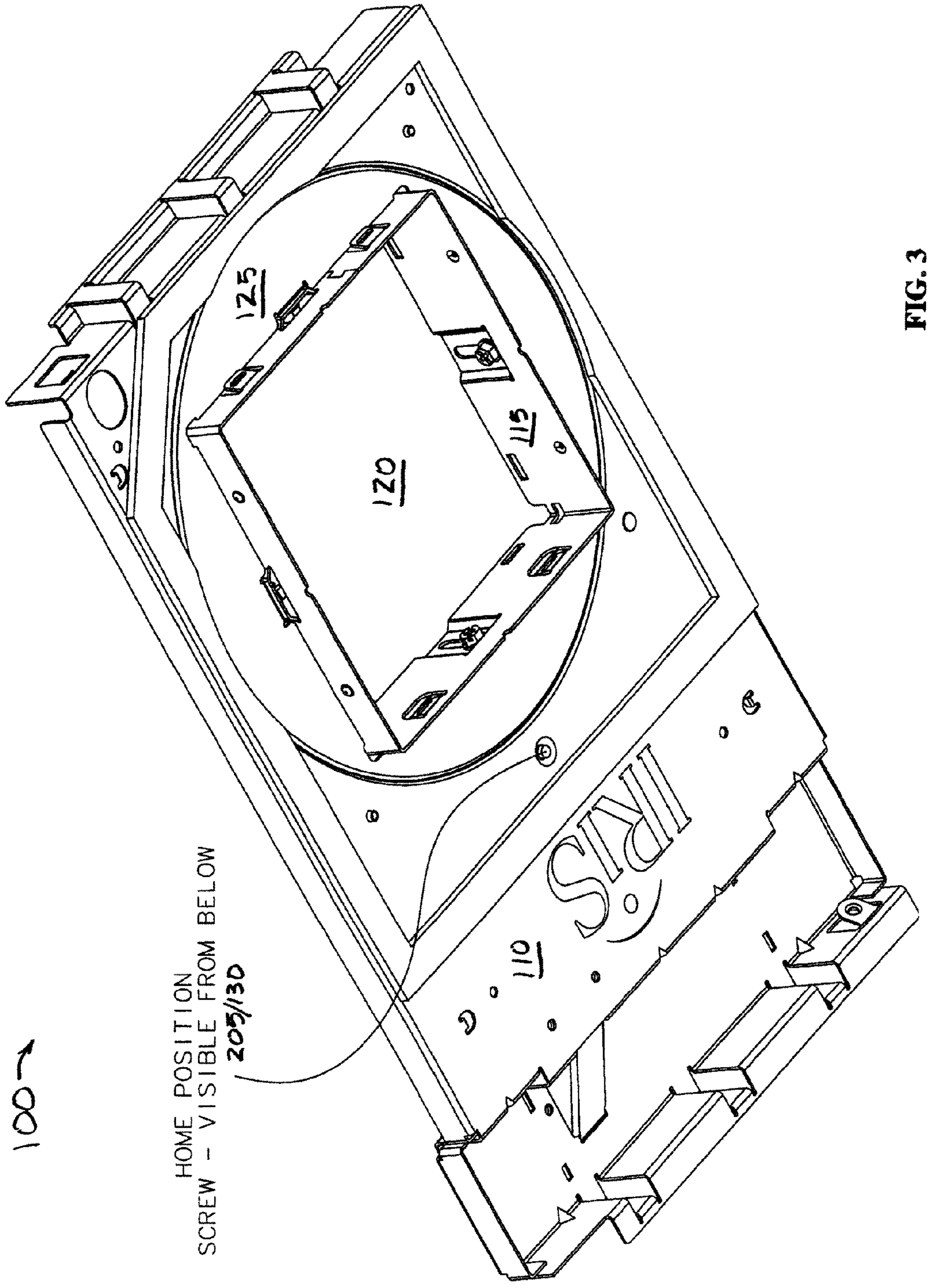
FIG. 3 is a line drawing of a platform of a lighting fixture that comprises a rotatable square aperture and an alignment hole that defines a "home" rotational position in accordance with an exemplary embodiment of the present invention.

Turning now to FIG. 3, this figure illustrates a platform 110 of an exemplary lighting fixture 100 comprising a rotatable square aperture 120 and an alignment hole 130 that defines a home rotational position according to certain embodiments of the present invention. More specifically, FIG. 3 illustrates the side of the lighting fixture 100 that is hidden in FIGS. 1 and 2. That is, FIG. 3 provides a view of the side of the lighting fixture 100 that would face an interior of a room when the fixture 100 is ceiling mounted. As illustrated, the aperture 120 is oriented to the home position, as evidenced by the visibility of the home position screw 130 in the home position hole 205.

Figures 4A, 4B:
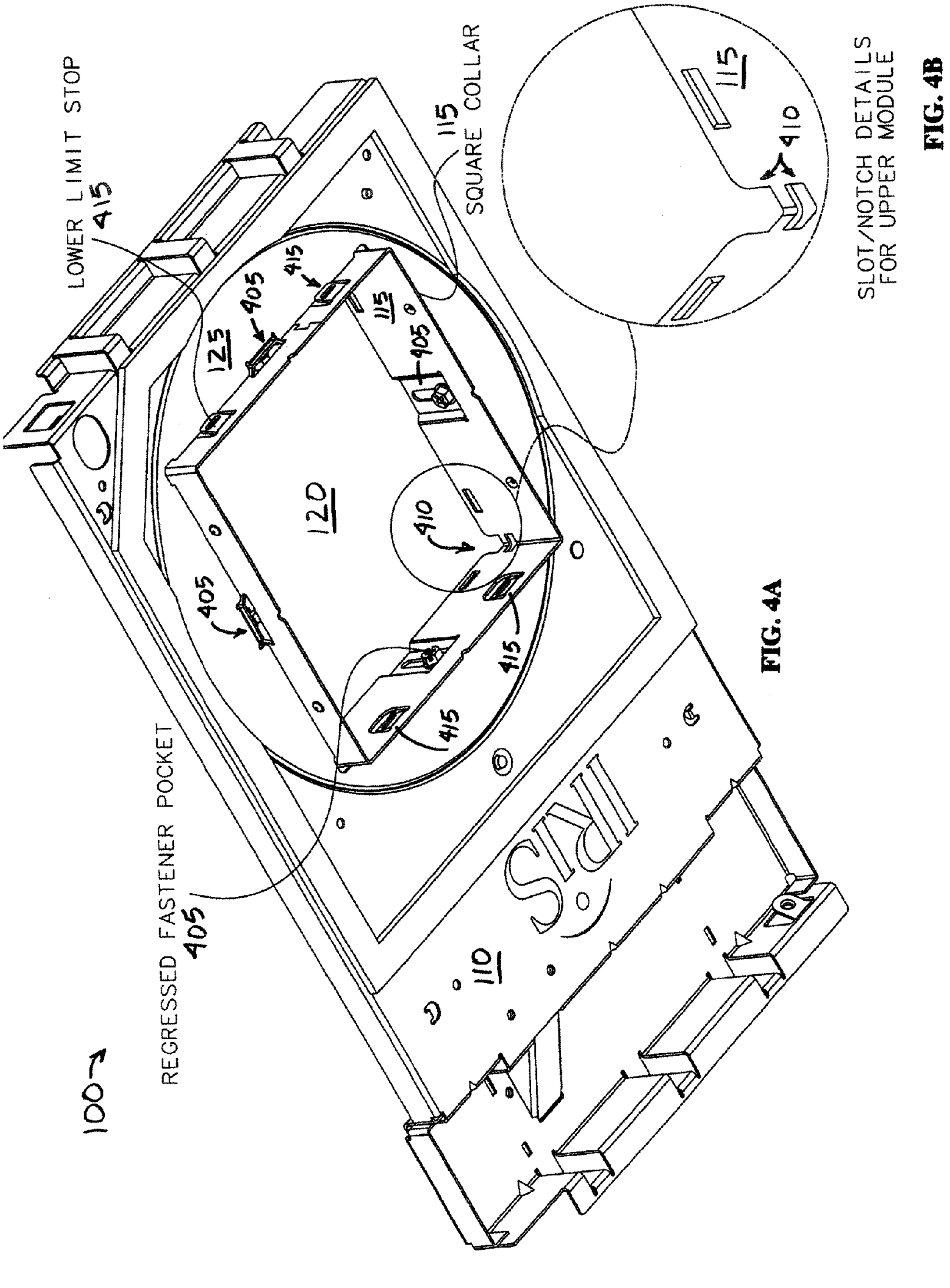
FIGS. 4A and 4B, collectively

Turning now to FIG. 4, this figure illustrates a platform 110 of an exemplary lighting fixture 100 comprising a removable square collar 115 with a height adjustment capability according to certain embodiments of the present invention. More specifically, FIG. 4 illustrates certain construction details of the removable square collar 115 discussed above.

Figure 17:
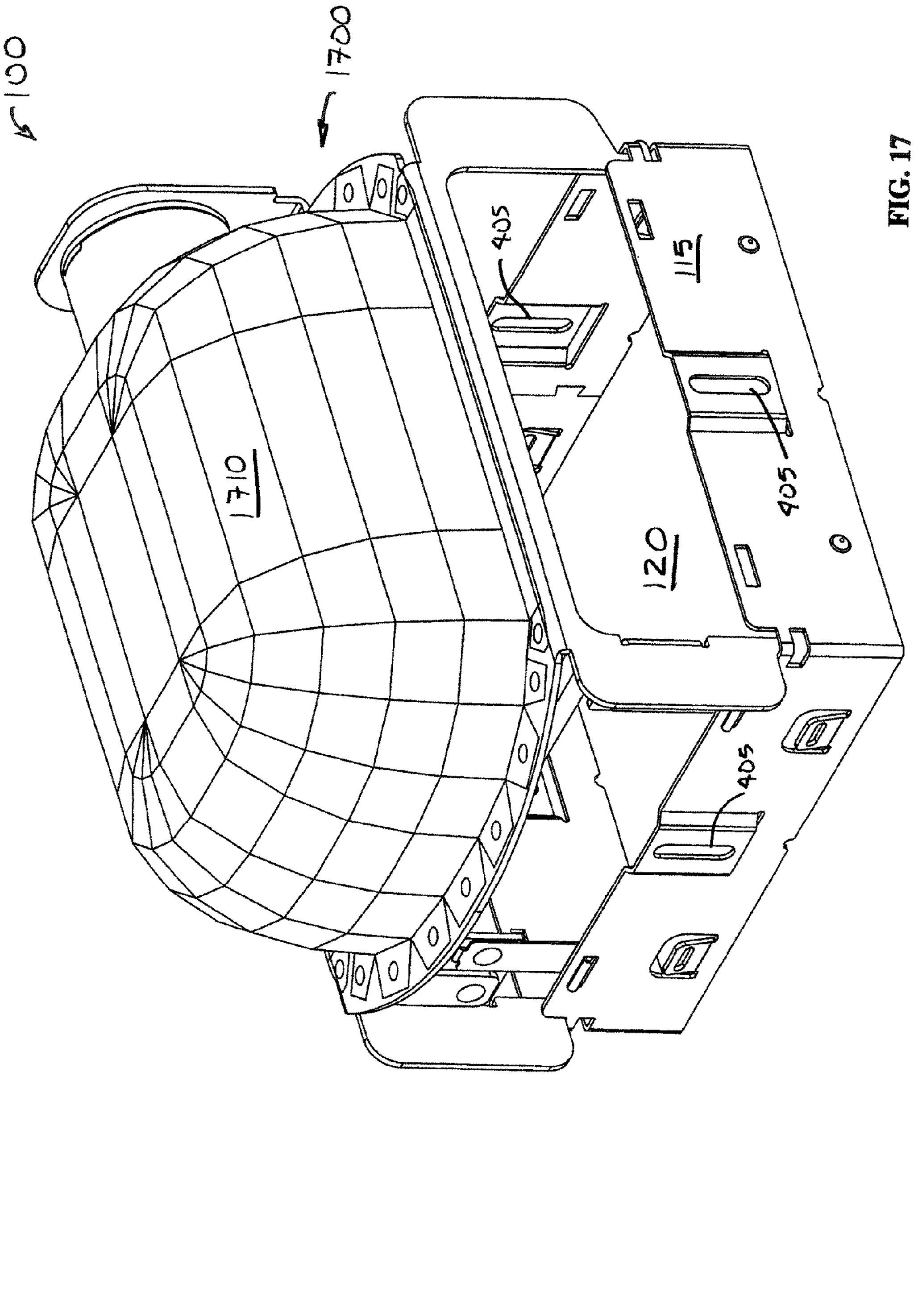
FIG. 17 is a line drawing of a portion of a lighting fixture comprising a lamp support mechanism attached to a square collar in accordance with an exemplary embodiment of the present invention.

The removable square collar 115 provides a range of height adjustments of 0.5 inch (about 12.7 millimeters) to facilitate mounting in ceilings if different thicknesses, as discussed in further detail below. The removable square collar 115 comprises regressed or recessed fastener pockets 405 that each accommodates a screw or some other type of fastener. As illustrated in FIG. 17 and discussed below, the removable square collar 115 mates with a member that supports a lamp.

Lower limits stops 415 and slots/notches 410 support interchanging lamps or upper modules. Thus, a base platform 110 is compatible with multiple lighting elements, including elements that may be visible to an occupant of a lighted spaced and functional elements hidden from view. In an exemplary embodiment, the removable square collar 115 can be installed in multiple positions, for example on four 90 degree increments.

Figure 5:
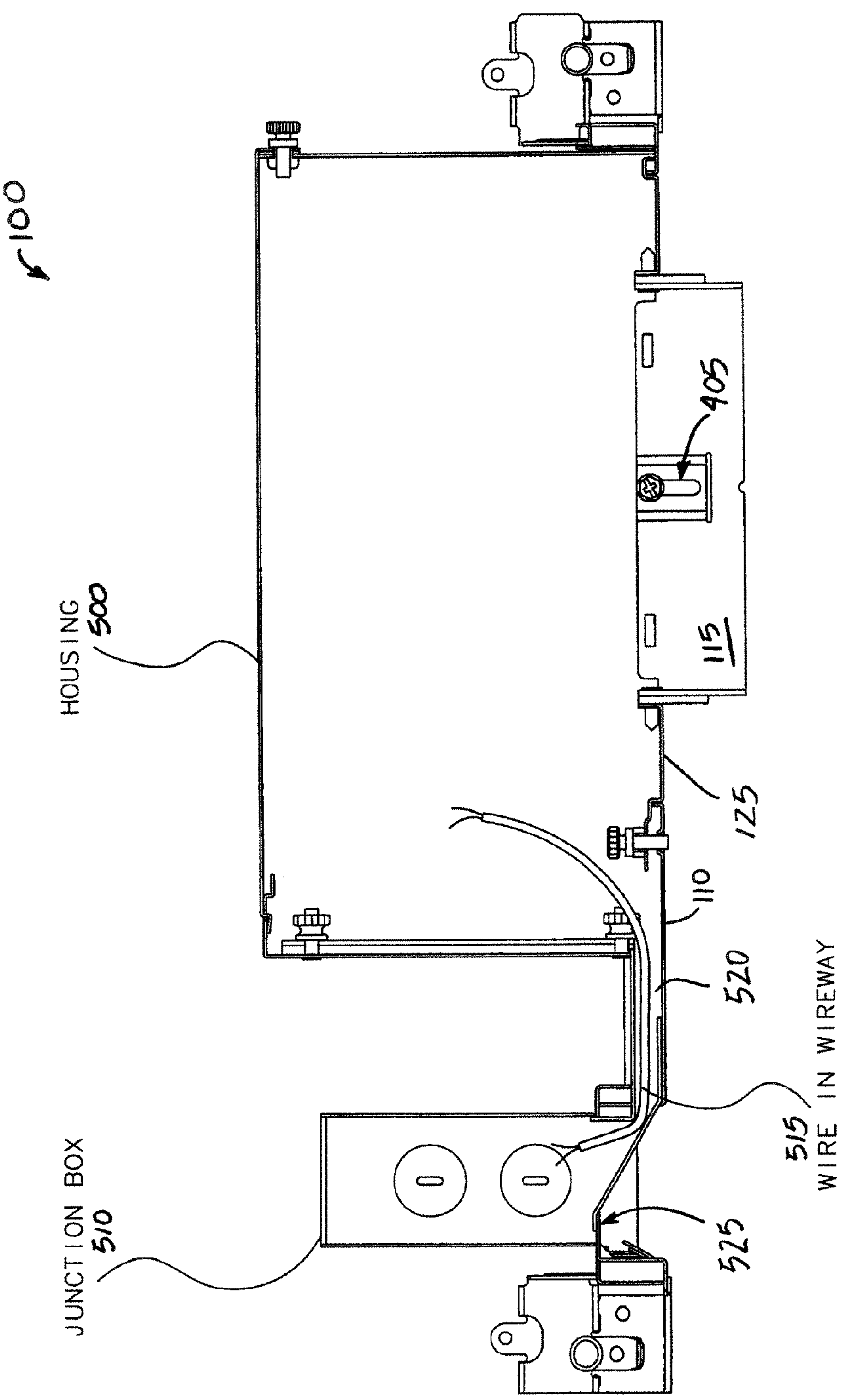
FIG. 5 is a line drawing of a platform of a lighting fixture that comprises an extendable member for accommodating ceilings of differing thicknesses and a wireway channel in accordance with an exemplary embodiment of the present invention.

Turning now to FIG. 5, this figure illustrates a platform 110 of an exemplary lighting fixture 100 comprising an extendable member 115 for accommodating ceilings of differing thicknesses and a wireway channel 520 according to certain embodiments of the present invention. More specifically, FIG. 5 illustrates a side view of the lighting fixture platform 110 discussed above with reference to FIG. 1-4. In comparison to the earlier-described embodiments, a junction box 510, a housing or enclosure 500, and wiring elements 515, 520 have been attached towards building up a fully operational lighting system.

The junction box 510, sometimes referred to as a "j-box," contains electrical connections for joining the fixture's wiring 515 with electrical supply lines. The junction box 510 is mounted on a raised platform 525 that provides service accessibility and that offers compatibility with commonly available electrical components. In operation, current flows to the junction box 510, through the wires in the wireway 520, and to an electrical lamp (not explicitly illustrated in FIG. 5).

The housing or enclosure 500 contains the electrically fed lamp, associated optics, mechanical components, and adjustment mechanisms that are illustrated in subsequent figures and discussed in further detail below. In an exemplary embodiment, the housing 500 can be viewed as a sealed enclosure or as a box.

Figure 20:
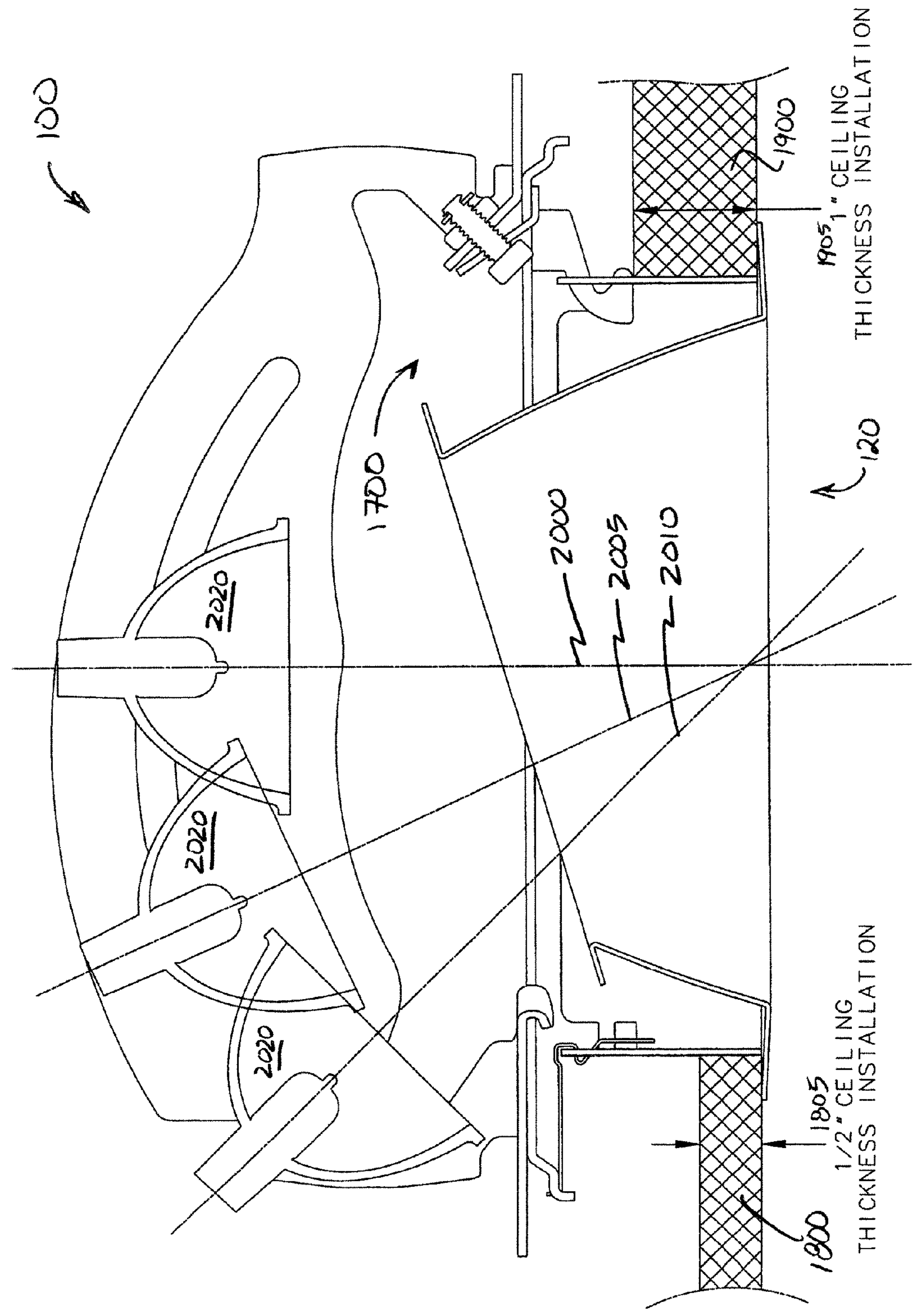
FIG. 20 is a line drawing, in cross sectional view, of a lighting fixture mounted to a ceiling with varying ceiling thickness in accordance with an exemplary embodiment of the present invention.

FIG. 5 further illustrates certain adjustable capabilities of the removable square collar 115. The slot and associated fastener 405 provides a mechanical telescoping capability or a vertical translation action that facilitates installing the lighting fixture 100 on ceilings of various thicknesses. FIGS. 18, 19, and 20 and the accompanying discussion below describe that translation capability in further detail.

Figure 6:
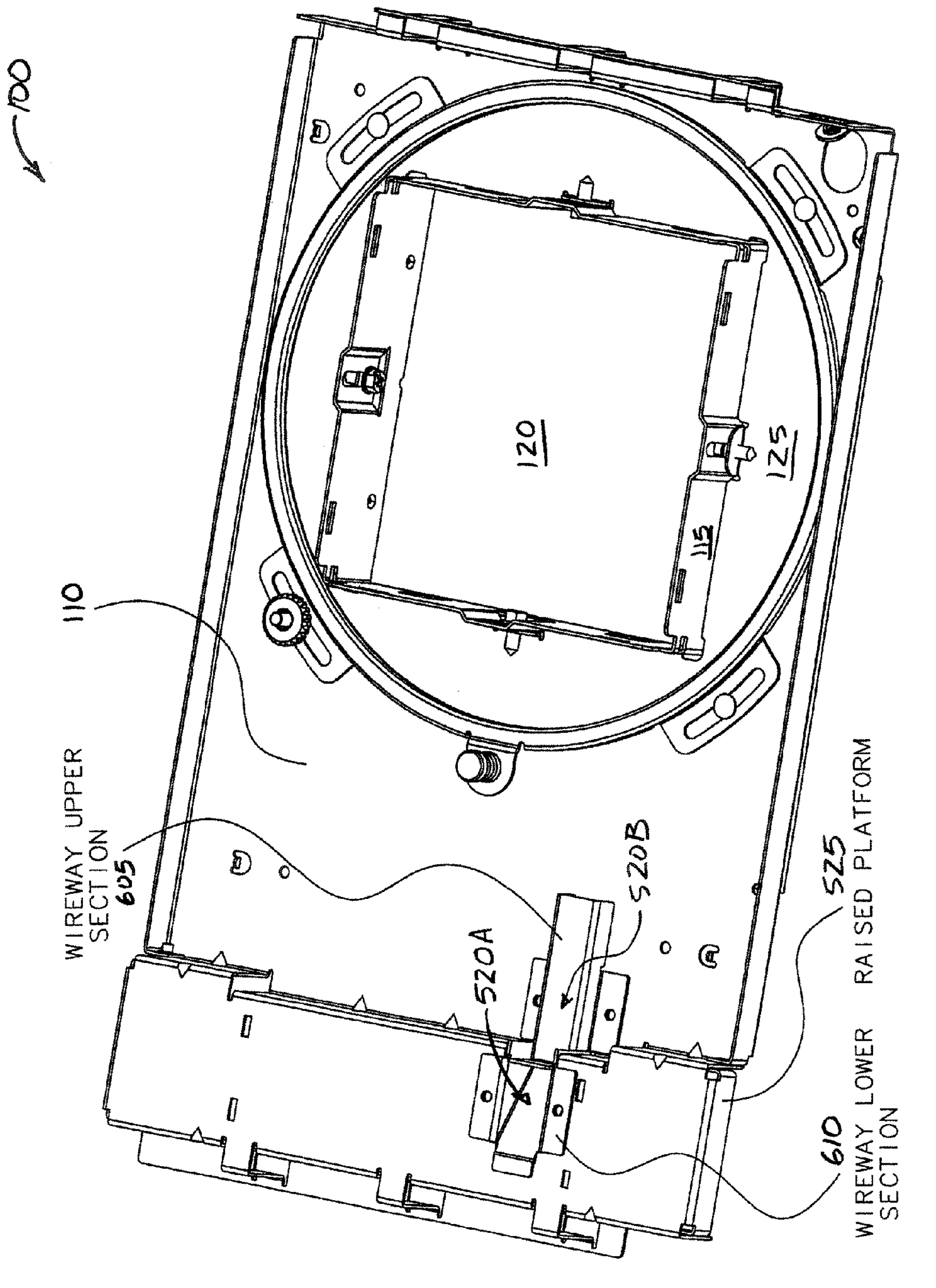
FIG. 6 is a line drawing of a platform of a lighting fixture that comprises wireway components in accordance with an exemplary embodiment of the present invention.

Turning now to FIG. 6, this figure illustrates a platform 110 of an exemplary lighting fixture 100 comprising wireway components 520A, 520B according to certain embodiments of the present invention. Relative to FIG. 5, the junction box 510 and the enclosure/housing 500 are removed and the view is from above, as if looking down upon a ceiling-mounted orientation. This view illustrates how the wireway 520 comprises upper and lower sections 605, 610, again facilitating efficient installation and servicing of the electrical aspects of the lighting fixture 100.

Figure 7B:
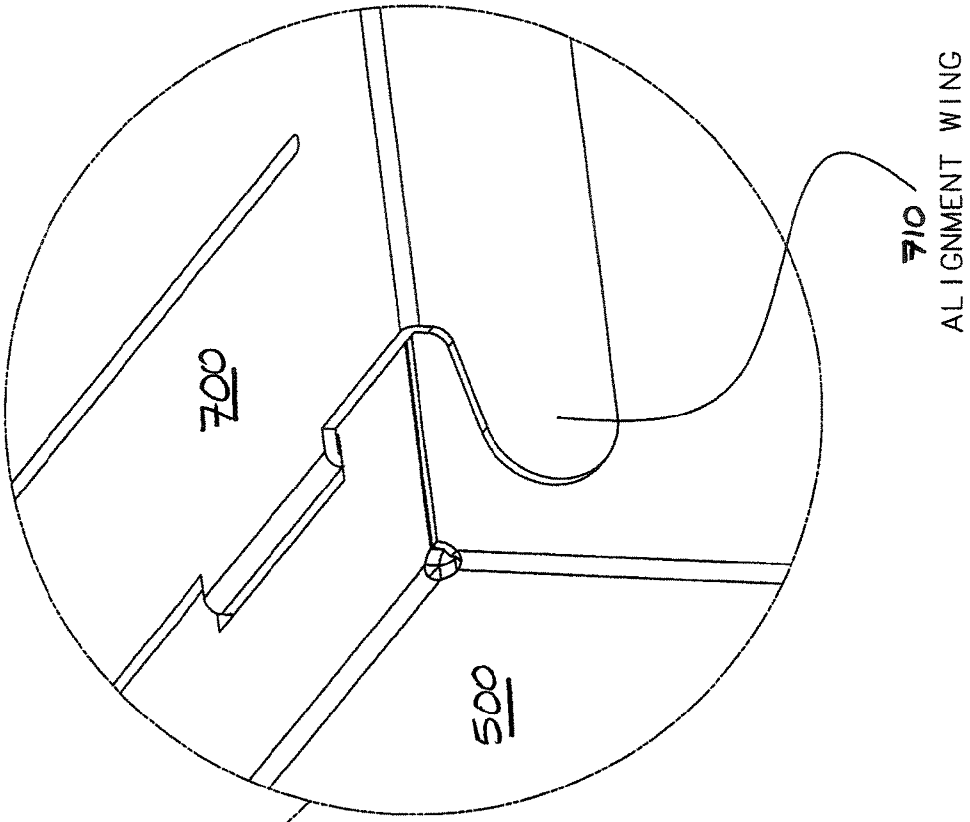
FIGS. 7A and 7B, collectively
Figure 7A:
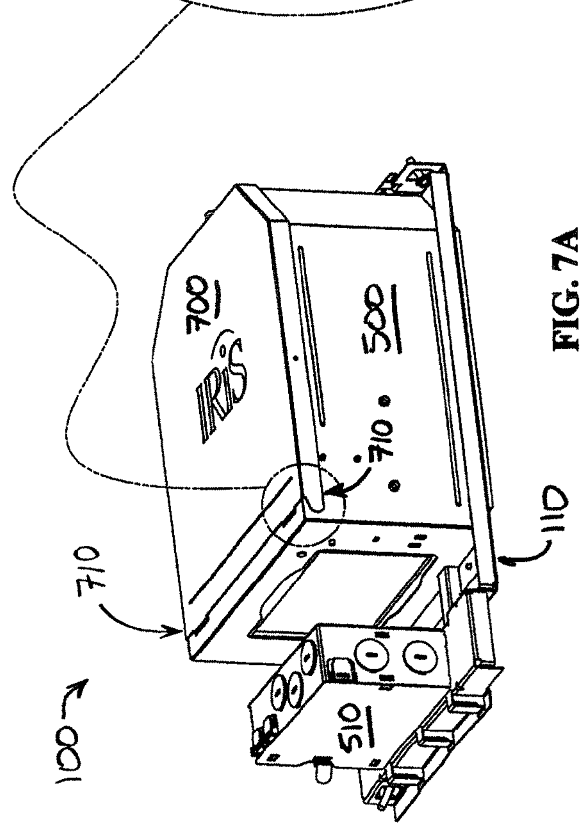

Turning now to FIG. 7, this figure illustrates an exemplary lighting fixture 100 comprising an enclosure 500 with a hinged access door 700, depicted in a closed position, according to certain embodiments of the present invention. The hinged access door 700 comprises a pair of alignment wings 710 that prevent the door 700 from becoming misaligned when opening an shutting. Thus, an installer or a person providing post-installation service can easily open and shut the door 700 for ready access to the mechanical, electrical, and optical components housed in the enclosure 500.

Figure 8B:
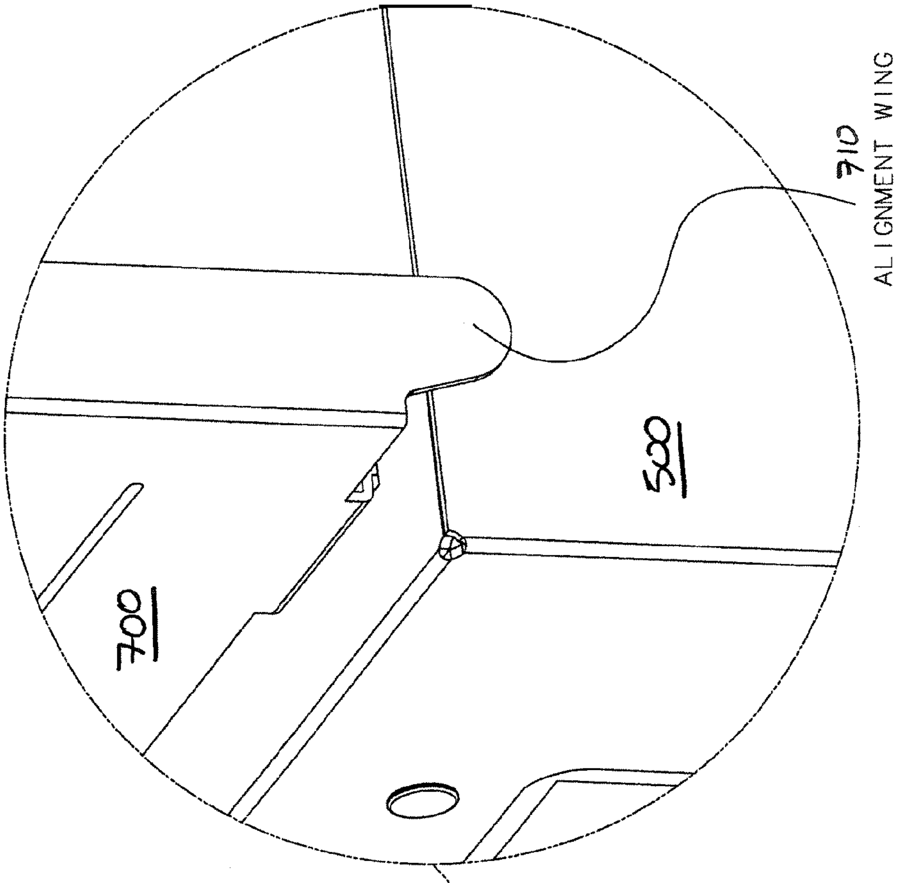
FIGS. 8A and 8B, collectively
Figure 8A:
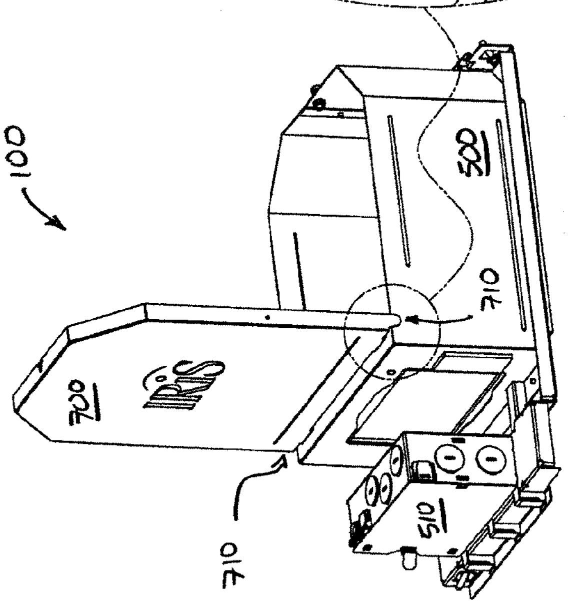

Turning now to FIG. 8, this figure illustrates an exemplary lighting fixture 100 comprising an enclosure 500 with a hinged access door 700, depicted in an open position, according to certain embodiments of the present invention. In combination, FIGS. 7 and 8 illustrate how the hinged access door 700 of an exemplary embodiment opens and shuts.

Figure 9B:
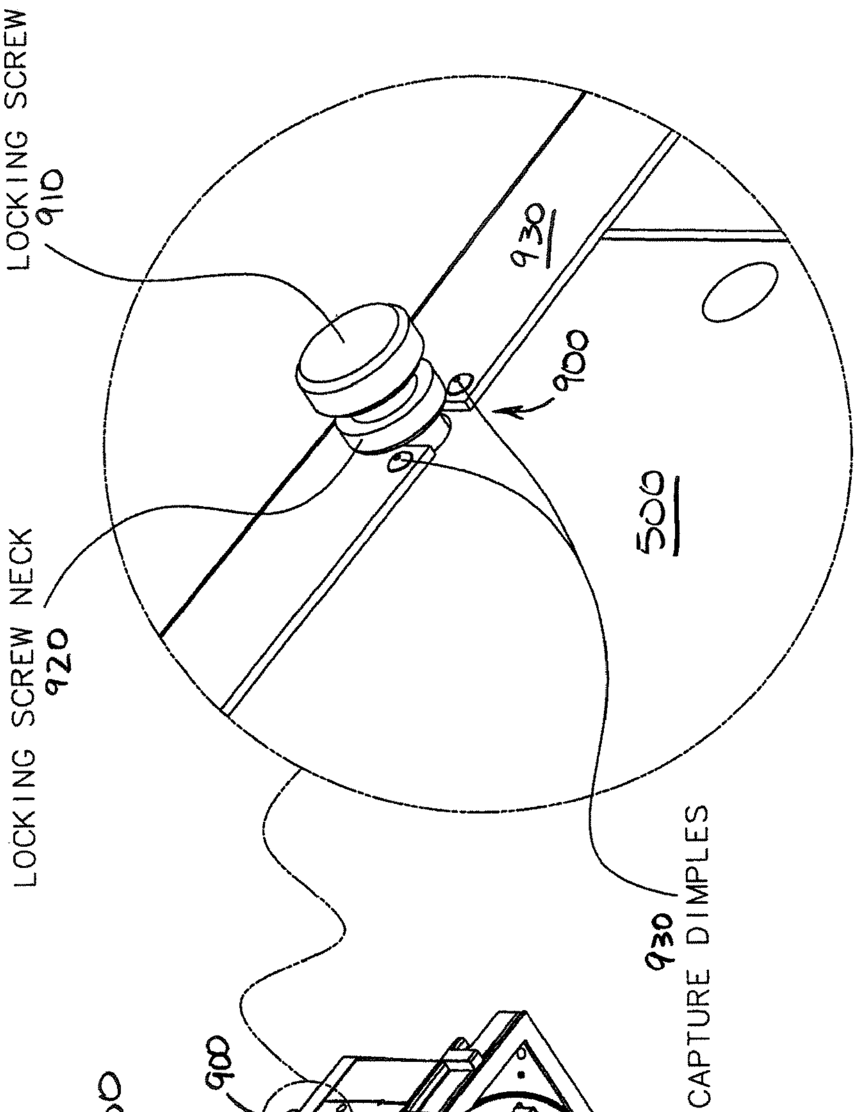
FIGS. 9A and 9B, collectively
Figure 9A:
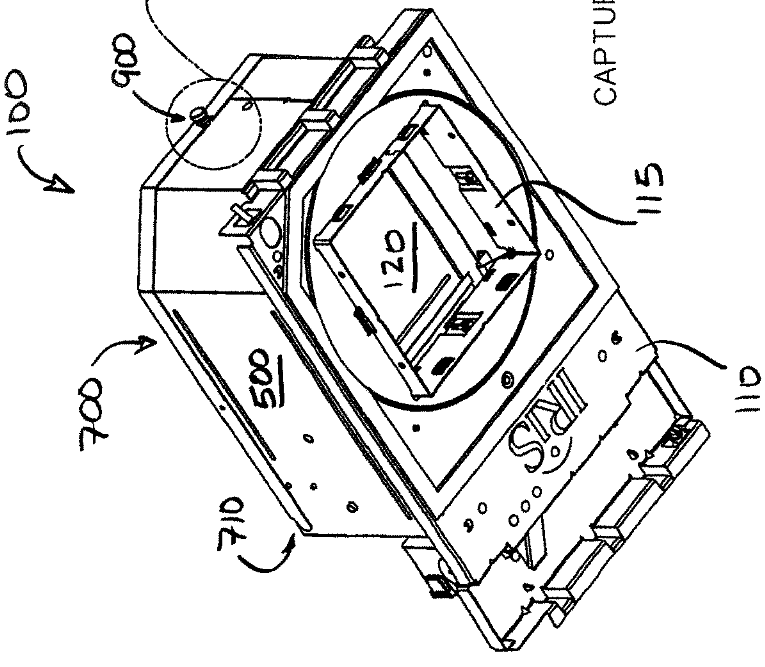

Turning now to FIG. 9, this figure illustrates an exemplary lighting fixture 100 comprising an enclosure 500 with a feature 900 for locking a door 700 of the enclosure 500 in accordance with an exemplary embodiment of the present invention. In the illustrated configuration, the door 700 is fully closed.

The locking feature 900 keeps the door 700 closed and can operate without excessive tightening of the locking screw 910. Two capture dimples 930, which are typically slight recesses, are stamped on the outer surface of the door flange 930. The distance between the two dimples 930 is smaller than the outer diameter of the locking screw neck 920. Accordingly, the locking screw neck 920 engages the capture dimples 930 to retain the closed position.

Figure 10B:
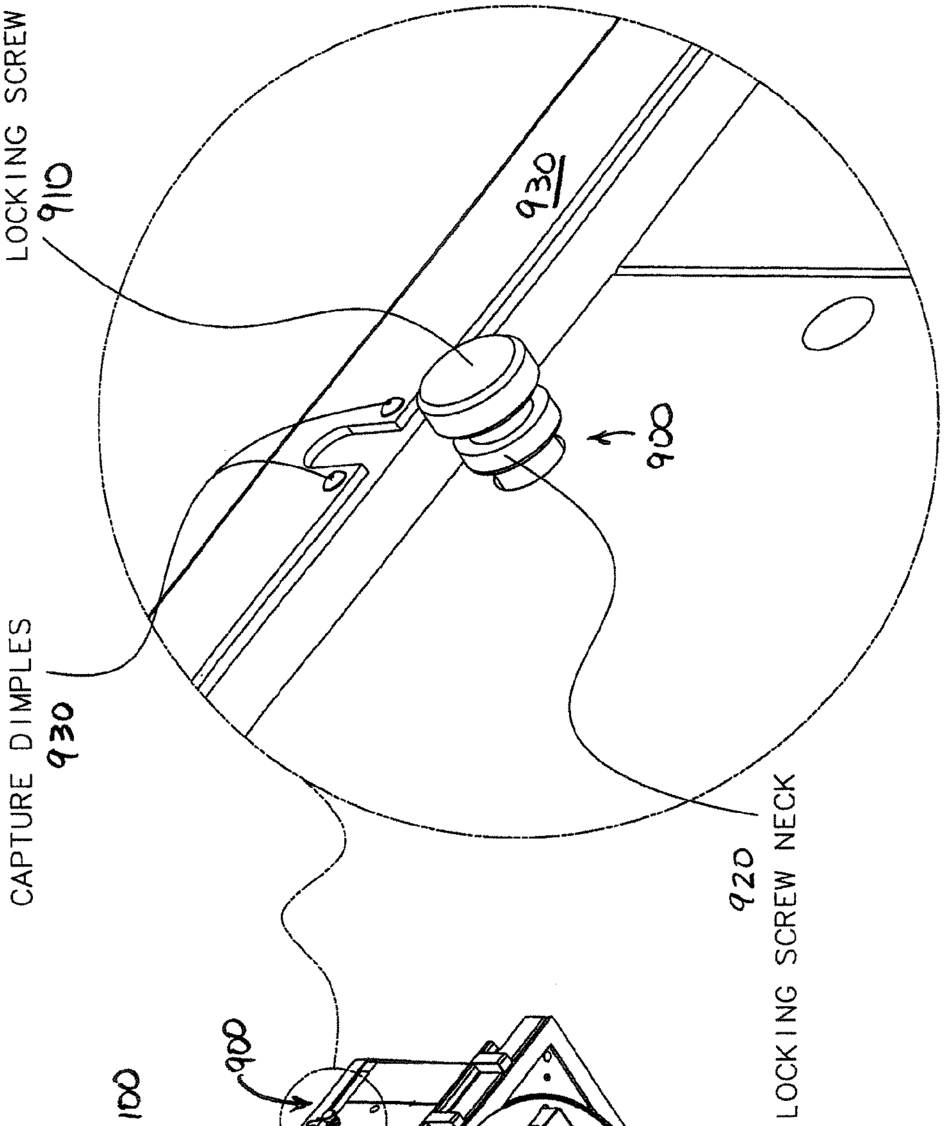
FIGS. 10A and 10B, collectively
Figure 10A:
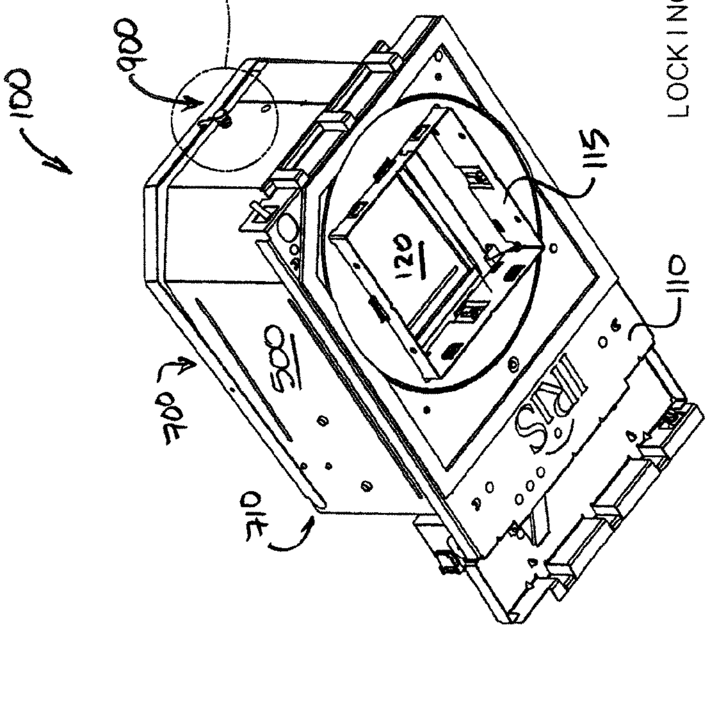

Turning now to FIG. 10, this figure illustrates an exemplary lighting fixture 100 comprising an enclosure 500 with a locking feature 900 having capture dimples 930 according to certain embodiments of the present invention. Whereas FIG. 9 depicts the door 700 in the closed position, FIG. 10 illustrates the door 700 slightly open. In the illustrated configuration, the locking mechanism 900 is set to fasten or lock the door 700 shut upon closure.

Figure 11:
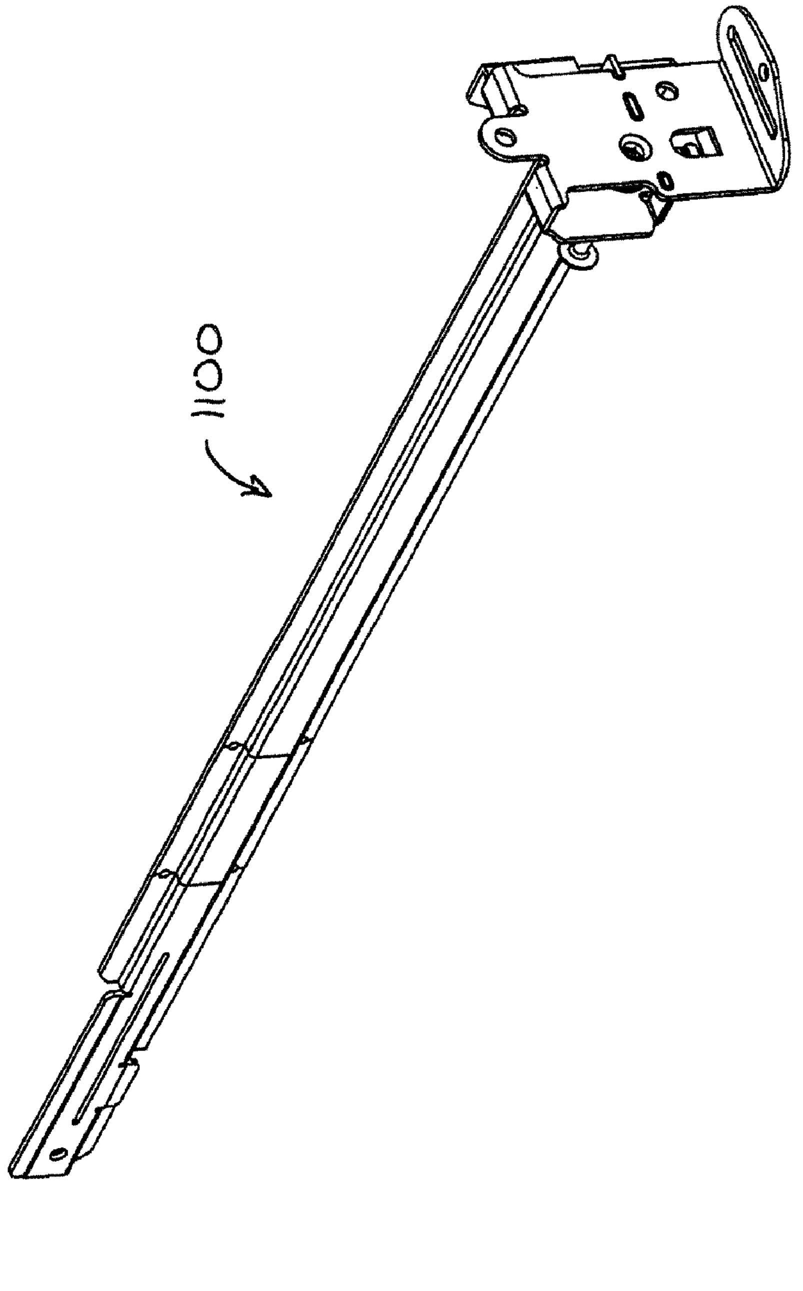
FIG. 11 is a line drawing of right hangar bar for mounting a lighting fixture in accordance with an exemplary embodiment of the present invention.
Figure 12:
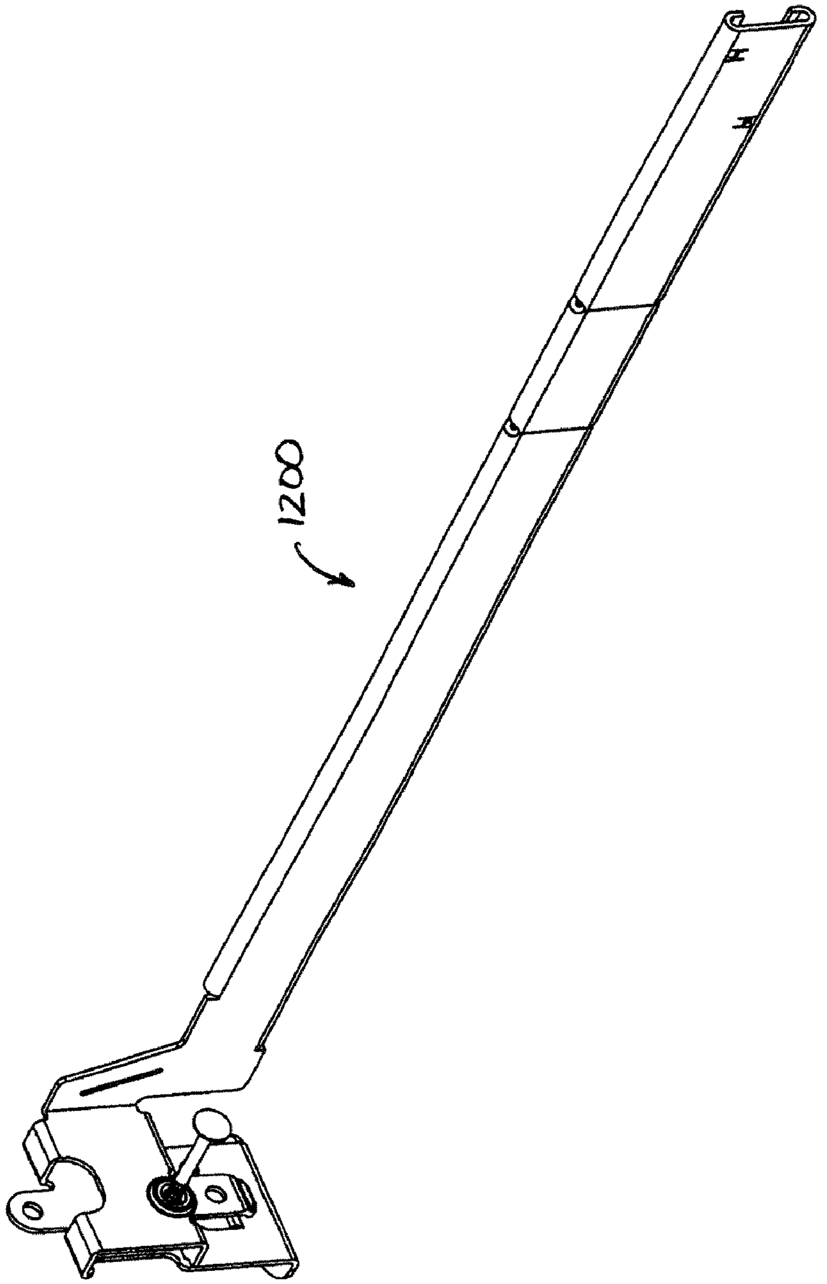
FIG. 12 is a line drawing of left hangar bar for mounting a lighting fixture in accordance with an exemplary embodiment of the present invention.

Turning now to FIGS. 11 and 12, these figures respectively illustrate a right hangar bar 1100 and a left hanger bar 1200 for mounting an exemplary lighting fixture 100 according to certain embodiments of the present invention. Exemplary embodiments of the hanger bars 1100, 1200 are described in U.S. Pat. No. 6,082,878, entitled "Fully Rotatable Recessed Light Fixture With Movable Stop and Adjustable Length Bar Hanger" and filed on Feb. 3, 1998 in the name of David Edwin Doubek et al., the entire contents of which are hereby incorporated herein by reference.

U.S. patent application Ser. No. 11/090,654, entitled "Hangar Bar for Recessed Luminaires With Integral Nail" and filed on Mar. 25, 2005 in the name of Grzegorz Wronski, describes other exemplary embodiments of the hanger bars 1100, 1200 illustrated in FIGS. 11 and 12. The entire contents of U.S. patent application Ser. No. 11/090,654 are hereby incorporated herein by reference.

Figure 13B:
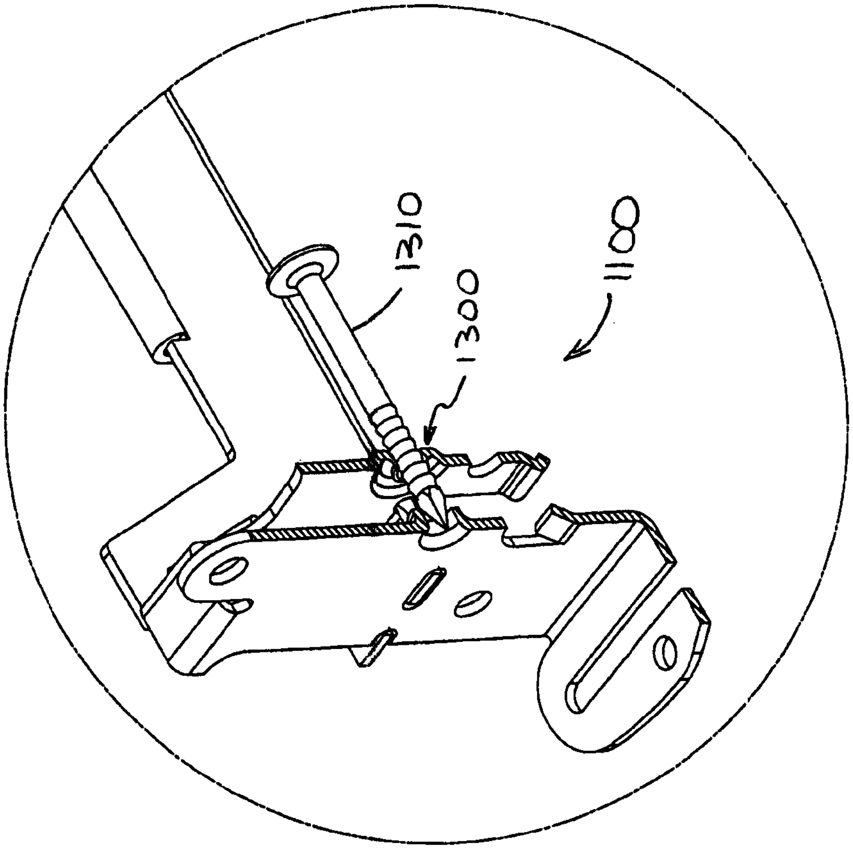
FIGS. 13A and 13B, collectively
Figure 13A:
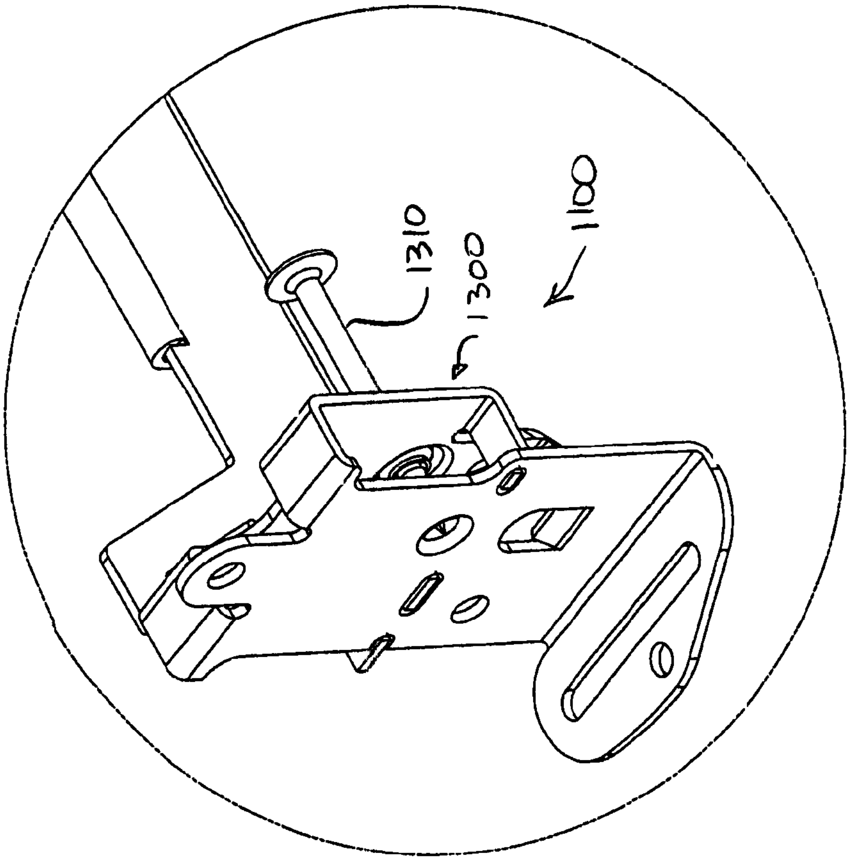

Turning now to FIG. 13, this figure illustrates, in a detail view, a mechanism 1300 of a hangar bar 1100 for mounting an exemplary lighting fixture 100 according to certain embodiments of the present invention. A nail 1310 retains the hangar bar 1100 in its mounted position when the hangar bar 1100 is attached to a joust, such as a parallel beam of a structure that supports the ceiling. Whereas FIG. 13A illustrates the full attachment mechanism 1300, FIG. 13B provides a cutaway view to show additional, otherwise-hidden details.

Figure 14:
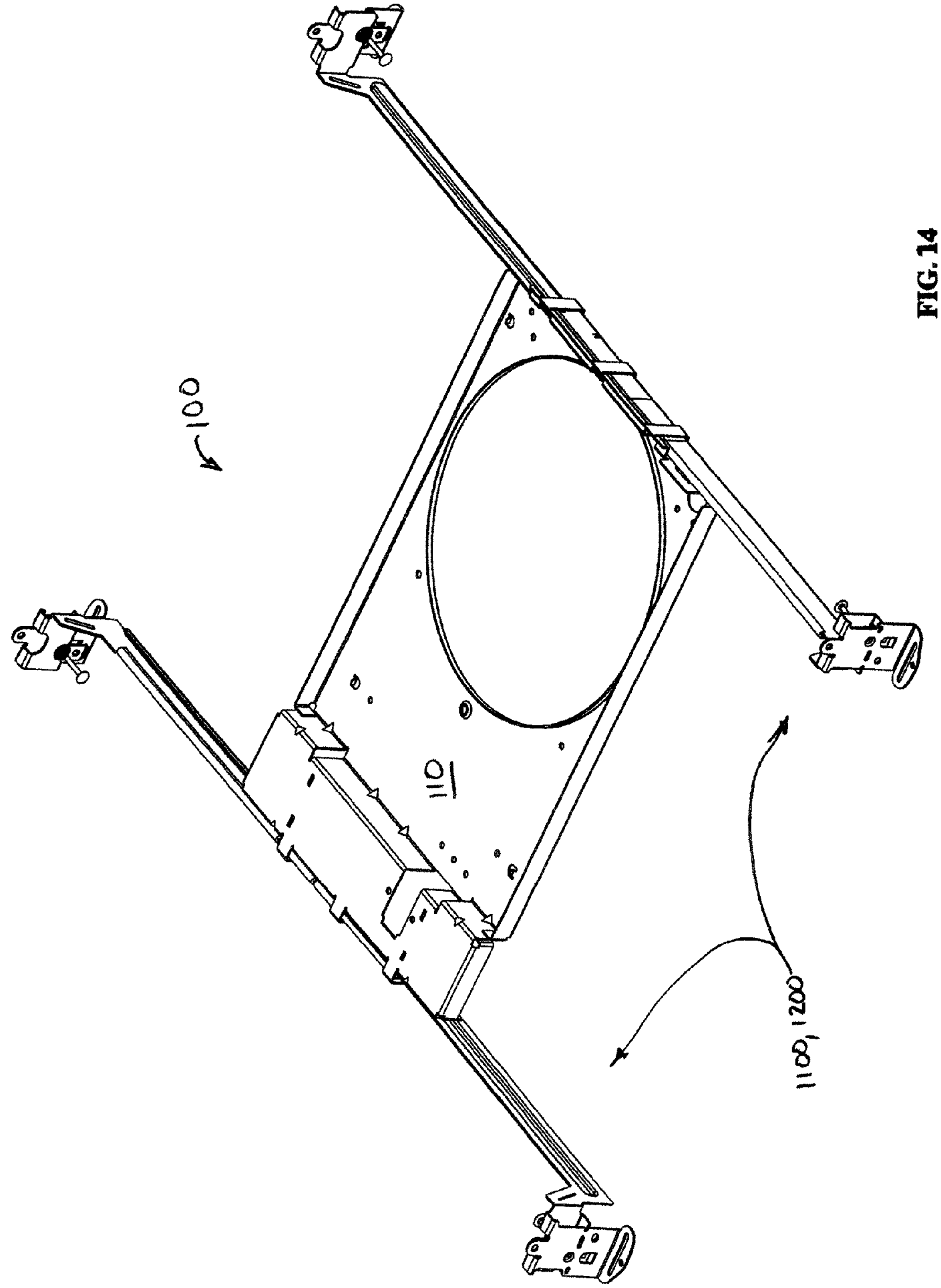
FIG. 14 is a line drawing of a lighting fixture's platform mounted to a pair of hangar bars that are set in an expanded state in accordance with an exemplary embodiment of the present invention.

Turning now to FIG. 14, this figure illustrates an exemplary lighting fixture's platform 110 mounted to a pair of hangar bars 1100, 1200 that are set in an expanded state according to certain embodiments of the present invention. As discussed above, in an exemplary embodiment, the platform 110 can be a plaster frame. In the illustrated configuration, the hangar bars 1100, 1200 are set for attaching to two joists that are separated an essentially maximum distance from one another. That is the hangar bars 1100, 1200 are fully extended to accommodate jousts that are widely spaced from one another.

Figure 15:
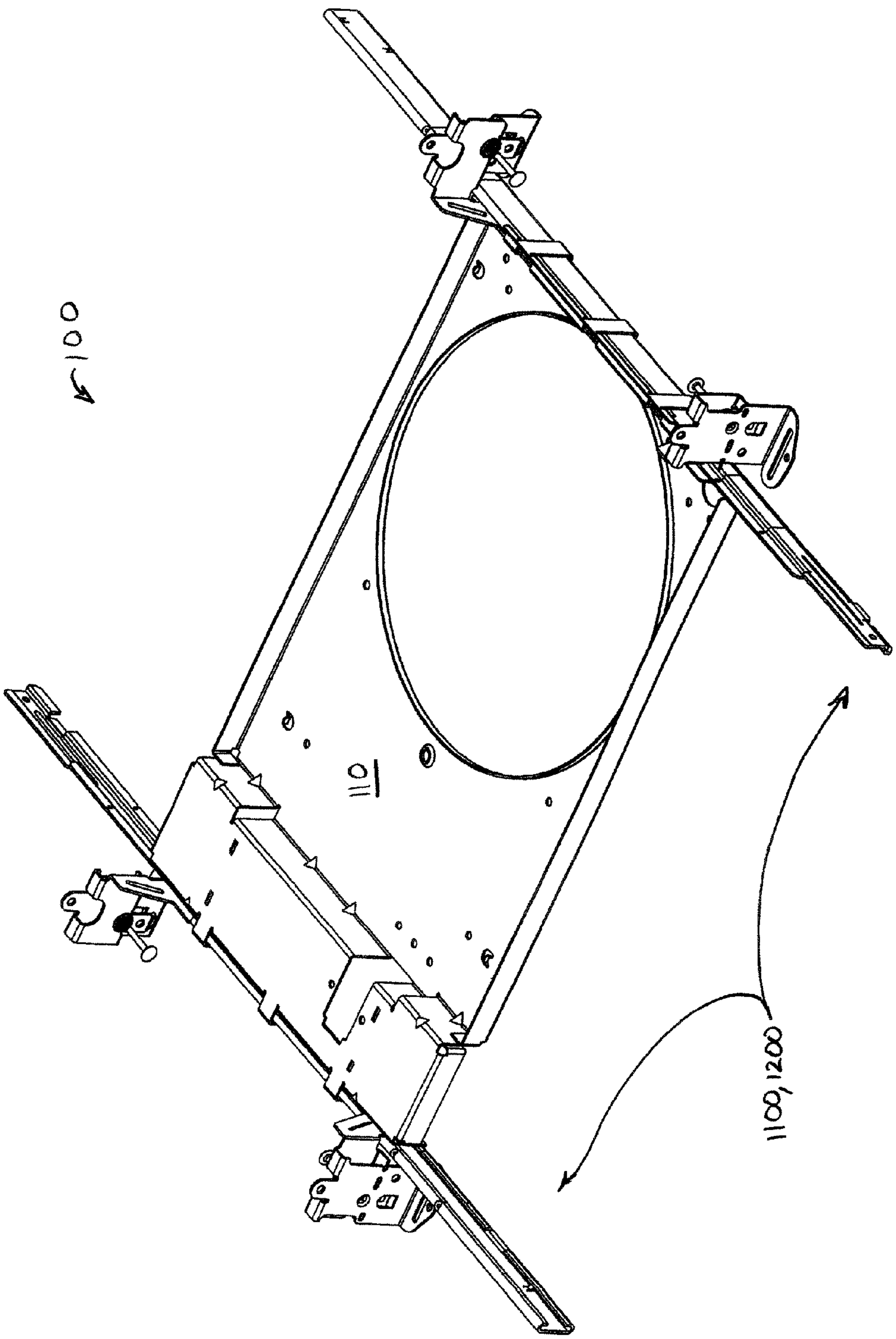
FIG. 15 is a line drawing of a lighting fixture's platform mounted to a pair of hangar bars that are set in a contracted state in accordance with an exemplary embodiment of the present invention.

Turning now to FIG. 15, this figure illustrates an exemplary lighting fixture's platform 110 mounted to a pair of hangar bars 1100, 1200 that are set in a contracted state according to certain embodiments of the present invention. In the illustrated configuration, the hangar bars 1100, 1200 are set for attaching to two joists that are separated a minimum distance from one another. That is the hangar bars 1100, 1200 are fully contracted to accommodate jousts that are close to one another.

The expanded and contracted hangar bar configurations of FIGS. 14 and 15 describe an exemplary range of separations between joists to which the lighting fixture 100 can be readily attached.

Figure 16A:
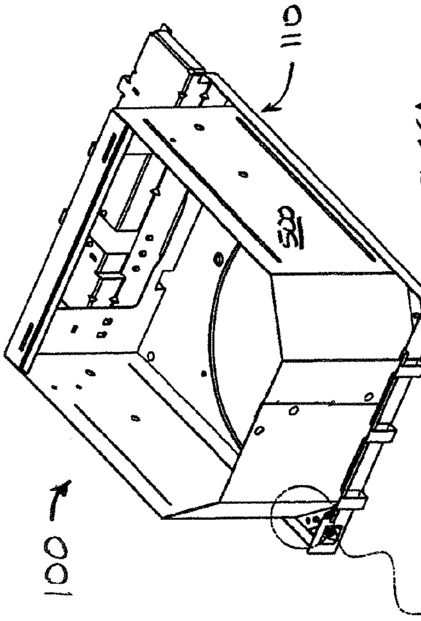
FIGS. 16A, 16B, and 16C, collectively
Figure 16B:
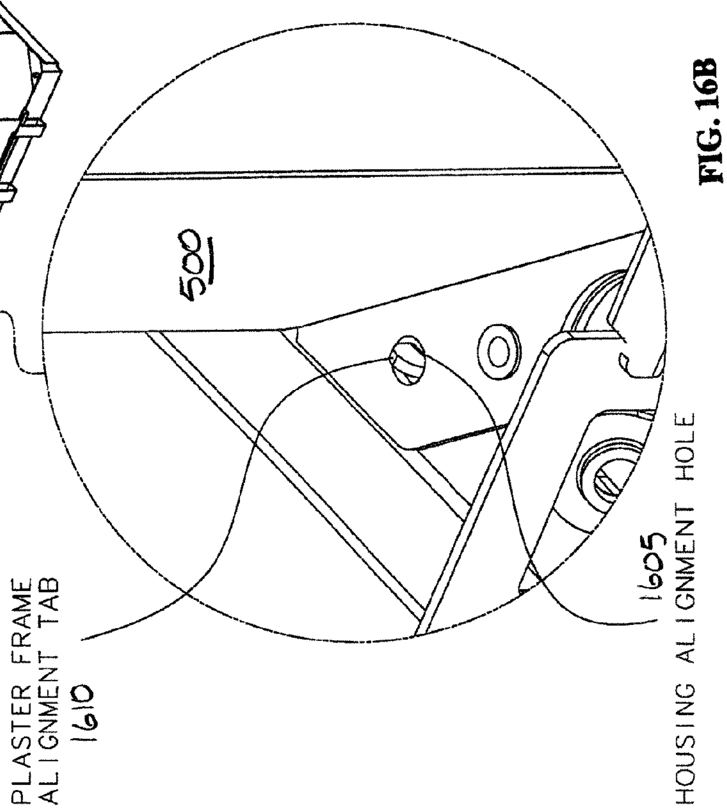
Figure 16C:
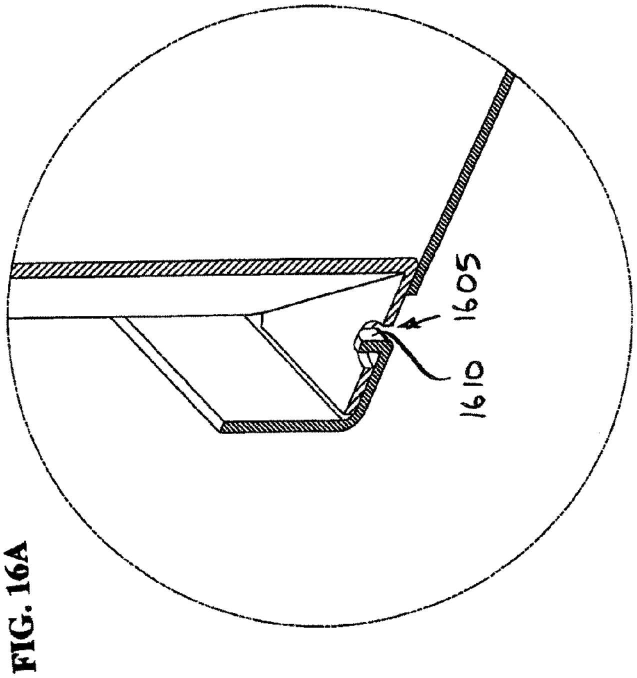

Turning now to FIG. 16, this figure illustrates features 1605, 1610 for aligning a platform 110 to an enclosure 500 of an exemplary lighting fixture 100 according to certain embodiments of the present invention. Inserting the alignment tab 1610 into the housing alignment hole 1605 facilitates proper mounting of the enclosure 500 on the lighting fixture platform 110.

Turning now to FIG. 17, this figure illustrates a portion of an exemplary lighting fixture 100 comprising a lamp support mechanism 1700 attached to a square collar 115 according to certain embodiments of the present invention. As discussed above with reference to FIG. 4, among other places, the collar 115 provides significant flexibility and alignment ease as it mates with the lamp support mechanism 1700.

The term "lamp support mechanism," as used herein, generally refers to one or more members or a structure that supports a light source, a lamp, a light bulb socket, a light module, and/or one or more associated optics or optical elements.

With the lamp support mechanism 1700 attached directly to the square collar 115, the lamp support mechanism 1700 maintains a fixed spatial relationship between the optical elements and the bottom portion (e.g. lower shielding cone or trim) of the lighting fixture 100 regardless of the ceiling thickness. Independent of the ceiling thickness, the reflector 1710 and the associated bulb (not explicitly shown in FIG. 17) are positioned a set distance above the interface between the ceiling and the interior of the room. FIGS. 18 and 19 describe adjustments of this feature in more detail.

Turning now to FIG. 18, this figure illustrates, in cross sectional view, an exemplary lighting fixture 100 mounted to a ceiling 1800 that is nominally ½ (one-half) inch thick (about 12.7 millimeters) 1805 according to certain embodiments of the present invention.

In the illustrated exemplary installation, the bulb 1820 and the associated socket 1825 are positioned 4 inches (about 102 millimeters) 1810 above the lower surface of the ceiling 1800 that faces the room 1850. In this orientation, the light source and associated reflectors are recessed within the ceiling 4 inches (about 102 millimeters). The lamp 1820 and reflector 1710 output light through the aperture 120 and into the room 1850.

While the room 1850 typically has four walls, in some exemplary embodiments, the room 1850 may have fewer or perhaps no walls. For example, the lighting fixture 100 might be mounted to the ceiling 1800 of an awning or a gazebo that lacks any traditional walls.

The mechanism 405 facilitates adjusting the lighting fixture 100 according to the specific ceiling thickness 1805 of the installation. That adjustment mechanism 405 comprises a slot 1860, the length of which establishes the amount of adjustment range, and a fastener 1865 that is disposed through the slot 1860. Tightening the fastener 1865 sets the lighting fixture 100 to a specific ceiling thickness 1805, while loosing the fastener 1865 enables thickness adjustments.

In connection with adjusting the lighting fixture 100 for various ceiling thicknesses 1805, the lighting fixture 100 clamps onto or embraces the ceiling 1800. More specifically, the surface 1870 and the surface 1875 press together onto the ceiling 1800. Thus, the members 1870 and 1875 can be viewed as jaws that apply at least some compression force to the cross section of the ceiling 1800 in an exemplary embodiment.

Turning now to FIG. 19, this figure illustrates, in cross sectional view, an exemplary lighting fixture 100 mounted to a ceiling 1900 that is nominally 1 inch thick (about 25.4 millimeters) 1905 according to certain embodiments of the present invention.

As illustrated in FIG. 19, the distance 1810 between the center line of the light source 1820 and the inner surface 1840 of the ceiling 1900 remains approximately 4 inches (about 102 millimeters) despite the increased ceiling thickness 1905 relative to the ceiling 1800 of FIG. 18. In other words, the vertical translation provided by the adjustment mechanism 405 provides a uniform recess depth 1810 regardless of the ceiling thickness 1900. Explained another way, the lighting fixture 100 accordions to compensate for variations in ceiling thickness 1805, 1905.

Turning now to FIG. 20, this figure illustrates, in cross sectional view, an exemplary lighting fixture 100 mounted to a ceiling 1800/1900 with varying ceiling thickness 1805, 1905 according to certain embodiments of the present invention.

In addition to being able to accommodate two different ceiling thicknesses 1805, 1905, the illustrated embodiment comprises a facility to adjust the angle of the light emitted from the fixture's aperture 120. As will be discussed in further detail below with reference to FIGS. 27, 28, 29, and 30, the adjustment tilts the axis of illumination 2000, 2005, 2010. Throughout the range of angular adjustments, the axis of illumination 2000, 2005, 2010 extends through the aperture 120.

FIG. 20 can be viewed as describing an exemplary embodiment that comprises consistent translating center beam optics throughout a range of ceiling thicknesses 1805, 1905. Thus, a lamp support mechanism 1700 with a directional lamp 2020 attached thereto maintains a prescribed optical orientation regardless of ceiling thickness 1805, 1905.

Figure 21B:
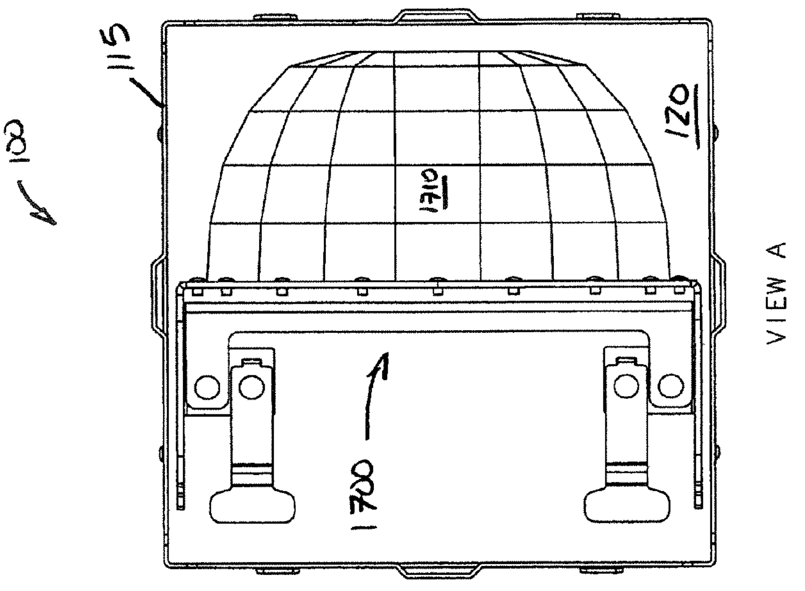
FIGS. 21A and 21B, collectively
Figure 21A:
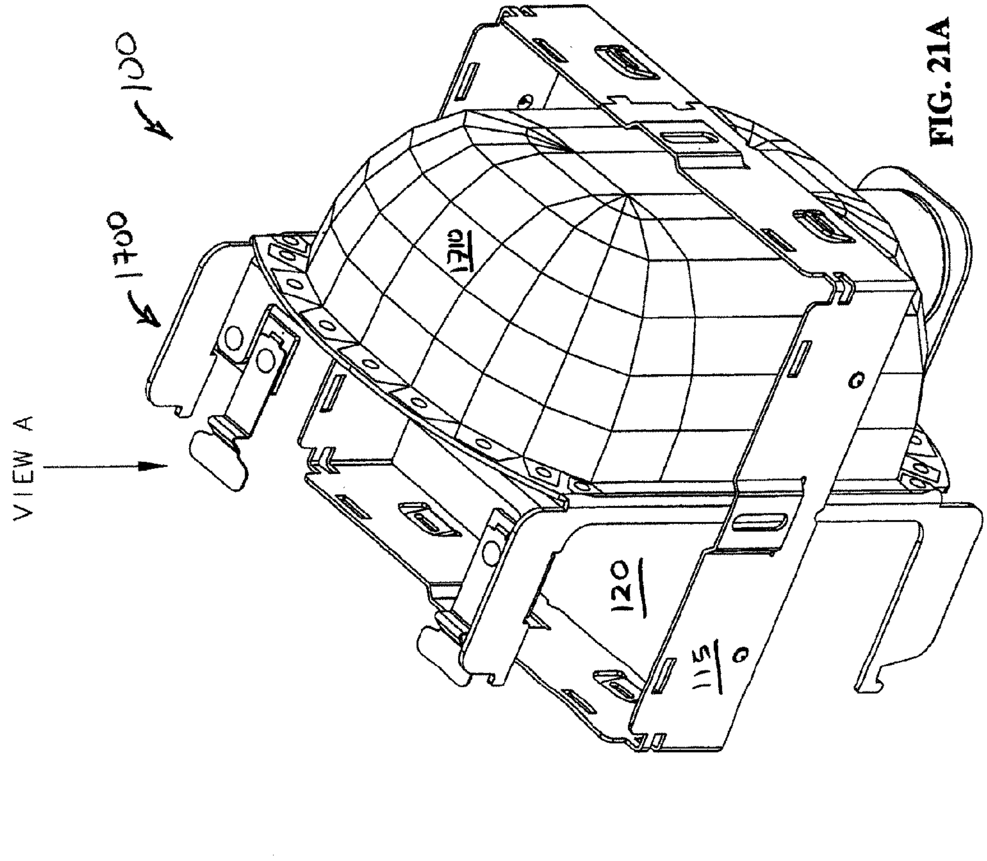

Turning now to FIG. 21, this figure illustrates a portion of an exemplary lighting fixture 100, specifically a lamp support mechanism 1700 that is removable through the lighting fixture's aperture 120 according to certain embodiments of the present invention. In other words, the lighting fixture's modules are sized so that they can pass through the aperture 120. Accordingly, a user can service the lighting fixture 100 from within a room 1850, thereby avoiding a trip into the attic for many routine service procedures.

Figure 22:
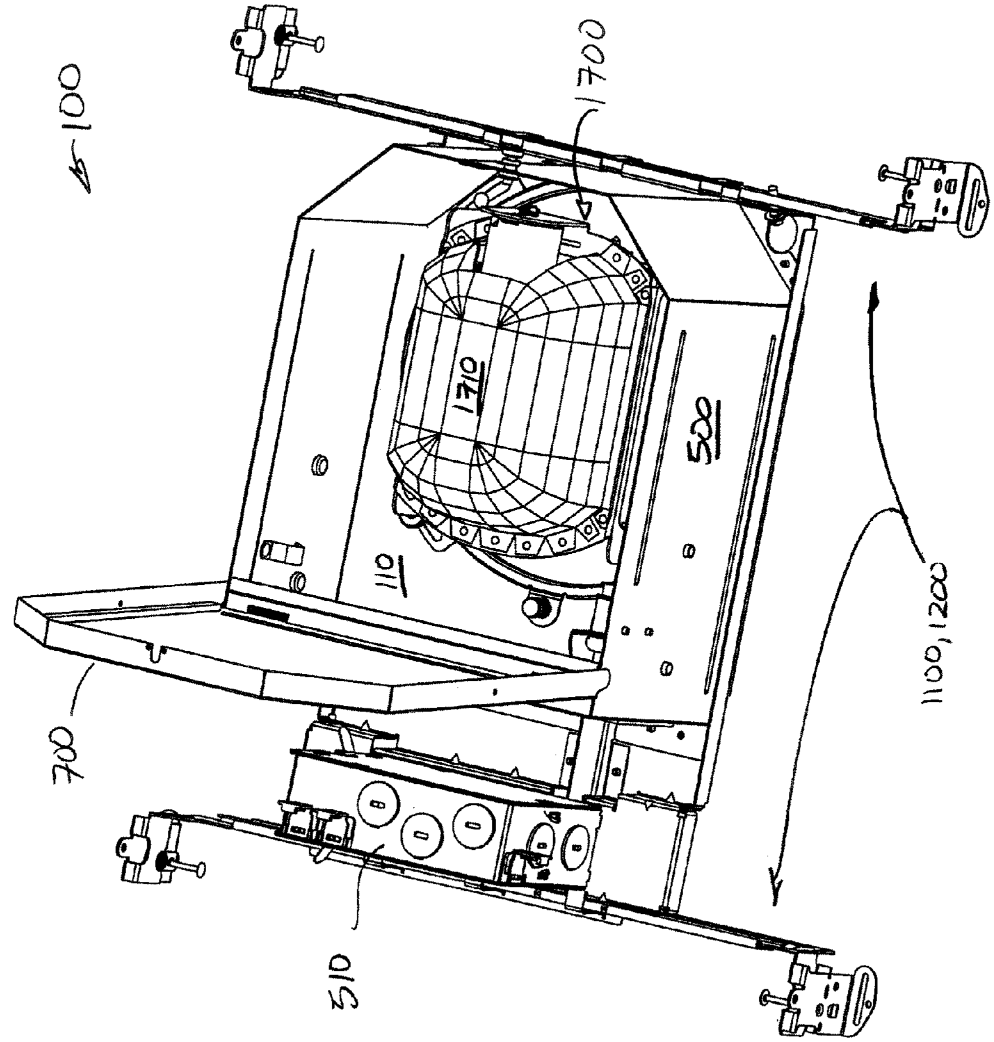
FIG. 22 is a line drawing of a lighting fixture comprising a housing, configured for applications other than direct contact with attic insulation, and an associated lamp support mechanism that is removable through a top access door of the housing in accordance with an exemplary embodiment of the present invention.

Turning now to FIG. 22, this figure illustrates an exemplary lighting fixture 100 comprising a housing 500, configured for applications other than direct contact with attic insulation, and an associated lamp support mechanism 1710 that is removable through a top access door 700 of the housing 500 according to certain embodiments of the present invention.

As discussed in further detail below with reference to FIG. 35, certain exemplary embodiments of the lighting fixture 100 are suited to and/or rated for installations in which insulation directly contacts the lighting housing or enclosure 500. With this rating, the lighting fixture 100 can be safely installed in a ceiling 1800, 1900 with fiberglass insulation touching the platform 110 and/or the housing/enclosure 500, for example. So rated, the lighting fixture 100 and the housing/enclosure 500 can be considered insulation contact ("IC") rated or simply as an IC lighting fixture.

FIG. 22 illustrates an exemplary embodiment that may lack the IC rating, wherein the door 700 is large enough to facilitate removal of the lamp support mechanism, for example into an attic or crawl space.

Figure 23:
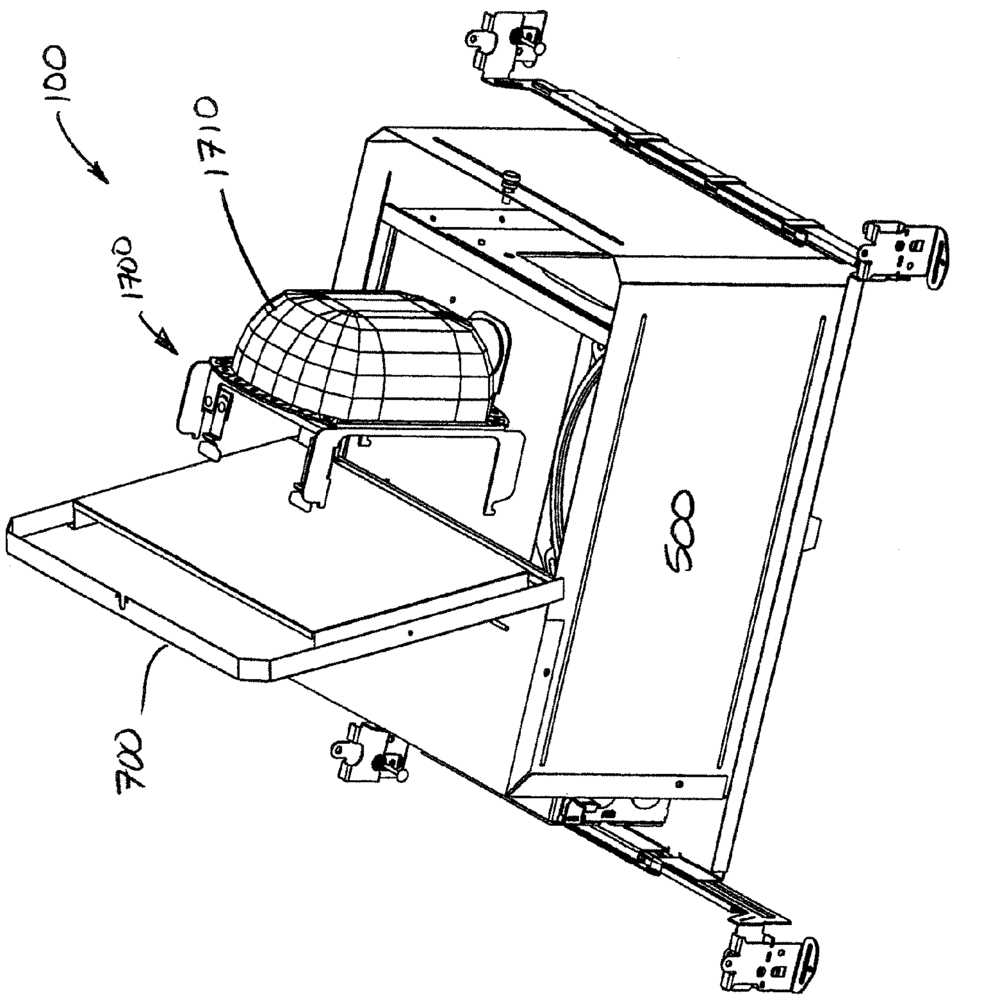
FIG. 23 is a line drawing of a lighting fixture comprising a housing suited for direct contact with attic insulation and an associated lamp support mechanism that is removable through a top access door of the housing in accordance with an exemplary embodiment of the present invention.

Turning now to FIG. 23, this figure illustrates an exemplary lighting fixture 100 comprising a housing 500 suited for direct contact with attic insulation and an associated lamp support mechanism 1700 that is removable through a top access door 700 of the housing 500 according to certain embodiments of the present invention. In other words, the exemplary embodiment of FIG. 23 is IC rated and has a door 700 that is large enough so that a user may lift the lamp support mechanism 1700 into an attic or crawl space above a ceiling 1800, 1900.

Figure 24A:
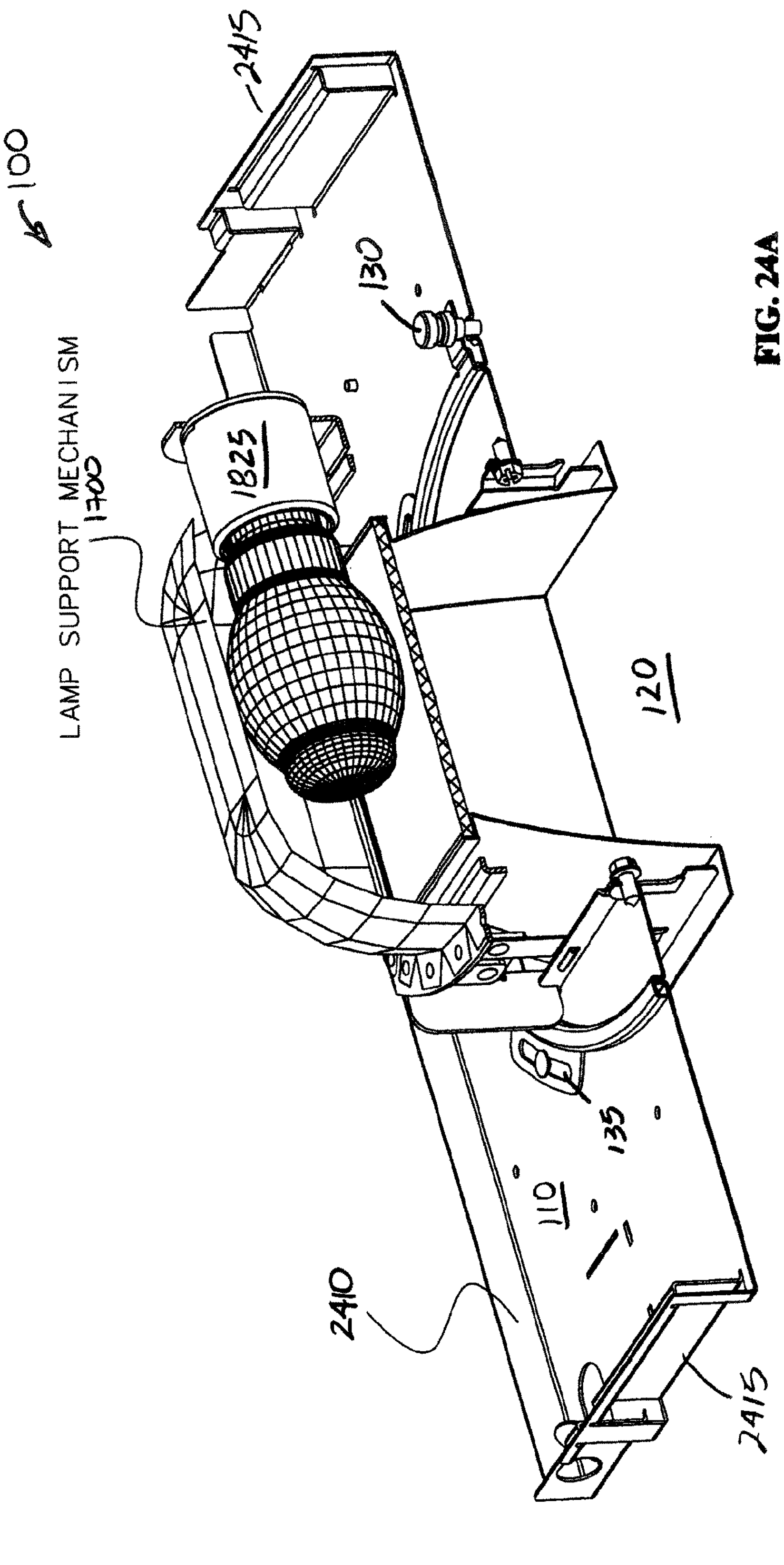
FIG. 24A a line drawing, in a cut-away view, of a lighting fixture comprising a lamp support mechanism installed parallel to an edge of the fixture's platform in accordance with an exemplary embodiment of the present invention.
Figure 24B:
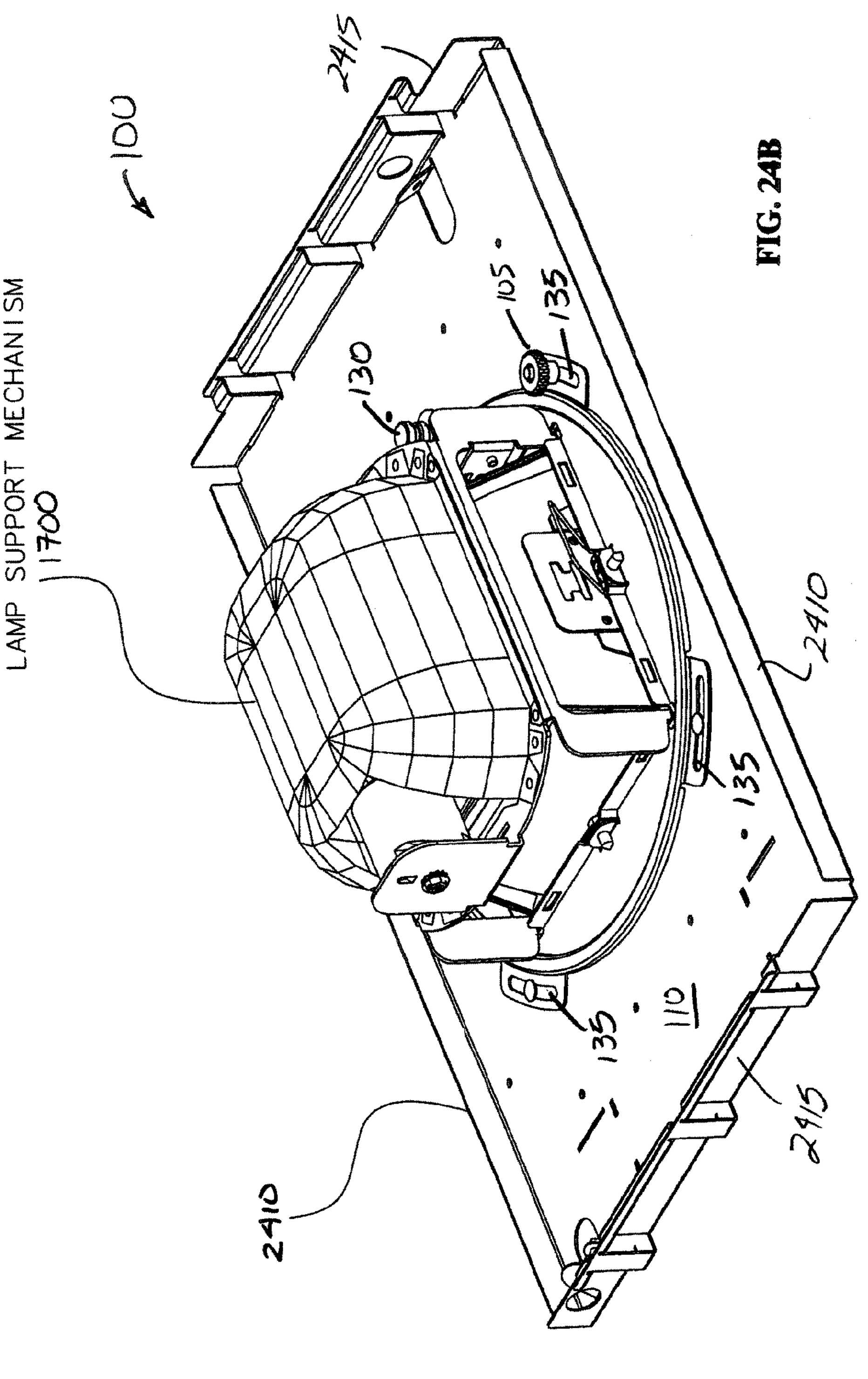
FIG. 24B a line drawing of a lighting fixture comprising a lamp support mechanism installed parallel to an edge of the fixture's platform in accordance with an exemplary embodiment of the present invention.

Turning now to FIGS. 24A and 24B, these figures illustrate an exemplary lighting fixture 100 comprising a lamp support mechanism 1700 installed parallel to an edge of the fixture's platform 110 according to certain embodiments of the present invention. FIG. 24A provides a cut-away view, while FIG. 24B provides a perspective view.

Figure 25A:
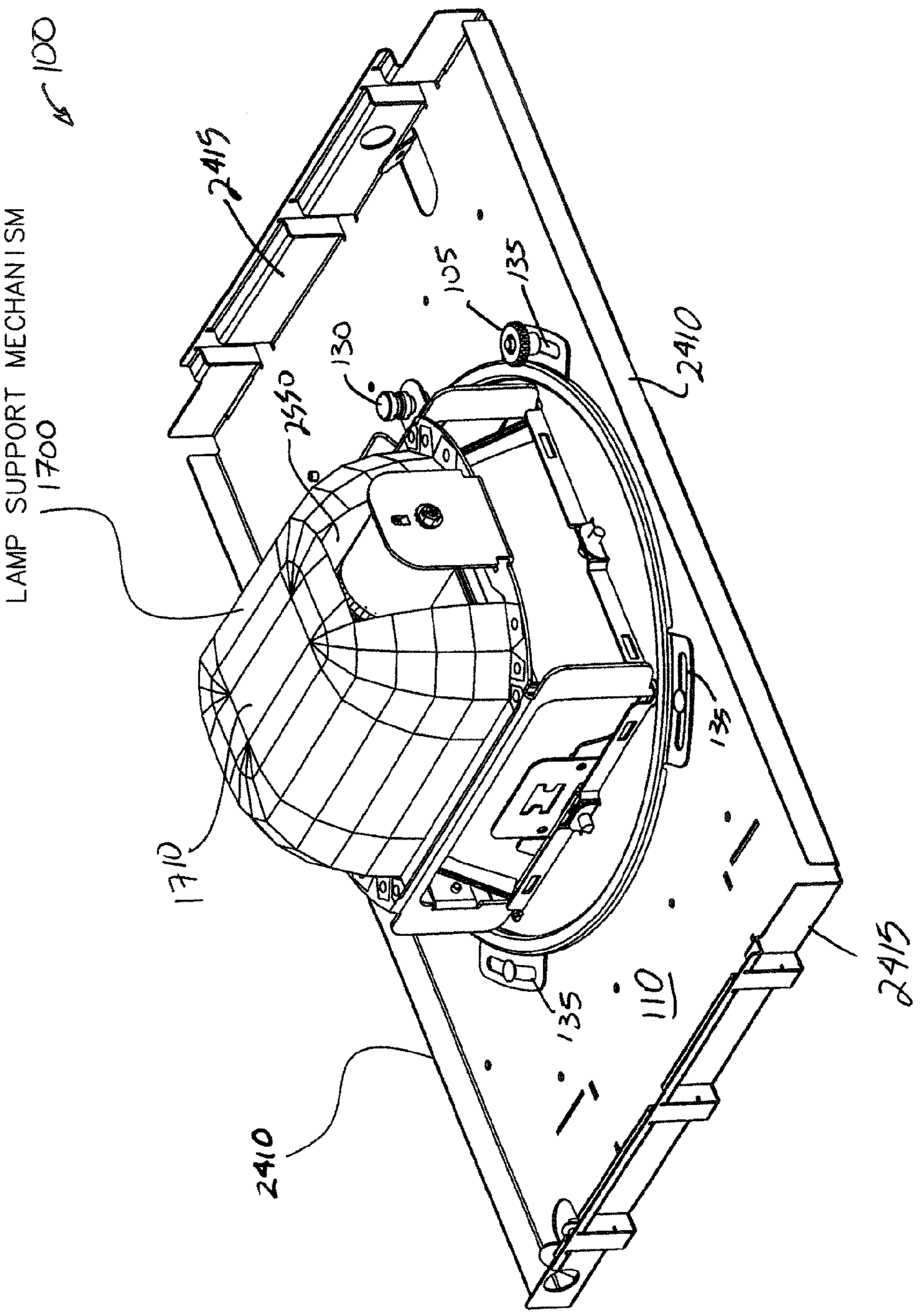
FIG. 25A is a line drawing of a lighting fixture comprising a lamp support mechanism installed perpendicular to an edge of the fixture's platform in accordance with an exemplary embodiment of the present invention.
Figure 25B:
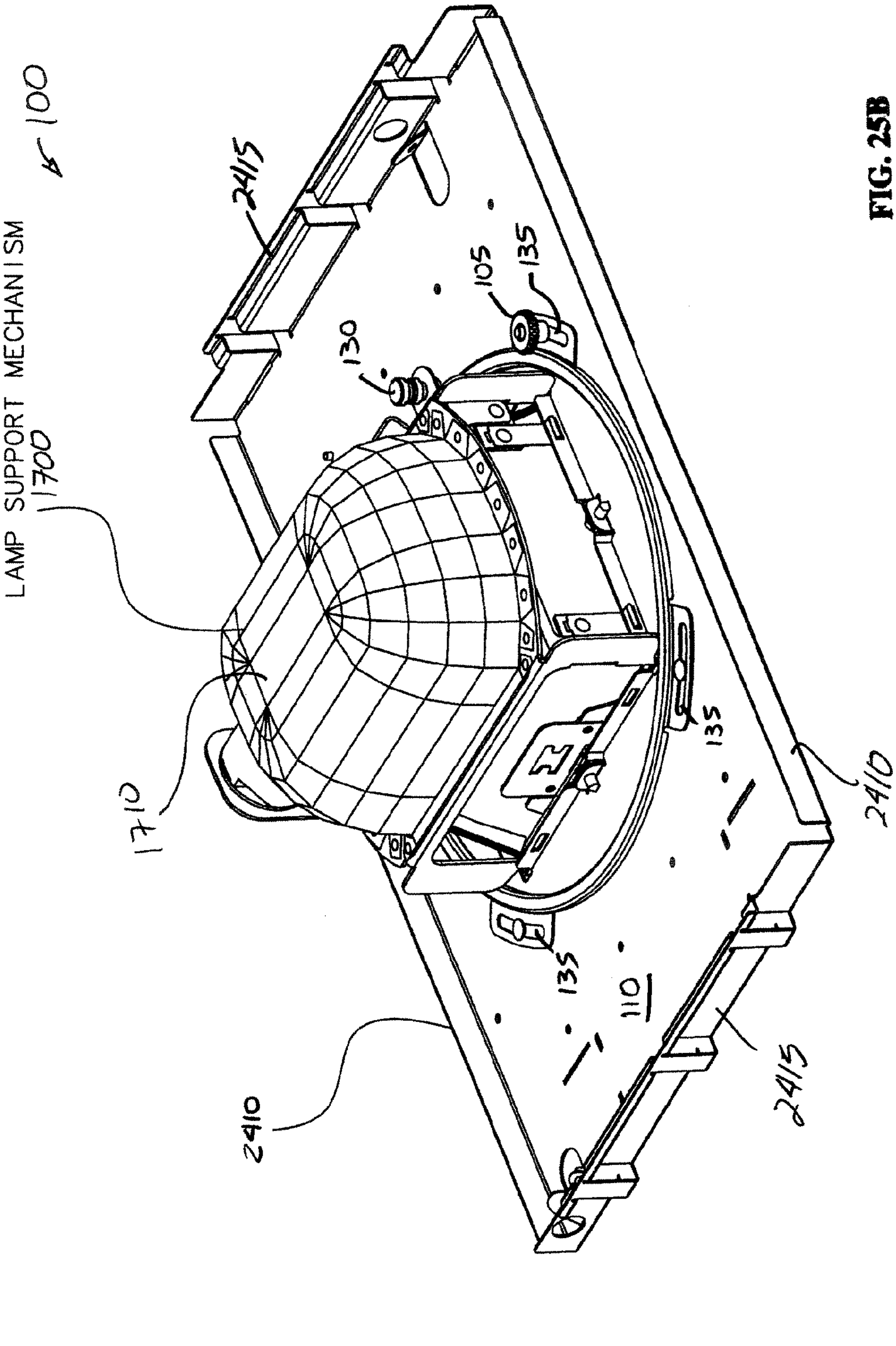
FIG. 25B is a line drawing of a lighting fixture comprising a lamp support mechanism installed perpendicular to an edge of the fixture's platform in accordance with an exemplary embodiment of the present invention.

The exemplary lighting fixture 100 of FIGS. 24A and 25B, collectively FIG. 24, comprises a platform 110. As discussed above, that illustrated platform 110 can be viewed as a plaster frame or can be an exemplary embodiment of a plate, a chassis, or a frame of the fixture 110. The exemplary platform 110 is generally rectangular with one side 2410 being longer than its adjoining side 2415 and the two sides 2410, 2415 meeting in a generally right angle.

The lamp support mechanism 1700 is oriented so that the lamp 1820 and the associated socket 1825 are generally parallel to the longer side 2410 of the platform 110. In an exemplary embodiment, the slots 135, home position screw 130, and locking screw 105 provide a rotational adjustment relative to the illustrated home position. As discussed above with reference to FIGS. 1 and 2, among other places, the rotational adjustment can rotate the lamp support mechanism 1700 relative to the platform 110. In exemplary embodiments, the lamp support mechanism 1700 and aperture 120 can be rotated 5, 10, 15, or 20 degrees clockwise and counterclockwise, for example.

Turning now to FIGS. 25A and 25 B, these figures illustrate an exemplary lighting fixture 100 comprising a lamp support mechanism 1700 installed perpendicular to an edge 2410 of the fixture's platform 110 according to certain embodiments of the present invention. The embodiment of FIG. 25A provides an opening 2550 in the reflector 1710, whereas the reflector 1710 of the FIG. 25B embodiment is essentially closed.

In the illustrated embodiments of FIGS. 25A and 25B, collectively FIG. 25, the lamp support mechanism 1700 has a home position that is rotated 90 degrees from the embodiment of FIG. 24. Thus, the lighting fixture's rotational adjustment facilitates orienting the lamp support mechanism within a range of angles from the illustrated configuration. That range can comprise 5, 10, 15, 20, 25, or 30 degrees, for example.

Figures 26A, 26B, 26C:
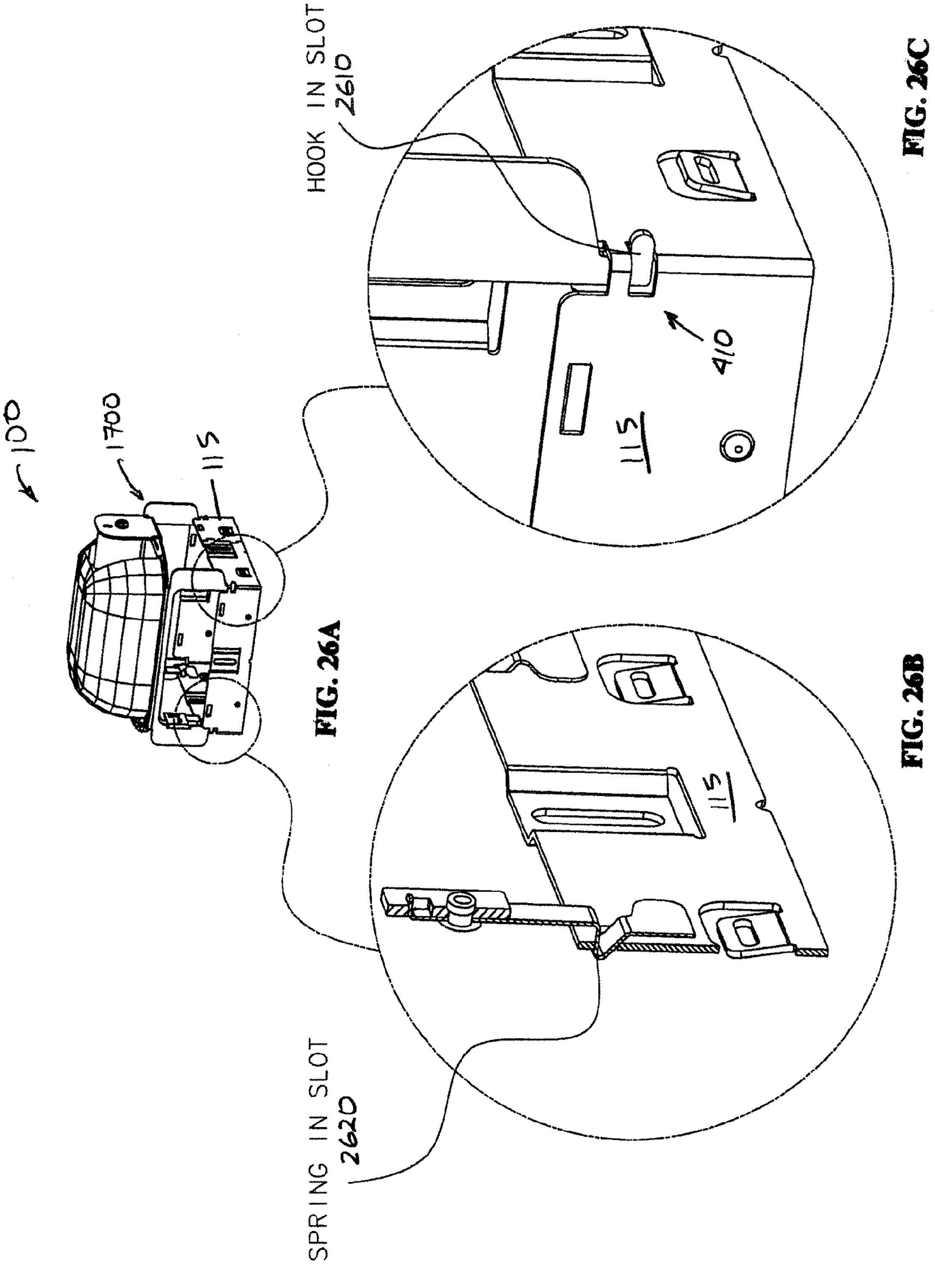
FIGS. 26A, 26B, and 26C, collectively

Turning now to FIG. 26, this figure illustrates a portion of an exemplary lighting fixture 100 comprising a lamp support mechanism 1700 attached to a square collar 115 according to certain embodiments of the present invention. As discussed above with reference to FIG. 4, the lighting support mechanism 1700 readily attaches and detaches from the square collar 115.

The lamp support mechanism 1700 attaches to the square collar 115 via a hook 2610 or a tab that inserts in a slot 410 of the collar 115. A spring member 2620 inserts in another slot 410. The spring member 2620 and hook 2610 thereby apply retaining pressure so that the lamp support mechanism 1700 is detachably mounted on the square collar 115. In other words, the lamp support mechanism 1700 is secured to the square collar 115 by two hooks 2610, two springs 2620, and corresponding notches 410 in the square collar 115.

Turning now to FIGS. 27, 28, 29, and 30 a capability for tilting a light source 2740 of an exemplary lighting fixture 100 to provide an adjustable angle of illumination 2000, 2005, 2010 will be described in further detail. These figures describe the tilting adjustment discussed above with reference to FIG. 20, among other places.

Figure 27:
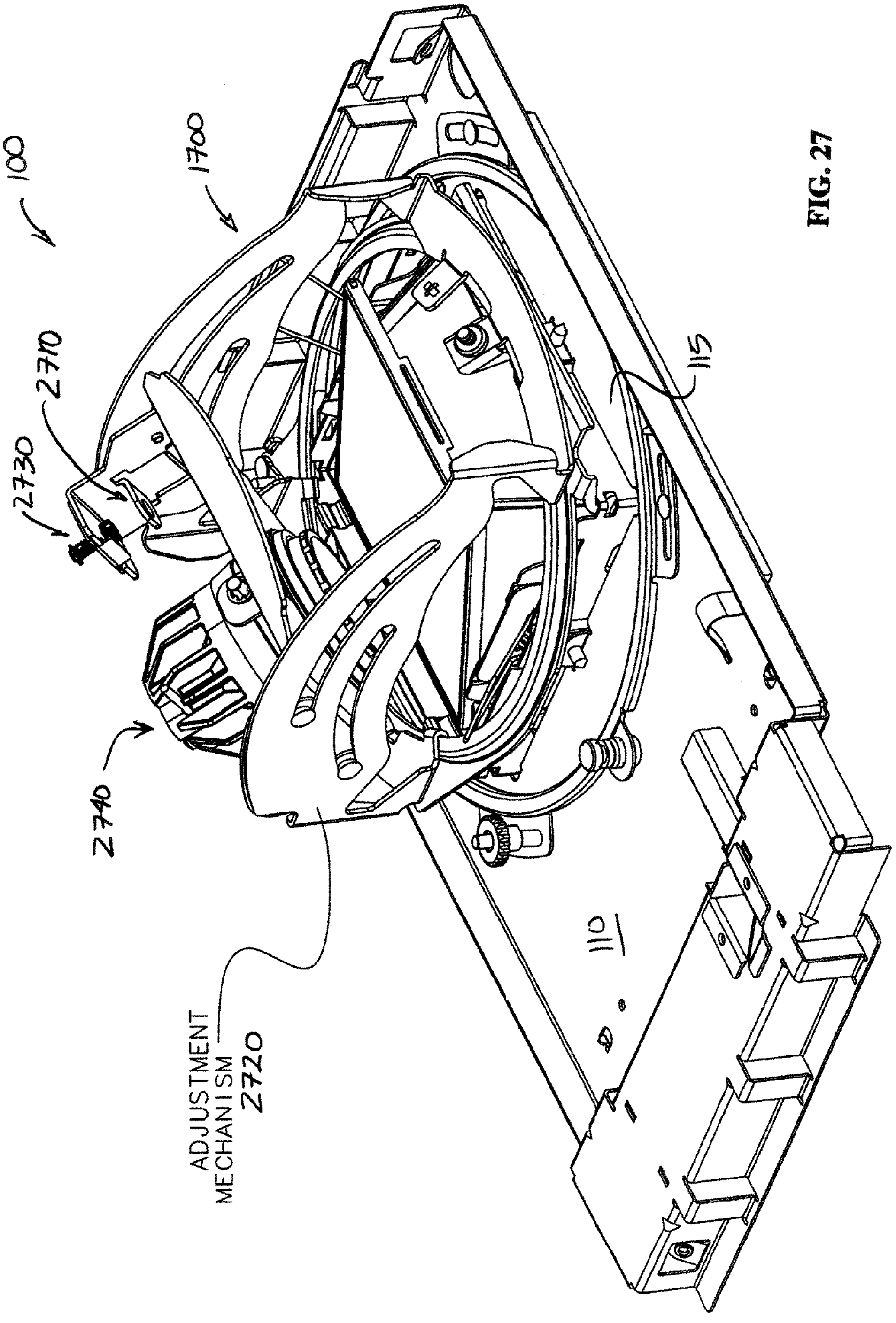
FIG. 27 is a line drawing of a lighting fixture comprising an adjustment mechanism and a lamp support mechanism attached to a square collar in accordance with an exemplary embodiment of the present invention.
Figure 28B:
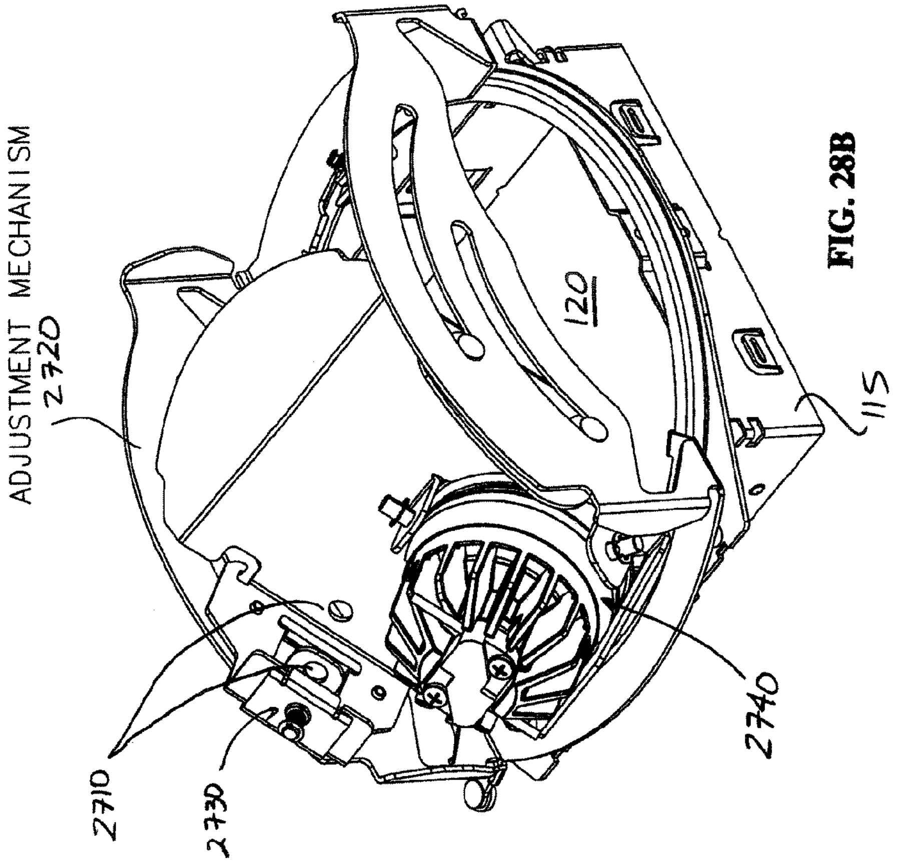
FIGS. 28A and 28B, collectively
Figure 28A:
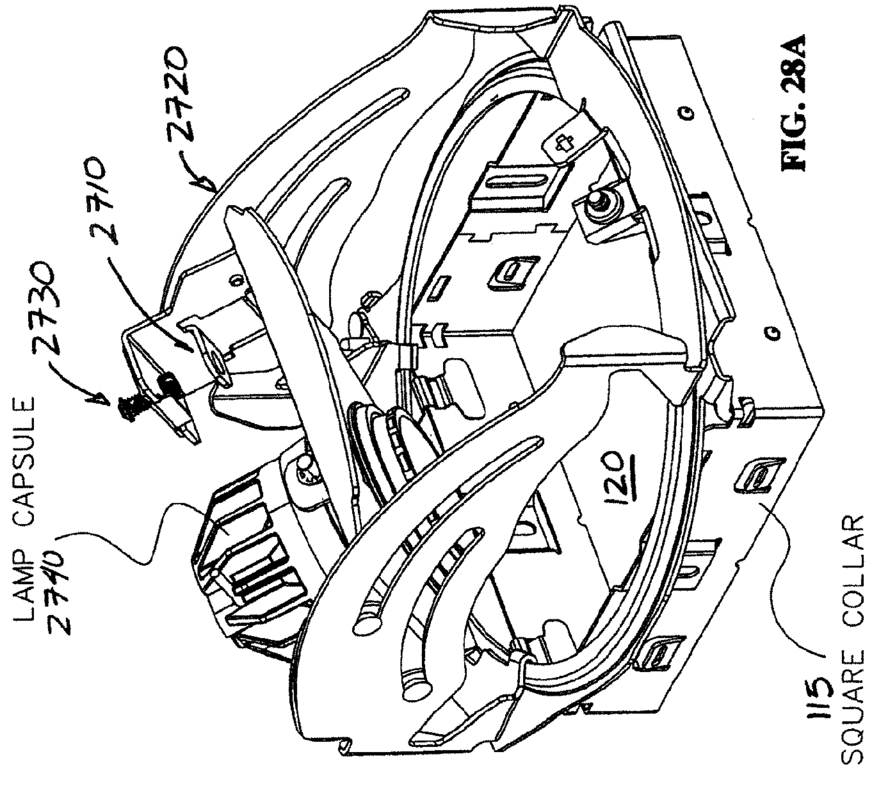
Figure 29B:
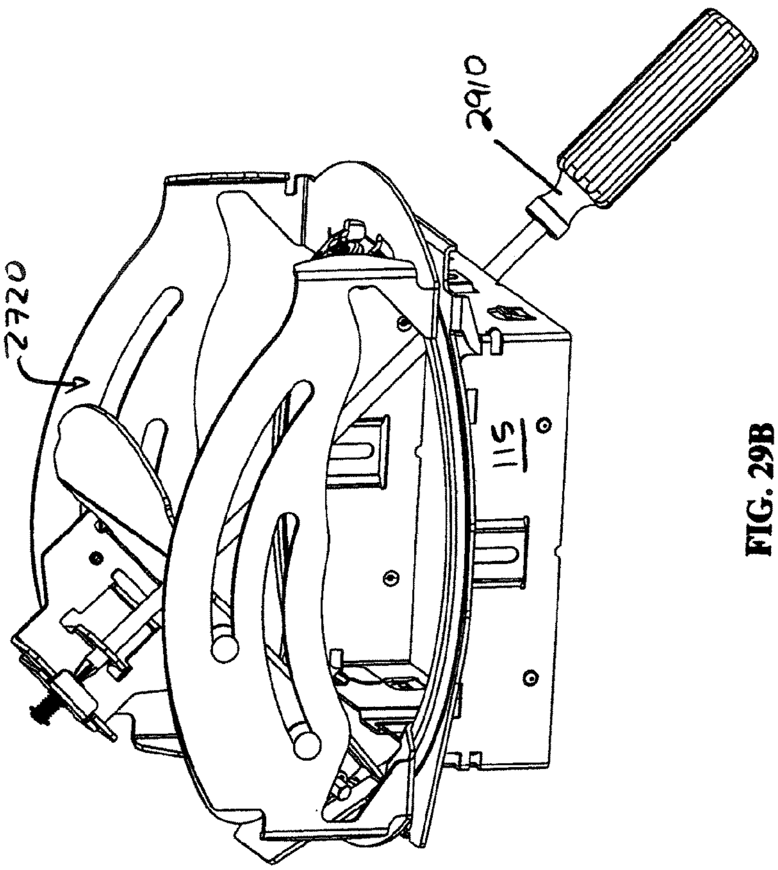
FIGS. 29A and 29B, collectively
Figure 29A:
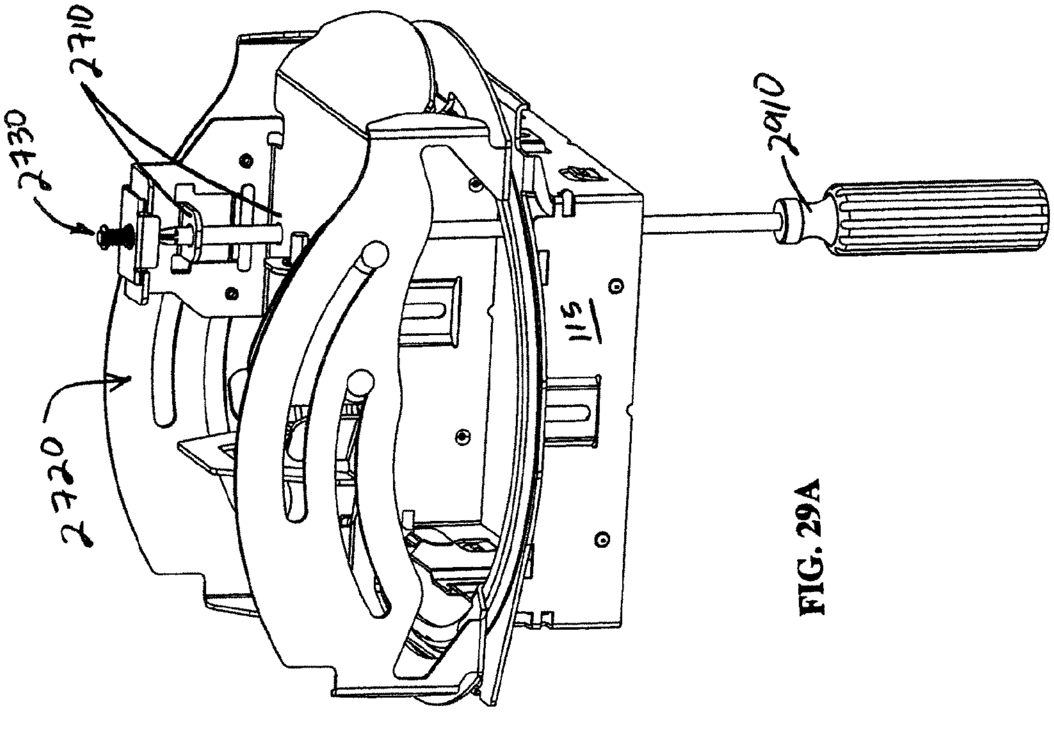
Figure 30:
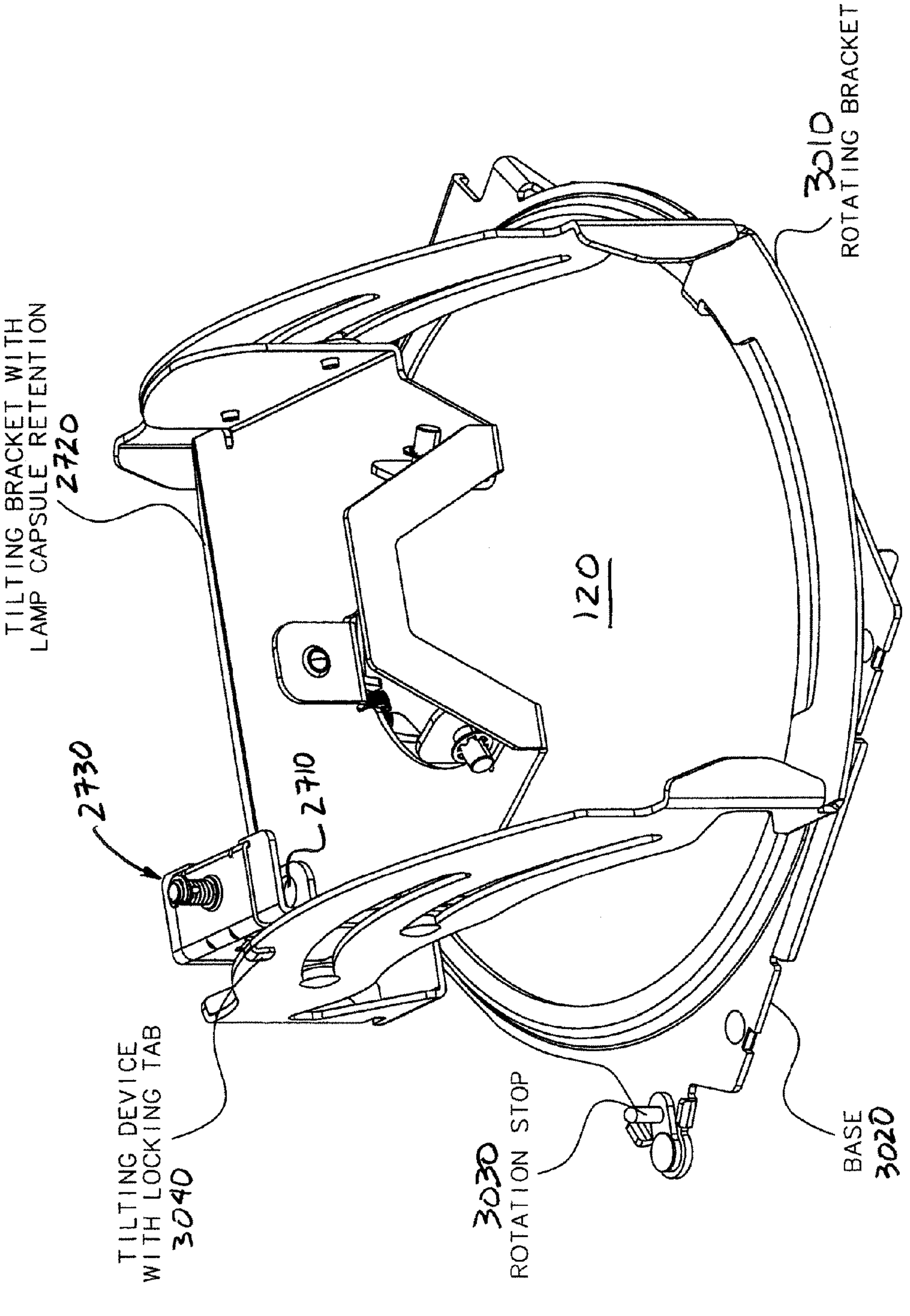
FIG. 30 is a line drawing of a portion of a lighting fixture comprising an adjustment mechanism for tilting a lamp of the fixture in accordance with an exemplary embodiment of the present invention.

FIG. 27 illustrates an exemplary lighting fixture 100 comprising an adjustment mechanism 2720 and a lamp support mechanism 1700 attached to a square collar 115 according to certain embodiments of the present invention. FIG. 28 illustrates a portion of an exemplary lighting fixture 100 comprising an adjustment mechanism 2720 for tilting a lamp 2740 of the fixture 100 according to certain embodiments of the present invention. FIG. 29 illustrates a portion of an exemplary lighting fixture 100 comprising an adjustment mechanism 2720 for tilting a lamp 2740 of the fixture 100 according to certain embodiments of the present invention. FIG. 30 illustrates a portion of an exemplary lighting fixture 100 comprising an adjustment mechanism 2720 for tilting a lamp 2740 of the fixture 100 according to certain embodiments of the present invention.

The illustrated mechanisms facilitate reorienting the lamp support mechanism 1700 for a desired effect and exchanging light sources 2740 in the field or following fixture installation. When the adjustment mechanism 2720 tilts the lamp 2740 (which can be a lamp capsule in exemplary embodiment) and likewise tilts the lighting fixture's axis of illumination or optical axis 2000, 2005, 2010. While not explicitly depicted in FIGS. 27, 28, 29, and 30, FIG. 20 shows the axis of illumination or optical axis 2000, 2005, 2010 at various tilt angles that the adjustment mechanism 2720 can achieve.

In an exemplary embodiment, the adjustment mechanism 2720 provides a tilting capability between 0 and 45 degrees and further provides 360 degrees of rotation via the rotating bracket 3010, which is attached to the base 3020. That 360 degrees of rotation is distinct from the rotational adjustment of the aperture 120 and square collar 115 discussed above with reference to FIGS. 1, 2, and 3. Rotating the square collar 115 and aperture 120, per FIGS. 1, 2, and 3, orients the portion of the lighting fixture 100 that is visible to a person in the room 1850. Meanwhile, the adjustment mechanism 2720 can rotate the illumination pattern that emanates from that aperture 120 while the aperture 120 remains in a fixed rotational position. The rotational stop 3030 limits the rotation to 360 degrees to avoid undesirably twist the electrical wires 515 that feed the lamp 2740.

The adjustment mechanism 2720 comprises a tilting device with locking tab 3040. The tilting device with locking tab 3040 comprises a pair of guiding holes 2710 that can receive a screwdriver 2910 and an adjustment screw 2730. In an exemplary embodiment, the holes 2710 and adjustment screw 2730 are components of the tilting device with locking tab 30400.

A user or installer, located in the room 1850, inserts a blade of the screwdriver 2910 through the holes 2710 so that the screwdriver's bit contacts a spring loaded adjustment screw 2730. The user can tilt screwdriver 2910 to implement tilting and rotation, as discussed above. After achieving a suitable tilt and rotation, the user tightens the adjustment screw 2730 to fix the lighting fixture 100 in that position. In other words, the screwdriver 2910 repositions the tilting plate 2720 and secures the desired orientation and corresponding pattern of illumination.

Turning now to FIGS. 31, 32, 33, and 34, these figures illustrate exemplary embodiments that facilitate installing the lighting fixture 100 so that the fixture 100 blends into the surface of the ceiling 1800, 1900 without a visible protruding rim.

Figure 31:
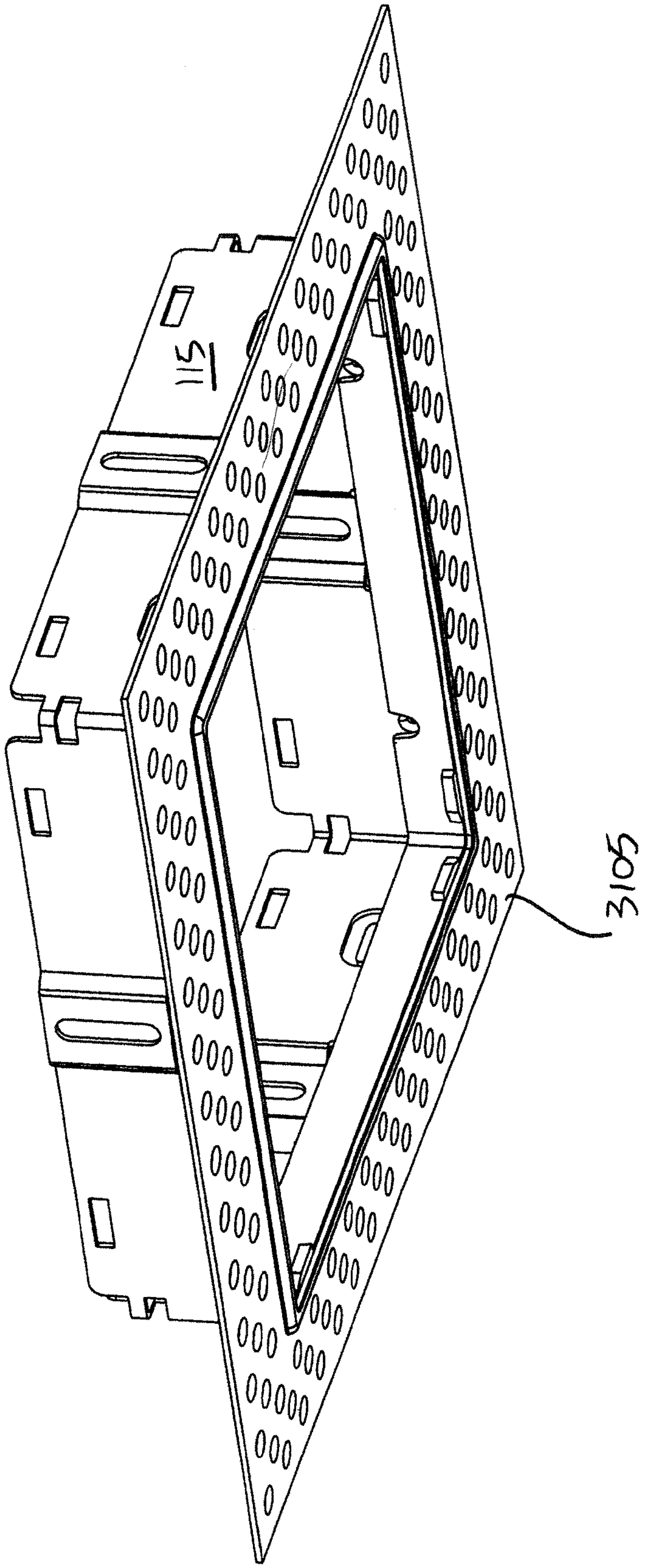
FIG. 31 is a line drawing of a portion of a lighting fixture comprising a frame that facilitates "rimless" installation, or installing the fixture in a ceiling of a room so that the frame's rim is essentially invisible to an occupant of the room, in accordance with an exemplary embodiment of the present invention.

FIG. 31 illustrates a portion of an exemplary lighting fixture 100 comprising a frame 3105 that facilitates "rimless" installation, or installing the fixture 100 in a ceiling 1800, 1900 of a room 1850 so that the frame's rim 3105 is essentially invisible to an occupant of the room 1850, according to certain embodiments of the present invention. That rim 3105 can be embedded in ceiling material and thus hidden from view.

Figure 32:
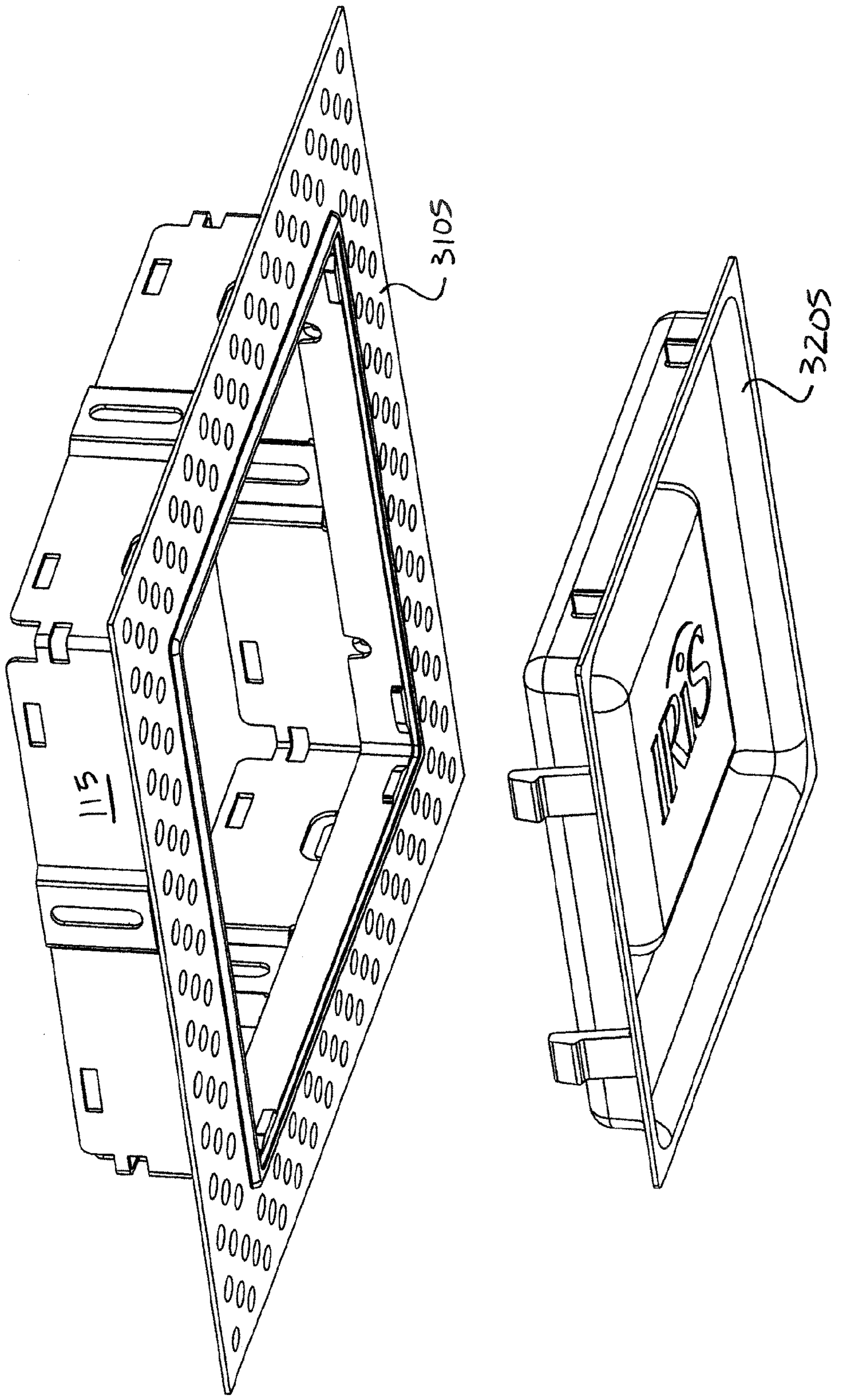
FIG. 32 is a line drawing of a portion of a lighting fixture configured for rimless installation wherein a protective cover is positioned for insertion into an aperture of the lighting fixture in accordance with an exemplary embodiment of the present invention.
Figures 33, 33A, 33B, 33C:
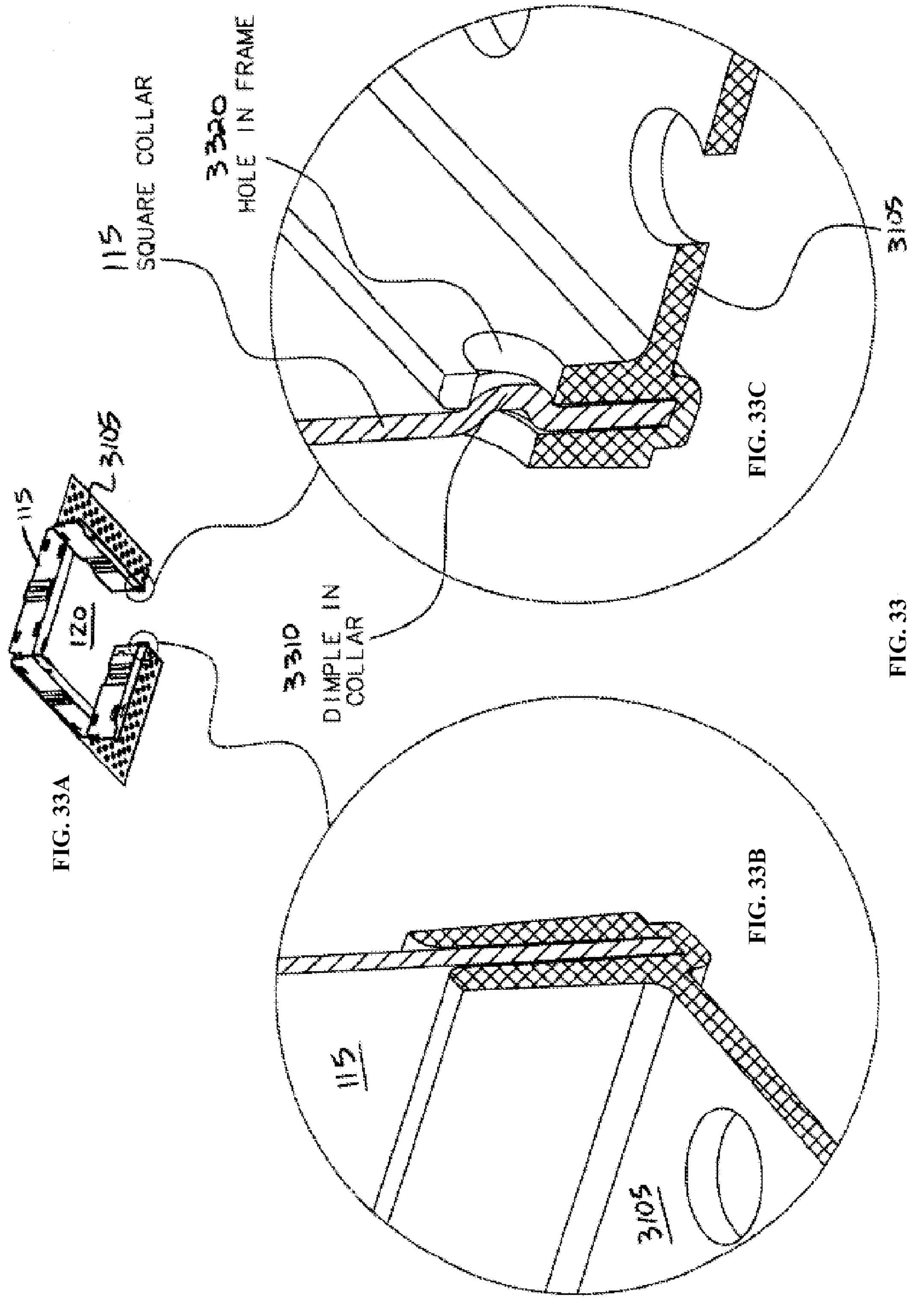
FIGS. 33A, 33B, and 33C, collectively
FIG. 33, are line drawings of a portion of a lighting fixture configured for rimless installation and detailing an attachment of a square collar to the fixture's frame in accordance with an exemplary embodiment of the present invention.
Figure 34:
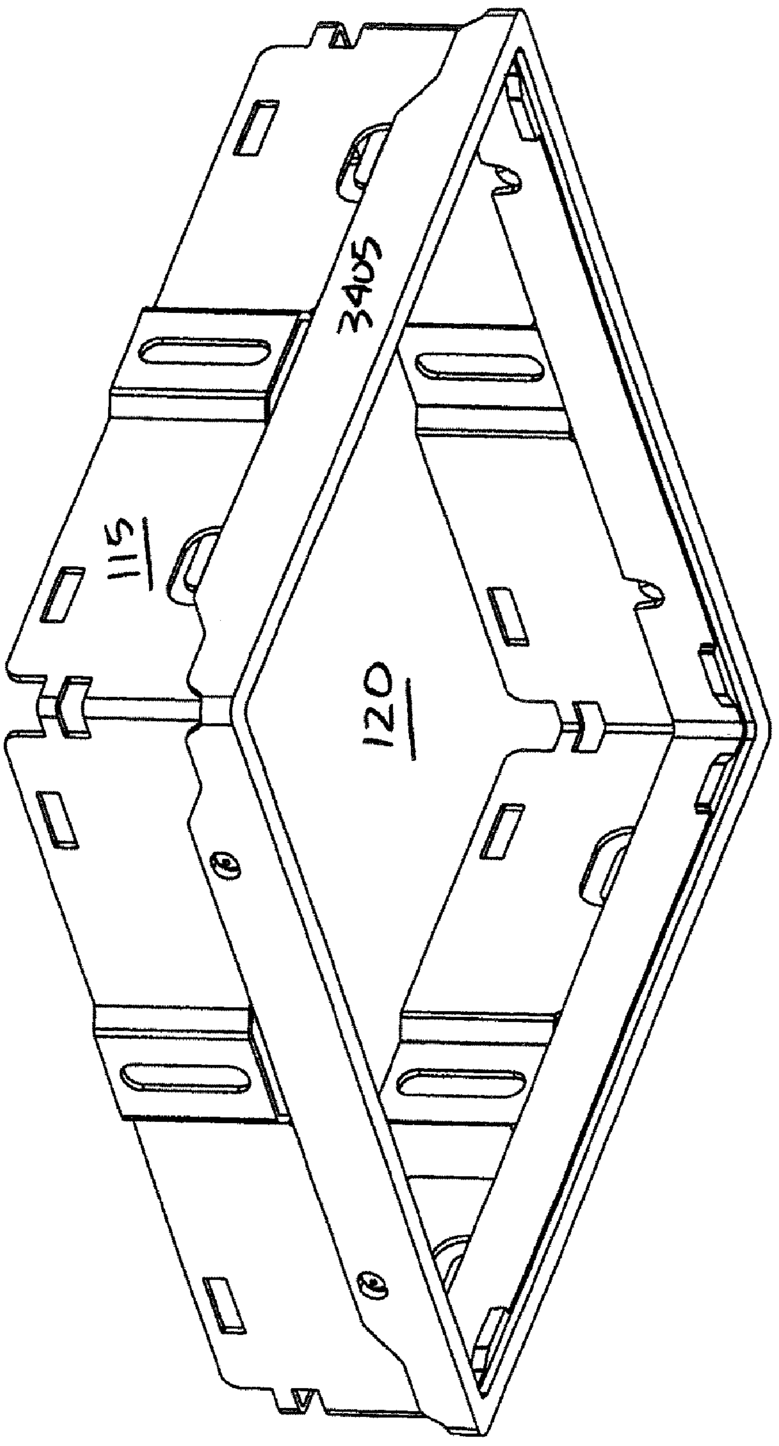
FIG. 34 is a line drawing of a portion of a lighting fixture comprising a frame configured for rimless installation in accordance with an exemplary embodiment of the present invention.

FIG. 32 illustrates a portion of an exemplary lighting fixture 100 configured for rimless installation wherein a protective cover 3205 is positioned for insertion into an aperture 120 of the lighting fixture 100 according to certain embodiments of the present invention. FIG. 33 illustrates a portion of an exemplary lighting fixture 100 configured for rimless installation and detailing an attachment of a square collar 115 to the fixture's frame according to certain embodiments of the present invention. FIG. 34 illustrates a portion of an exemplary lighting fixture 100 comprising a frame 115 configured for rimless installation according to certain embodiments of the present invention.

Rimless installation of the lighting fixture 100 or recessed luminaire can be achieved with a frame 3105 and protective frame cover 3205. The perforated flange 3205 is attached to the square collar 115 and bonded to or embedded in the ceiling material, for example, drywall or gypsum board. The installation can be accomplished via well-known drywall finishing techniques and common materials such as joint compound and drywall mesh tape. In other words, the installer covers the perforated flange 3205 with joint compound, spackling compound, or "mud" so that the flange 3205 is effectively embedded in the ceiling 1800, 1900 and thereby hidden from view. The joint compound enters the perforations to help enhance structural integrity.

The protective cover 3205 attaches to the frame 3105 prior to installation and is removed after installation is complete. Thus, the protective cover 3205 keeps paint, joint compound, and other construction materials from entering the interior of the aperture 120.

As illustrated in FIG. 33, the solid material finishing frame 3105 and the mud frame 3205 both comprise snap-in features to help ensure correct positioning on the square collar 115. In an exemplary embodiment, the snap-in features comprise a dimple 3310 in the square collar 115 and a corresponding hole 3320 in the finishing frame 3105

The frame 3405 of FIG. 34 provides solid material finishing. That is, the frame 3405 seats in ceilings 1800, 1900 or other surfaces of wood, tile, stone, or similar materials that are rigid/solid during installation. Each of the frames 3405, 3205 provides a fixture-to-ceiling interface and aesthetically blends with the surface of the ceiling 1800, 1900.

Figure 35:
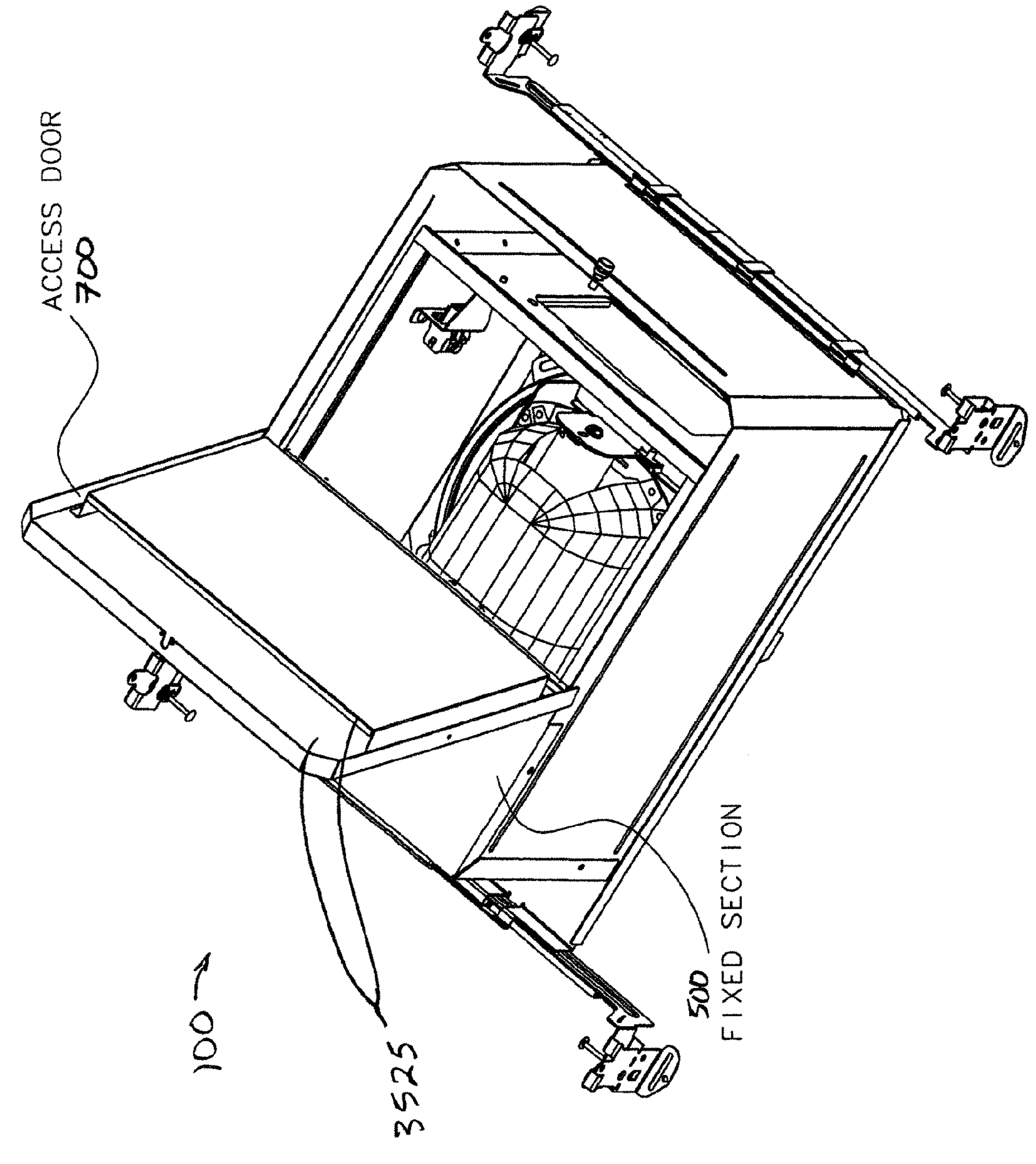
FIG. 35 is a line drawing of a lighting fixture comprising a housing with a hinged access door configured for direct contact with attic insulation material in accordance with an exemplary embodiment of the present invention.
Figure 36:
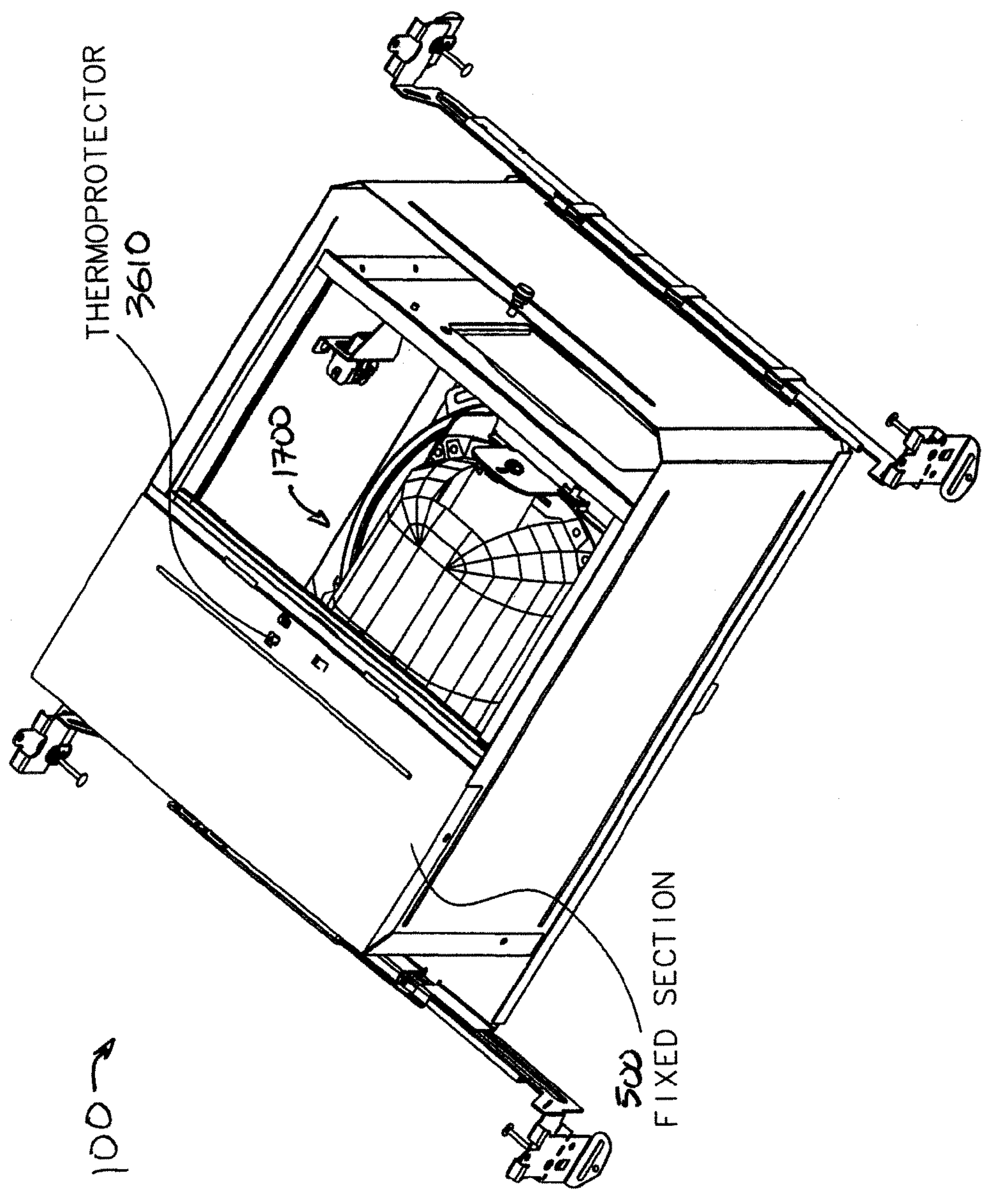
FIG. 36 is a line drawing of a lighting fixture comprising housing with the access door removed in accordance with an exemplary embodiment of the present invention.
Figure 37A:
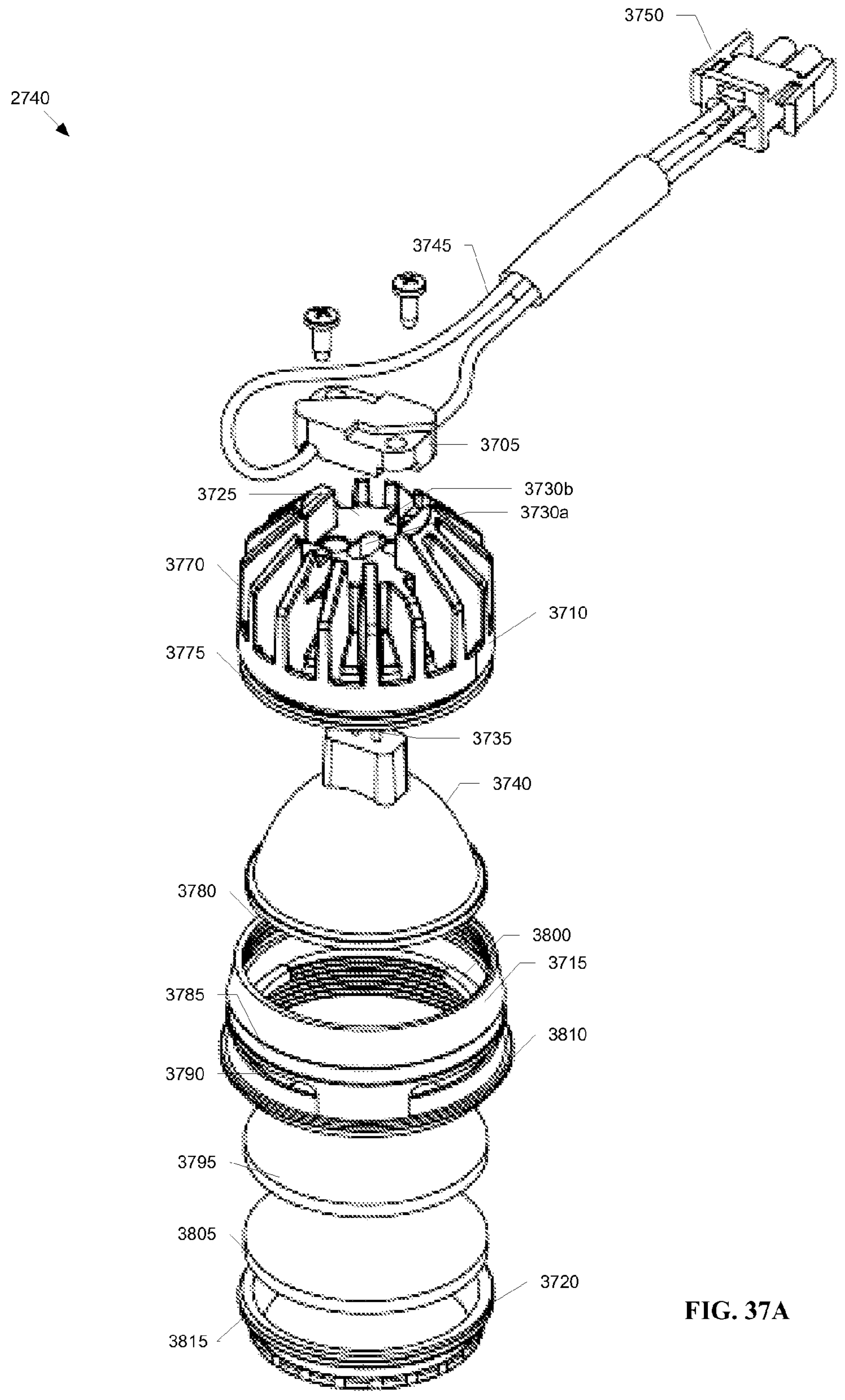
FIGS. 37A, 37B, 37C, 37D, and 37E, collectively
Figure 37B:
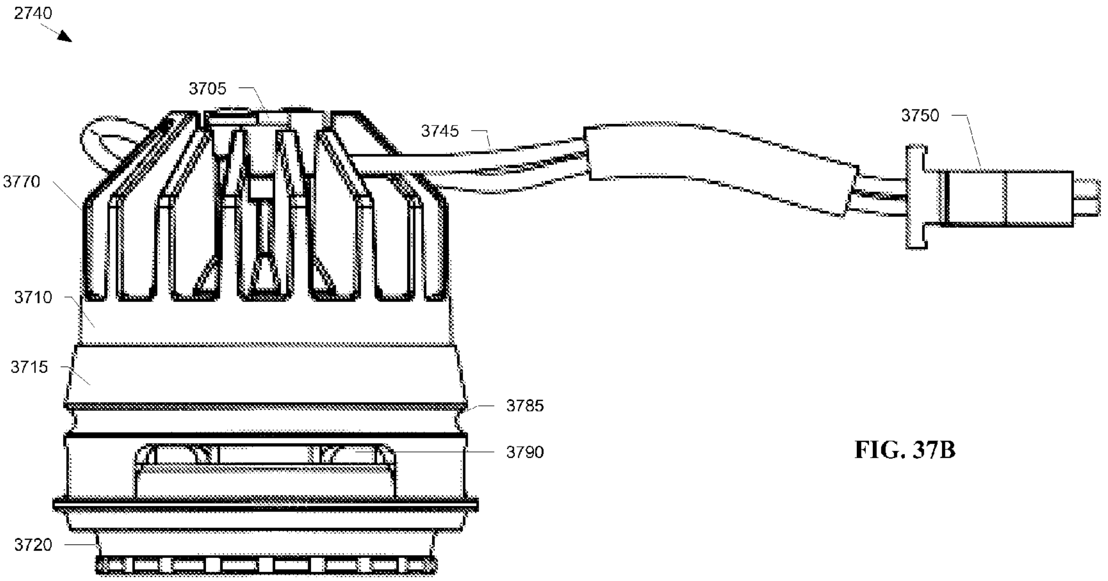
Figure 37C:
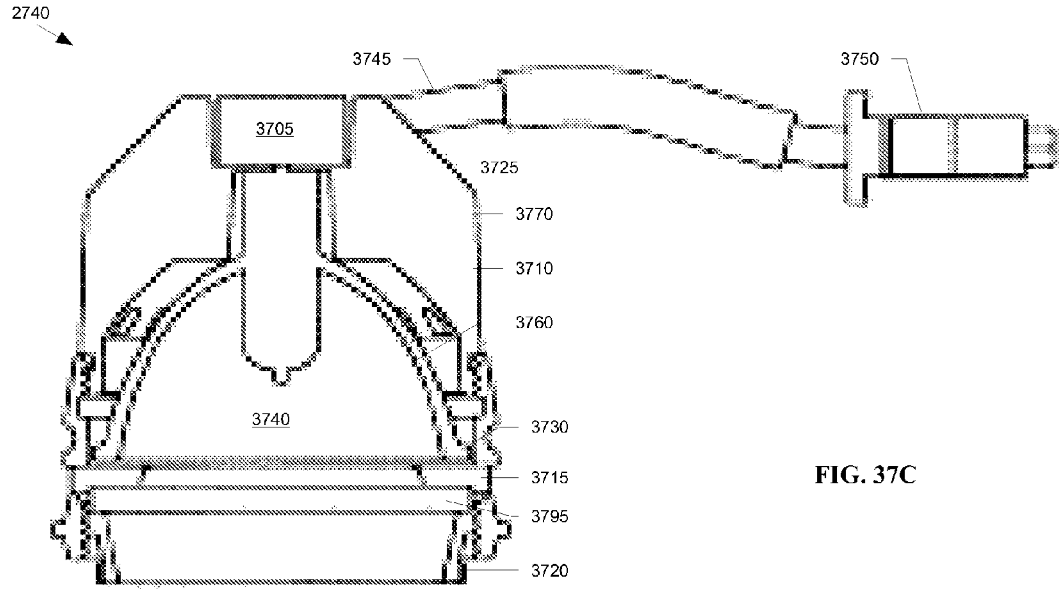
Figure 37D:
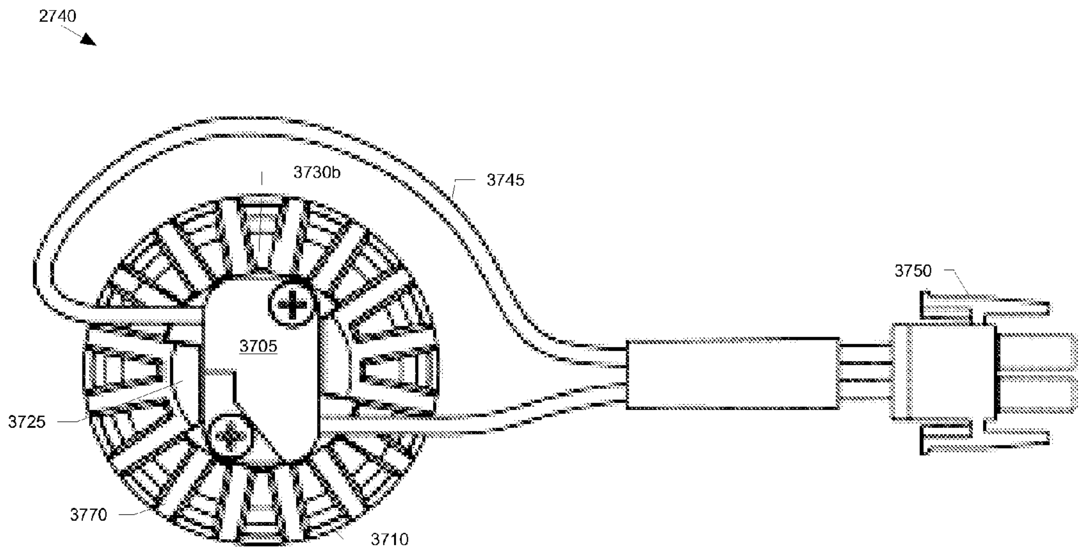
Figure 37E:
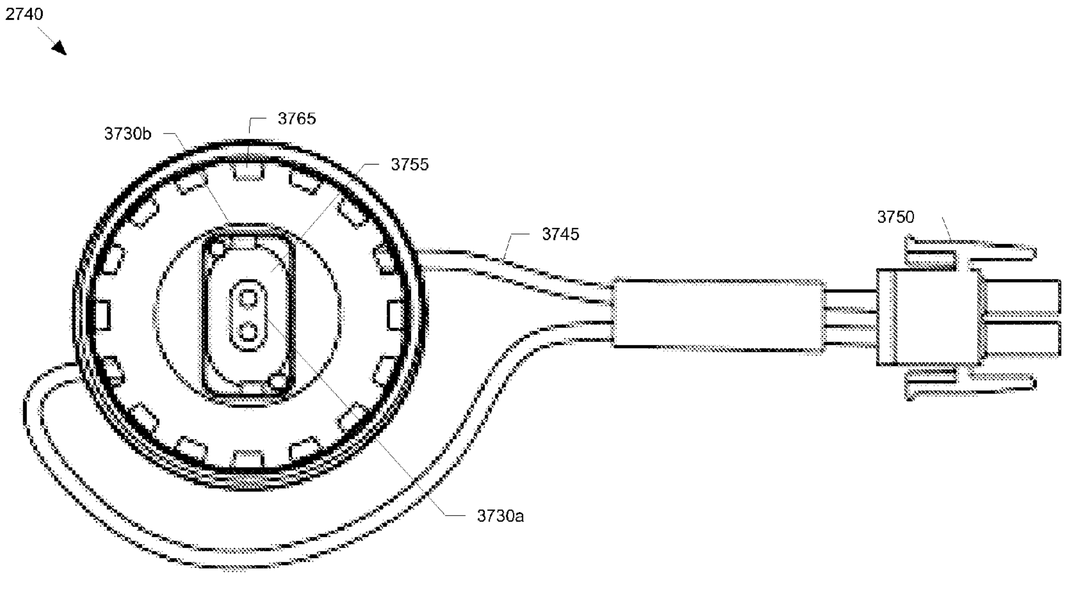

Turning now to FIGS. 35 and 36, these figures illustrate an exemplary lighting fixture 100 rated for direct contact with attic insulation material as discussed above with reference to FIGS. 22 and 23. FIG. 35 illustrates an exemplary lighting fixture 100 comprising a housing 500 with a hinged access door 700 configured for direct contact with attic insulation material according to certain embodiments of the present invention. Meanwhile, FIG. 36 illustrates an exemplary lighting fixture 100 comprising housing 500 with the access door removed according to certain embodiments of the present invention.

The hinged access door 700 comprises a thermally isolated double panel 3525 that avoids directly transferring heat to any insulation that may directly contact the housing or enclosure 500. The fixed section 500 of the enclosure also comprises a thermal protector 3610 that is positioned in accordance with applicable UL standards. With the door 700 closed, the illustrated exemplary embodiment 100 can comply with applicable airtight standards, for example standards of the American Society of Testing and Materials ("ASTM standards").

FIG. 37 illustrates an exemplary embodiment of a lamp capsule 2740 of fixture 100. Lamp capsule 2740 includes a socket 3705, socket holder 3710, lens holder 3715, and snoot 3720. Socket 3705 sits within the upper portion of socket holder 3710 atop and in contact with a socket mounting platform 3725. Socket mounting platform 3725 may include a plurality of apertures 3730 through which connection pins 3735 of a lamp 3740, or another light source, may pass (apertures 3730*a*), or through which heat may be ventilated (apertures 3730*b*). In some embodiments, socket mounting platform 3725 may include at least two apertures 3730*b*, or ventilation slots, that contribute to thermal management of the system by venting a portion of the heat surrounding socket 3705. Socket mounting platform 3725 may be made of any conductive material, such as aluminum, so as to provide a thermally conductive path between socket 3705 and the lamp 3740 received by socket 3705. In exemplary embodiments, lamp 3740 may be a dichroic or non-dichroic light source, such as a MR11 or MR16 multifaceted reflector bulb. Socket 3705 is electrically connected to a power source. For instance, in some embodiments, socket 3705 may be adapted to be connected to a stable power source (not shown) via wires 3745 and a connection module 3750.

Socket holder 3710 defines a cavity 3755 and is configured to receive lamp 3740 within cavity 3755. An integral reflector in socket holder 3710 limits infrared energy from passing directly into the socket holder 3710 while aiding to absorb this energy into the body of the socket holder 3710. In some embodiments, socket holder 3710 is configured to align pins 3735 such that blind insertion of lamp 3740 is possible. For instance, the upper portion of cavity 3755 may be shaped to match the top of the lamp 3740 where connection pins 3735 are such that the two align and fit together in only one way. Additionally, the length of socket holder 3710 is such that adequate access to lamp 3740 is provided to easily grip lamp 3740 for removal, i.e. socket holder 3710 is shorter in length than lamp 3740. In some embodiments, cavity 3755 may be configured to include a gap 3760 between lamp 3740 and the interior of socket holder 3710 after lamp 3740 has been inserted into the socket 3705 and socket holder 3710. Gap 3760 may facilitate convective heat transfer from the socket 3705 and lamp 3740 to ventilation apertures 3765, which allow heat to escape from the lamp 3740. Socket holder 3710 also includes a plurality of cooling fins 3770 extending radially and outwardly from socket holder 3710. Ventilation apertures 3765 are spaced between fins 3770, and the presence of fins 3770 aids in restricting light emission into the socket holder 3710 and lowering aperture brightness. Fins 3770 may also facilitate dissipation of heat generated by lamp 3740 into the surrounding air. In some embodiments, fins 3770 may be angled; however, one of skill in the art will recognize that the geometric configuration of the fins 3770 may vary in alternate embodiments. In some embodiments, at least a portion of socket 3705 and/or socket mounting platform 3725 may be in direct contact with fins 3770 so as to conductively transfer heat from socket 3705 and/or socket mounting platform 3725 to fins 3770, and in turn convectively dissipate heat to the surrounding environment.

Socket holder 3710 includes connecting means, such as threading 3775, for engaging mating means, such as threading 3780, of lens holder 3715. Lens holder 3715 is generally cylindrical, and contributes to thermal management of lamp capsule 2740. Lens holder 3715 includes a mounting groove 3785 as a means for a variety of mounting methods within the lens holder 3715, for instance, with spring loaded devices such as ball plungers. Ventilation slots 3790 are included in lens holder 3715 between lamp 3740 and lens 3795 to aid in the dissipation of heat to the surrounding air, as well as aid in cooling down the inner surface of lamp 3740. In some embodiments, the lens holder 3715 may further include a spacer, or gap, between lamp 3740 and lens 3795 to aid heat dissipation and cooling of the inner surface of lamp 3740. The inner diameter of the lens holder 3715 may be used to secure lamp 3740 orientation and alignment within the lamp capsule 2740. In some embodiments, lamp support features 3800 may be included within the lens holder 3715 to ensure proper pin 3735 engagement with socket 3705, while also maintaining proper lamp 3740 position with the face of lamp 3740 being parallel to lens 3795. In some embodiments, a second lens 3805 may be included, and one of skill in the art will recognize that a plurality of lenses may be included in alternate embodiments. In some embodiments, no lens may be included in the lens holder. The design of the lens holder 3715 is such that lamp 3740 stays stationary regardless of the number of lenses placed in the lens holder 3715.

Lens holder 3715 includes a second mating means, such as threading 3810, for engaging connecting means, such as threading 3815, of snoot 3720. Snoot 3720 is generally cylindrical and may vary in length in alternate embodiments. The function of snoot 3720 is to provide retention for lens 3795 and to control the light beam from lamp 3740. In some embodiments, snoot 3720 may be tapered or reverse tapered in order to manipulate the focal point of the beam pattern of the lamp 3740.

Lighting fixtures, luminaires, illumination apparatuses, and technology for installing, configuring, adjusting, and using such systems have been described. From the description, it will be appreciated that an embodiment of the present invention overcomes the limitations of the prior art. Those skilled in the art will appreciate that the present invention is not limited to any specifically discussed application or implementation and that the embodiments described herein are illustrative and not restrictive. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

What is claimed is:

1. A lamp capsule comprising:

a socket holder comprising an inner surface, an outer surface, and an electrical socket accessible from the inner surface, wherein the inner surface defines a cavity to receive a lamp, a plurality of fins disposed along the outer surface of the socket holder and extending radially and upwardly therefrom;

a plurality of ventilation apertures in the socket holder surface, each of the ventilation apertures disposed between two of the fins.

2. The lamp capsule of claim 1, wherein the socket is positioned on a back end of the socket holder and on the outer surface of the socket holder and wherein the socket holder further comprising comprises at least one socket aperture through the back end of the socket holder to provide access to the socket from the cavity.

3. The lamp capsule of claim 2, wherein the back end of the socket holder comprises at least one additional aperture disposed adjacent to the socket aperture, the additional apertures configured to provide a vent pathway for heat generated at the socket.

4. The lamp capsule of claim 1, further comprising a lens holder comprising a first end and a second opposing end, the first end removably coupled to a light emitting end of the socket holder.

5. The lamp capsule of claim 1, wherein at least a portion of the socket is in direct contact with more than one of the plurality of fins.

6. The lamp capsule of claim 4, wherein the socket lens holder comprises a surface having a substantially cylindrical shape and wherein the lens holder further comprises at least one ventilation slot circumferentially disposed through the surface of the lens holder.

7. The lamp capsule of claim 4, further comprising a generally cylindrical snoot rotatably coupled to the second end of the lens holder, wherein the snoot retains a lens between the lens holder and the snoot.

8. The lamp capsule of claim 4, further comprising at least one lens positioned in the lens holder.

9. A lamp capsule system comprising:

a socket holder comprising an inner surface, and an outer surface, wherein the inner surface defines a cavity;

a plurality of fins disposed along the outer surface of the socket holder and extending radially and upwardly therefrom;

an aperture disposed along and through a back end of the socket holder;

an electrical socket positioned adjacent the aperture on the outer surface of the socket holder, wherein the socket comprises at least one electrical contact accessible from the cavity through the aperture;

a lamp positioned within the cavity and electrically coupled to the socket;

a lens holder having a generally cylindrically shape surface and comprising:

a first end rotatably coupled to the socket holder and comprising a first aperture;

a second end comprising a second aperture; and a cavity between the first aperture and the second aperture defining a channel through the lens holder; and a plurality of ventilation slots extending longitudinally circumferentially about and through a portion of the surface of the lens holder between the lamp and the second aperture.

10. The lamp capsule system of claim 9, further comprising a substantially flat socket mounting platform disposed along the outer surface on the back side of the socket holder and configured to receive the socket.

11. The lamp capsule system of claim 10, wherein the socket mounting platform further comprises at least one ventilation apertures, each aperture providing a pathway from the outer surface to the inner surface and providing a ventilation pathway for heat along a backside of a lamp.

12. The lamp capsule system of claim 9, further comprising a plurality of ventilation apertures, each ventilation aperture disposed along the outer surface between two of the fins.

13. The lamp capsule system of claim 9, wherein at least a portion of the electrical socket is in direct contact with one or more of the plurality of fins.

14. The lamp capsule system of claim 9, wherein the lens holder further comprises a mounting groove.

15. The lamp capsule system of claim 9, wherein the lamp further comprises a reflector disposed about the lamp, at least a portion of the reflector disposed within the cavity, wherein the area between the cavity and the reflector defines an air gap.

16. The lamp capsule of claim 1, further comprising:

a lamp electrically coupled to the socket and at least partially disposed within the cavity;

a reflector coupled to the lamp and at least partially disposed within the cavity;

wherein an air gap is created in a space between the reflector and the inner surface.

17. The lamp capsule of claim 15, wherein heat generated in the air gap is vented through at least one of the plurality of ventilation apertures.

18. A lamp capsule comprising:

a socket holder comprising:

an inner surface defining a cavity to receive a lamp;

an outer surface; and an electrical socket accessible from the inner surface;

a plurality of heat sink fins disposed on the outer surface of the socket holder;

a lamp electrically coupled to the socket and at least partially disposed within the cavity;

a reflector at least partially disposed within the cavity;

a lens holder comprising:

a first end comprising a first aperture, the first end coupled to a light emitting end of the socket holder;

a second end comprising a second aperture;

a lens disposed adjacent to the second end; and a plurality of ventilation apertures in the surface of the lens holder between the lens and the lamp, each ventilation aperture extending circumferentially about a portion of a surface of the lens holder.

19. The lamp capsule of claim 18 further comprising a snoot rotatably coupled to the second end of the lens holder.

20. The lamp capsule of claim 18, wherein the ventilation apertures provide a ventilation pathway between the lens and the lamp.

21. The lamp capsule of claim 18, further comprising a second plurality of ventilation apertures along the outer surface of the socket holder, each of the second plurality of apertures being disposed between two of the fins.

* * * * *